US010582187B2

(12) United States Patent
Mesher

(10) Patent No.: US 10,582,187 B2
(45) Date of Patent: Mar. 3, 2020

(54) 3D TRACK ASSESSMENT METHOD

(71) Applicant: TETRA TECH, INC., Pasadena, CA (US)

(72) Inventor: Darel Mesher, Spruce Grove (CA)

(73) Assignee: TETRA TECH, INC., Pasadena, CA (US)

( * ) Notice: Subject to any disclaimer, the term of this patent is extended or adjusted under 35 U.S.C. 154(b) by 0 days.

(21) Appl. No.: 16/516,722

(22) Filed: Jul. 19, 2019

(65) Prior Publication Data

US 2019/0349566 A1    Nov. 14, 2019

Related U.S. Application Data

(63) Continuation of application No. 14/725,490, filed on May 29, 2015, now Pat. No. 10,362,293.

(60) Provisional application No. 62/118,600, filed on Feb. 20, 2015.

(51) Int. Cl.

| H04N 13/243 | (2018.01) |
|---|---|
| H04N 13/189 | (2018.01) |
| B61K 9/08 | (2006.01) |
| H04N 13/00 | (2018.01) |
| G06T 7/00 | (2017.01) |

(52) U.S. Cl.
CPC ............ *H04N 13/243* (2018.05); *B61K 9/08* (2013.01); *G06T 7/0004* (2013.01); *H04N 13/189* (2018.05); *G06T 2207/10028* (2013.01); *G06T 2207/30136* (2013.01); *G06T 2207/30236* (2013.01)

(58) Field of Classification Search
CPC ...... G01B 11/002; G01B 11/026; G01B 11/14
See application file for complete search history.

(56) References Cited

U.S. PATENT DOCUMENTS

| 4,781,060 A | 11/1988 | Berndt |
|---|---|---|
| 4,899,296 A | 2/1990 | Khattak |
| 5,221,044 A | 6/1993 | Guins |
| 5,247,338 A | 9/1993 | Danneskiold-Samsoe et al. |
| 5,433,111 A | 7/1995 | Hershey et al. |
| 5,787,815 A | 8/1998 | Andersson et al. |
| 5,793,492 A | 8/1998 | Vanaki |
| 6,357,297 B1 | 3/2002 | Makino et al. |
| 6,416,020 B1 | 7/2002 | Gronskov |
| 6,496,254 B2 | 12/2002 | Bostrom |
| 6,523,411 B1 | 2/2003 | Mian et al. |
| 6,698,279 B1 | 3/2004 | Stevenson |
| 6,768,551 B2 | 7/2004 | Mian et al. |

(Continued)

FOREIGN PATENT DOCUMENTS

| CA | 2061014 A1 | 8/1992 |
|---|---|---|
| CA | 2574428 A1 | 2/2006 |

(Continued)

OTHER PUBLICATIONS

T. Kanade, ed., Three-Dimensional Machine Vision, Kluwer Academic Publishers (1987) [Part 1].

(Continued)

*Primary Examiner* — Mainul Hasan
(74) *Attorney, Agent, or Firm* — Robinson IP Law, PLLC

(57) ABSTRACT

A 3D track assessment method is disclosed for identifying and assessing features of a railway track bed based on 3D elevation and intensity data gathered from the railway track bed.

10 Claims, 49 Drawing Sheets

(56) References Cited

U.S. PATENT DOCUMENTS

| | | | |
|---|---|---|---|
| 6,862,936 B2 | 3/2005 | Kenderian et al. |
| 6,873,998 B1 | 3/2005 | Dorum |
| 7,034,272 B1 | 4/2006 | Leonard |
| 7,084,989 B2 | 8/2006 | Johannesson et al. |
| 7,208,733 B2 | 4/2007 | Mian et al. |
| 7,213,789 B1 | 5/2007 | Matzan |
| 7,298,548 B2 | 11/2007 | Mian |
| 7,355,508 B2 | 4/2008 | Mian et al. |
| 7,357,326 B2 | 4/2008 | Hattersley et al. |
| 7,392,117 B1 | 6/2008 | Bilodeau et al. |
| 7,412,899 B2 | 8/2008 | Mian et al. |
| 7,502,670 B2 | 3/2009 | Harrison |
| 7,555,954 B2 | 7/2009 | Pagano et al. |
| 7,564,569 B2 | 7/2009 | Mian et al. |
| 7,602,937 B2 | 10/2009 | Mian et al. |
| 7,698,028 B1 | 4/2010 | Bilodeau et al. |
| 7,832,281 B2 | 11/2010 | Mian et al. |
| 7,869,909 B2 | 1/2011 | Harrison |
| 7,899,207 B2 | 3/2011 | Mian et al. |
| 8,006,559 B2 | 8/2011 | Mian et al. |
| 8,079,274 B2 | 12/2011 | Mian et al. |
| 8,111,387 B2 | 2/2012 | Douglas et al. |
| 8,140,250 B2 | 3/2012 | Mian et al. |
| 8,150,105 B2 | 4/2012 | Mian et al. |
| 8,155,809 B1 | 4/2012 | Bilodeau et al. |
| 8,188,430 B2 | 5/2012 | Mian |
| 8,263,953 B2 | 9/2012 | Fomenkar et al. |
| 8,289,526 B2 | 10/2012 | Kilian et al. |
| 8,326,582 B2 | 12/2012 | Mian et al. |
| 8,335,606 B2 | 12/2012 | Mian et al. |
| 8,423,240 B2 | 4/2013 | Mian |
| 8,478,480 B2 | 7/2013 | Mian et al. |
| 8,490,887 B2 | 7/2013 | Jones |
| 8,649,932 B2 | 2/2014 | Mian et al. |
| 8,655,540 B2 | 2/2014 | Mian et al. |
| 8,700,924 B2 | 4/2014 | Mian et al. |
| 8,868,291 B2 | 10/2014 | Mian et al. |
| 8,925,873 B2 | 1/2015 | Gamache et al. |
| 9,121,747 B2 | 9/2015 | Mian et al. |
| 9,134,185 B2 | 9/2015 | Mian et al. |
| 9,222,904 B2 | 12/2015 | Harrison |
| 9,310,340 B2 | 4/2016 | Mian et al. |
| 9,340,219 B2 | 5/2016 | Gamache et al. |
| 9,415,784 B2 | 8/2016 | Bartonek et al. |
| 9,454,816 B2 | 9/2016 | Mian et al. |
| 9,518,947 B2 | 12/2016 | Bartonek et al. |
| 9,571,796 B2 | 2/2017 | Mian et al. |
| 9,664,567 B2 | 5/2017 | Sivathanu et al. |
| 9,689,760 B2 | 6/2017 | Lanza di Scalea et al. |
| 9,714,043 B2 | 7/2017 | Mian et al. |
| 9,825,662 B2 | 11/2017 | Mian et al. |
| 9,922,416 B2 | 3/2018 | Mian et al. |
| 9,989,498 B2 | 6/2018 | Lanza di Scalea et al. |
| 10,167,003 B1 | 1/2019 | Bilodeau |
| 10,352,831 B2 | 7/2019 | Kondo et al. |
| 10,414,416 B2 | 9/2019 | Hampapur |
| 2003/0072001 A1 | 4/2003 | Mian et al. |
| 2004/0247157 A1 | 12/2004 | Lages |
| 2007/0265780 A1 | 11/2007 | Kesler et al. |
| 2008/0177507 A1 | 7/2008 | Mian et al. |
| 2011/0064273 A1 | 3/2011 | Zarembski et al. |
| 2012/0245908 A1 | 9/2012 | Berggren |
| 2012/0263342 A1 | 10/2012 | Haas |
| 2012/0300060 A1* | 11/2012 | Farritor ................ B61L 23/047 348/125 |
| 2013/0096739 A1* | 4/2013 | Landes .................. E01B 27/02 701/19 |
| 2013/0191070 A1* | 7/2013 | Kainer .................... B61K 9/08 702/167 |
| 2013/0313372 A1 | 11/2013 | Gamache et al. |
| 2014/0129154 A1 | 5/2014 | Cooper |
| 2014/0177656 A1 | 6/2014 | Mian et al. |
| 2014/0333771 A1 | 11/2014 | Mian et al. |
| 2014/0339374 A1 | 11/2014 | Mian et al. |
| 2015/0284912 A1 | 10/2015 | Delmonic et al. |
| 2016/0282108 A1 | 9/2016 | Martinod Restrepo et al. |
| 2016/0321513 A1 | 11/2016 | Mitti et al. |
| 2016/0325767 A1 | 11/2016 | LeFabvre et al. |
| 2017/0106887 A1 | 4/2017 | Mian et al. |
| 2018/0222504 A1 | 8/2018 | Birch et al. |
| 2018/0339720 A1 | 11/2018 | Singh |
| 2019/0039633 A1 | 2/2019 | Li |
| 2019/0135315 A1 | 5/2019 | Dargy et al. |

FOREIGN PATENT DOCUMENTS

| | | |
|---|---|---|
| CA | 2607634 A1 | 4/2008 |
| CA | 2574428 C | 10/2009 |
| CA | 2782341 A1 | 6/2011 |
| CA | 2867560 A1 | 4/2015 |
| CA | 2607634 C | 6/2015 |
| CA | 2945614 A1 | 10/2015 |
| CA | 2867560 C | 7/2017 |
| DE | 19831176 | 1/2000 |
| DE | 19831215 | 1/2000 |
| DE | 19826422 | 9/2002 |
| DE | 19943744 | 1/2006 |
| DE | 19919604 | 8/2009 |
| DE | 102009018036 | 2/2014 |
| DE | 102014119056 | 6/2016 |
| EP | 1197417 A1 | 4/2002 |
| EP | 1098803 | 1/2003 |
| EP | 1918702 A2 | 5/2008 |
| EP | 2697738 B1 | 8/2017 |
| EP | 269773861 | 8/2017 |
| FR | 3077553 | 2/2018 |
| FR | 3077553 | 8/2019 |
| GB | 2383635 B | 6/2005 |
| JP | 2010229642 A | 10/2010 |
| JP | 2016191264 A | 11/2016 |
| JP | 6068012 B2 | 1/2017 |
| JP | 6192717 B2 | 9/2017 |
| JP | 6425990 B2 | 11/2018 |
| JP | 2019065650 A | 4/2019 |
| JP | 6530979 B2 | 6/2019 |
| WO | 2000/05576 A2 | 2/2000 |
| WO | 2000/08459 | 2/2000 |
| WO | 2000-73118 A1 | 12/2000 |
| WO | 2001/066401 A1 | 9/2001 |
| WO | 2001066401 | 5/2003 |
| WO | 2005/036199 A2 | 4/2005 |
| WO | 2005036199 | 4/2005 |
| WO | 2006014893 | 2/2006 |
| WO | 2012142548 A1 | 10/2012 |
| WO | 2013/177393 A1 | 11/2013 |
| WO | 2015160300 A1 | 10/2015 |
| WO | 2015/165560 A1 | 11/2015 |
| WO | 2016/008201 A1 | 1/2016 |
| WO | 2016/027072 A1 | 2/2016 |
| WO | 2019/023613 A1 | 1/2019 |
| WO | 2019/023658 A1 | 1/2019 |
| WO | 2019023613 | 1/2019 |
| WO | 2019023658 | 1/2019 |

OTHER PUBLICATIONS

T. Kanade, ed., Three-Dimensional Machine Vision, Kluwer Academic Publishers (1987) [Part 2].

D.D. Davis et al., "Tie Condition Inspection a Case Study of Tie Failure Rate, Mods, and Clustering," Report No. R-714, Association of American Railroads Research and Test Department (Jul. 1989).

John Choros et al., "Prevention of Derailments due to Concrete Tie Rail Seat Deterioration," Proceedings of ASME/IEEE Joint Rail Conference & Internal Combustion Engine Spring Technical Conference. No. 40096 (2007).

Korean Intellectual Property Office, International Search Report for Int. App. No. PCT/IB2018/058574 dated Feb. 27, 2019.

Korean Intellectual Property Office, Written Opinion of the International Searching Authority for Int. App. No. PCT/IB2018/058574 dated Feb. 27, 2019.

US Patent and Trademark Office, Non-Final Office Action for U.S. Appl. No. 16/127,956 dated Dec. 31, 2018.

(56) References Cited

OTHER PUBLICATIONS

D.D. Davis et al., "Tie Performance—A Progress Report of the Des Plaines Test Site," Report No. R-746, Association of American Railroads Research and Test Department (Apr. 1990).
Mattias Johanneson, "Architectures for Sheet-of-Light Range Imaging," Report No. LiTH-ISY-I-1335, Image Processing Group, Department of Electrical Engineering, Linköping University (Feb. 27, 1992).
U.S. Appl. No. 60/584,769, "System & Method for Inspecting Railroad Track" by John Nagle & Steven C. Orrell.
Mattias Johannesson, "Sheet-of-light Range Imaging," Linköping Studies in Science and Technology. Dissertations No. 399 (1995).
M. Johannesson, SIMD Architectures for Range and Radar Imaging, PhD thesis, University of Linköping (1995).
Erik Åstrand, "Automatic Inspection of Sawn Wood," Linköping Studies in Science and Technology. Dissertations No. 424 (1996).
Mattias Johannesson, "Sheet-of-Light range imaging experiments with MAPP2200," Report No. LiTH-ISY-I-1401, Image Processing Group, Department of Electrical Engineering, Linköping University (Sep. 28, 1992).
M. de Bakker et al., "A Smart Range Image Sensor," Proceedings of the 24th European Solid-State Circuits Conference (1998):208-11;xii-+514.
Dr. Mats Gokstorp et al., "Smart Vision Sensors," International Conference on Image Processing (Oct. 4-7, 1998), Institute of Electrical and Electronics Engineers, Inc.
Mattias Johanneson, et al., "An Image Sensor for Sheet-of-Light Range Imaging," IAPR Workshop on Machine Vision Applications (Dec. 7-9, 1992).
Mattias Johannesson, "Can Sorting using sheet-of-light range imaging and MAPP2200," Institute of Electrical and Electronics Engineers; International Conference on Systems, Man and Cybernetics (Oct. 17-20, 1993).
Michiel de Bakker, et al., "Smart PSD array for sheet-of-light range imaging," The International Society for Optical Engineering. Sensors and Camera Systems for Scientific, Industrial, and Digital Photography Applications (Jan. 24-26, 2000).
Umayal Chidambaram, "Edge Extraction of Color and Range Images," (Dec. 2003).
Franz Pernkopf et al., "Detection of surface defects on raw milled steel blocks using range imaging" The International Society for Optical Engineering. Machine Vision Applications in Industrial Inspection X (Jan. 21-22, 2002).
Murhed, Anders, "IVP Integrated Vision Products," Pulp and Paper International 44.12 (Dec. 1, 2002).
Anders Åstrand, "Smart Image Sensors," Linköping Studies in Science and Technology. Dissertations. No. 319 (1993).
Mattias Johannesson et al., "Five Contributions to the Art of Sheet-of-light Range Imaging on MAPP2200," Report No. LiTH-ISY-R-1611, Image Processing Group, Department of Electrical Engineering, Linköping University (Apr. 14, 1994).
Federal Register, vol. 73 (70695-70696).
Newman et al., "A Survey of Automated Visual Inspection," Computer Vision an Image Understanding vol. 61, No. 2, Mar., pp. 231-262, 1995.
J. Velten et al., "Application of a Brightness-Adapted Edge Detector for Real-Time Railroad Tie Detection in Video Images," Institute of Electrical and Electronics Engineers (1999).
R. Gordon Kennedy, "Problems of Cartographic Design in Geographic Information Systems for Transportation," Cartographic Perspectives (Jul. 20, 1999).
Richard Reiff, "An Evaluation of Remediation Techniques for Concrete Tie Rail Seat Abrasion in the Fast Environment," American Railway Engineering Association, Bulletin 753 (1995).
Russell H. Lutch et al., "Causes and Preventative Methods for Rail Seat Abrasion in North America's Railroads," Conference Paper (Oct. 2014).
Nigel Peters and Steven R. Mattson, "CN 60E Concrete Tie Development," AREMA: 25 (2003).
Federal Register, vol. 76, No. 175, pp. 55819-55825.
National Transportation Safety Board, "Railroad Accident Brief" (NTSB/RAB-06/03).
Arthur L. Clouse et al. "Track Inspection Into the 21st Century" (Sep. 19, 2006).
Federal Register, vol. 76, No. 63, pp. 18001-18346 (18073).
Railroad Safety Advisory Committee (RSAC), Minutes of Meeting, Dec. 10, 2008, Washington, D.C.
Dennis P. Curtin, "An Extension to the Textbook of Digital Photography, Pixels and Images" (2007).
Holland L.P.'s Combined Motion for Early Markman Claim Construction and Summary Judgment of Non-Infringement in *Georgetown Rail Equipment Company v. Holland L.P.*, (E.D. Tex.) (Tyler) (6:13-cv-366).
Georgetown Rail Equipment Company's Response to Holland L.P.'s Combined Motion for Early Markman Claim Construction and Summary Judgment of Non-Infringement in *Georgetown Rail Equipment Company v. Holland L.P.*, (E.D. Tex.) (Tyler) (6:13-cv-366).
Georgetown Rail Equipment Company's P.R. 4-5(a) Opening Markman Claim Construction Brief in *Georgetown Rail Equipment Company v. Holland L.P.*, (E.D. Tex.) (Tyler) (6:13-cv-366).
Holland L.P.'s Responsive Markman Claim Construction Brief Under P.R. 4-5 in *Georgetown Rail Equipment Company v. Holland L.P.*, (E.D. Tex.) (Tyler) (6:13-cv-366).
Claim Construction Memorandum Opinion and Order in *Georgetown Rail Equipment Company v. Holland L.P.*, (E.D. Tex) (Tyler) (6:13-cv-366).
Public Judgment and Reasons in *Georgetown Rail Equipment Company v. Rail Radar Inc. and Tetra Tech EBA Inc.* (T-896-15) (2018 FC 70).

\* cited by examiner

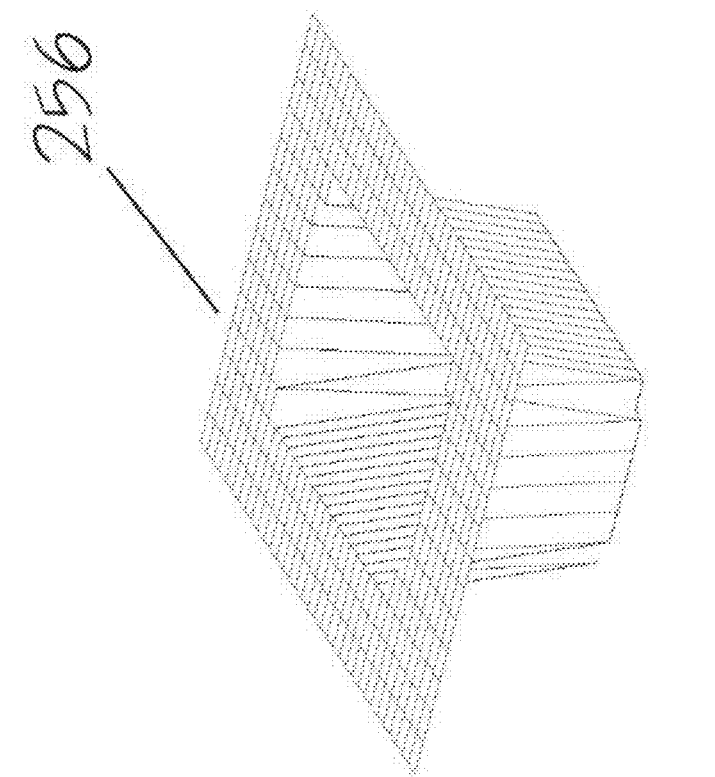
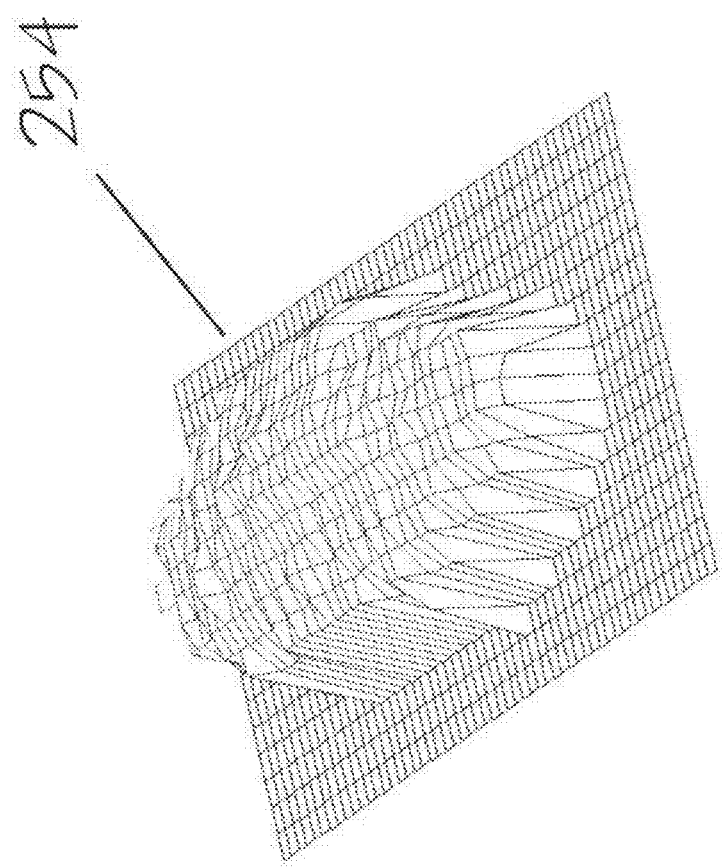
FIG. 27

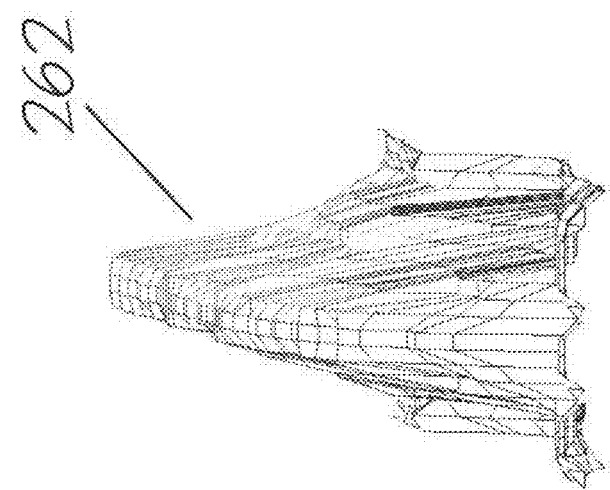
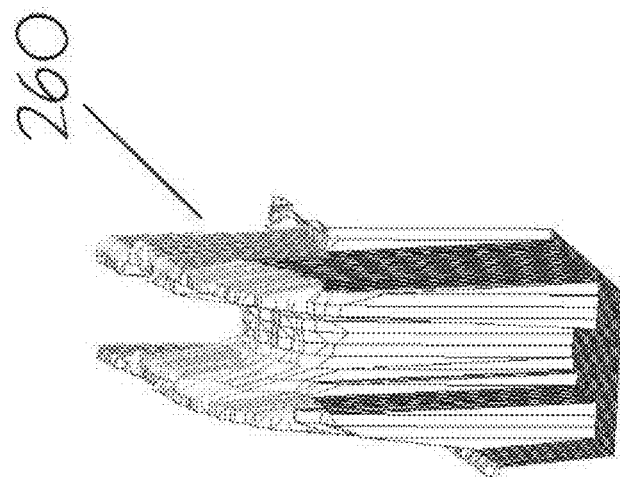
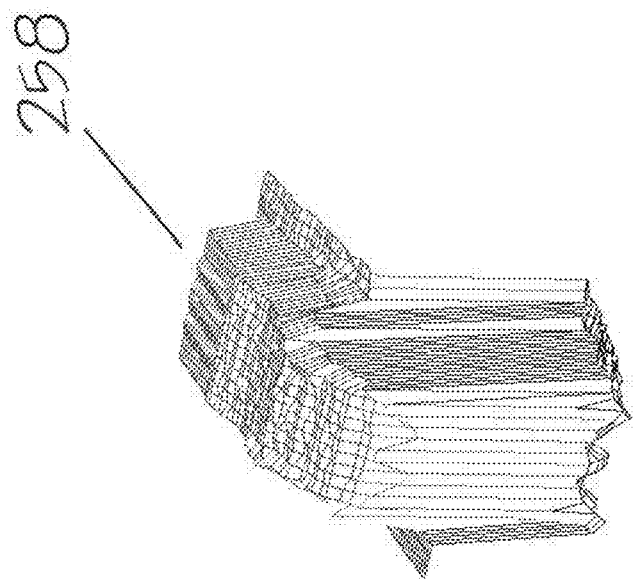
FIG. 28

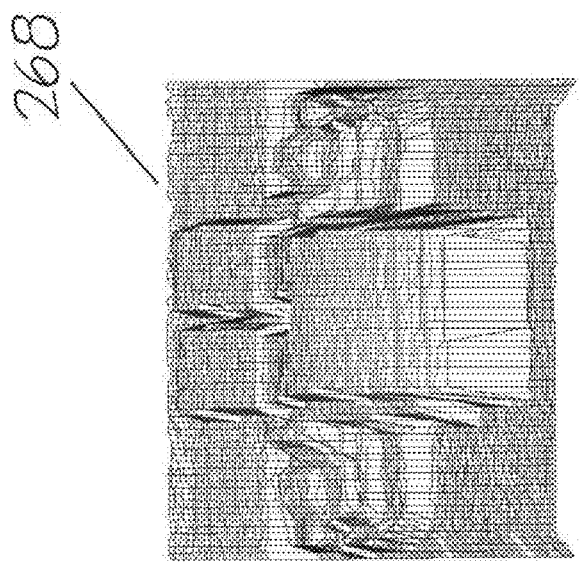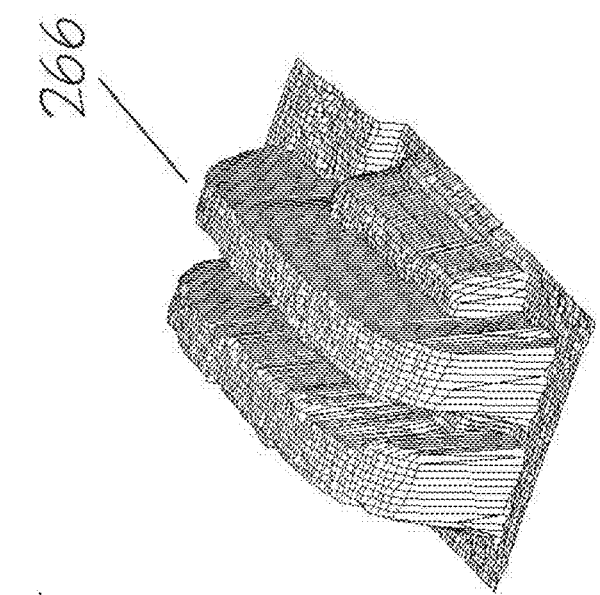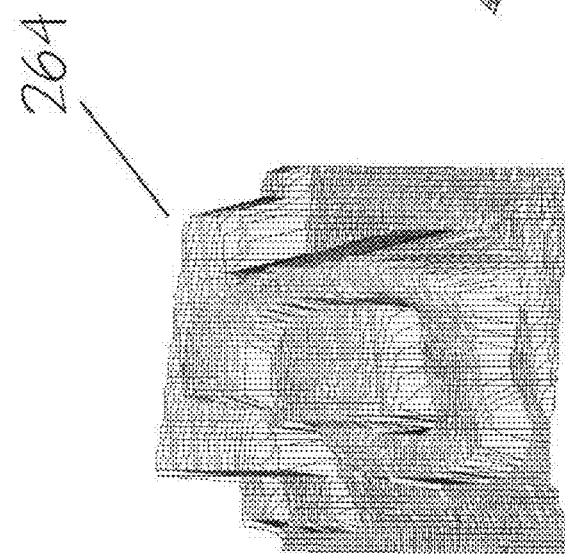
FIG. 29

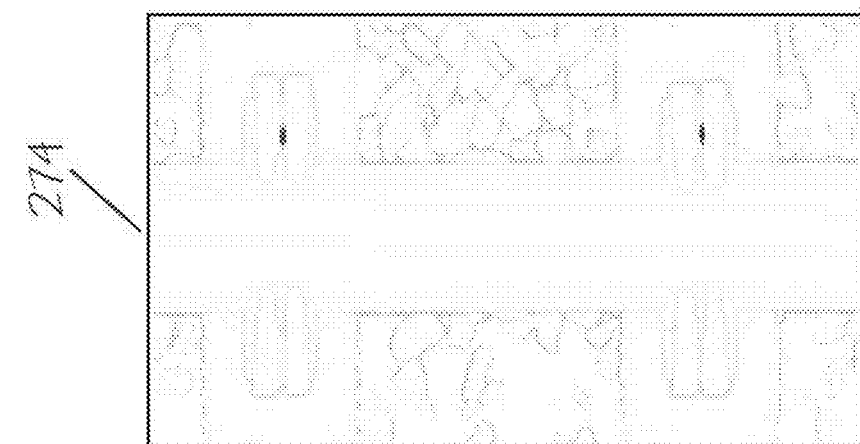
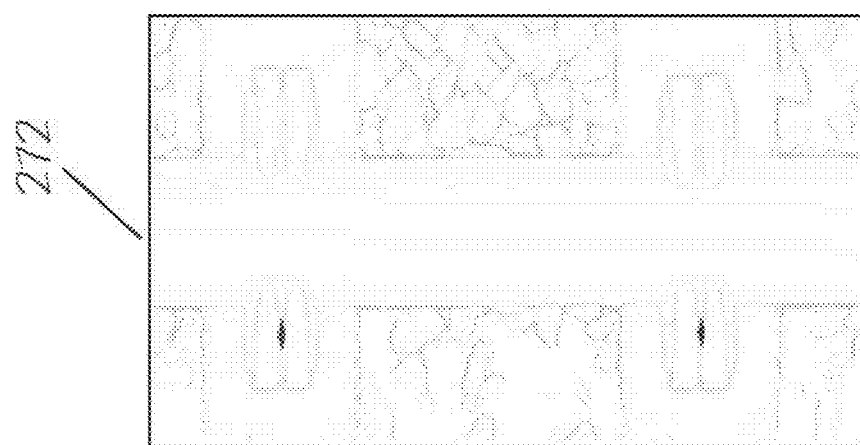
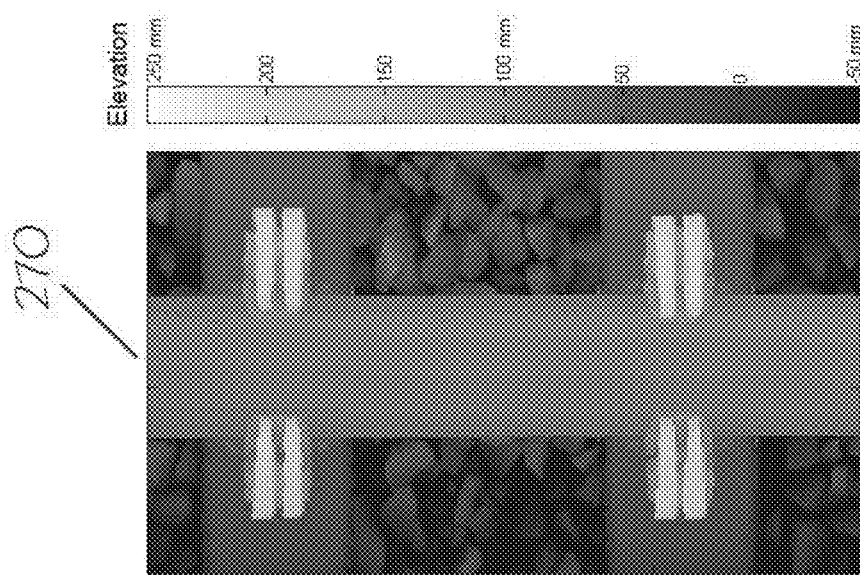
FIG. 30

3D TRACK ASSESSMENT METHOD

CROSS-REFERENCE(S) TO RELATED APPLICATION(S)

This application is a continuation application claiming priority to U.S. Nonprovisional patent application Ser. No. 14/725,490 entitled "3D TRACK ASSESSMENT SYSTEM AND METHOD" which was filed on May 29, 2015 which claims priority to U.S. Provisional Patent Application Ser. No. 62/118,600 entitled "3D Track Assessment System Post-Processing, Analysis and Reporting System" which was filed on Feb. 20, 2015, the entireties of which are incorporated herein by reference.

FIELD

This disclosure relates to the field of railway track inspection and assessment systems.

BACKGROUND

Rail infrastructure owners are motivated to replace the time consuming and subjective process of manual crosstie (track) inspection with objective and automated processes. The motivation is driven by a desire to improve rail safety in a climate of increasing annual rail traffic volumes and increasing regulatory reporting requirements. Objective, repeatable, and accurate track inventory and condition assessment also provide owners with the innovative capability of implementing comprehensive asset management systems which include owner/region/environment specific track component deterioration models. Such rail specific asset management systems would yield significant economic benefits in the operation, maintenance and capital planning of rail networks.

A primary goal of such automated systems is the non-destructive high-speed assessment of railway track infrastructure. Track inspection and assessment systems currently exist including, for example, Georgetown Rail (GREX) Aurora 3D surface profile system and Ensco Rail 2D video automated track inspection systems. Such systems typically use coherent light emitting technology, such as laser radiation, to illuminate regions of the railway track bed during assessment operations.

An important consideration after field data collection of railway data is the manner in which the data is processed. One of the most time-consuming tasks is to identify different railway track features and to categorize and track such railway track features.

What is needed, therefore, is a robust and reliable system for analyzing and processing data collected during and/or after a high speed assessment of a railway track. What is also needed is a system that is able to quickly and accurately identify railway track features and associate measured parametric data with those features.

SUMMARY

The above and other needs are met by a three dimensional track assessment system ("3DTAS"). The 3DTAS has a number of novel features including surface elevation model 3D block matching based correlation; extraction, identification, and categorization of unfamiliar 3D track features; detection of rail head and rail base locations; detection and categorization of railway tie distresses; measuring and reporting of ballast level anomalies (leading/trailing berms/ voids indicating rail stress, shoulder ballast voids); reporting the location and type of tie anchors (and the offset from the corresponding tie edge); measuring and reporting the location, size and type of rail joint bars (and detect and report the presence of the through bolts and nuts); reporting the presence of rail base welds (and any planar vertical deviations across the weld due to differences in rail height, and the distance of the weld from the nearest tie); measuring and reporting the presence and severity of rail head distortion (crushed heads or corrugation) including battered joints; and the reporting and identification of types of other track materials (OTM).

The 3DTAS algorithms run on a system processor as described herein which automatically processes full width track surface elevation and intensity data to identify 3D features and extract physical parameters of interest. Such discrete 3D feature identification and analysis methods are based on surface elevation model (3D) block matching based correlation. As unfamiliar features are encountered, 3D surface models for the features are developed and physical parameters are defined for extraction. The extensibility of the rule-based expert system architecture used for interpretation during processing allows the refinement of existing parameters and/or the development of rules and physical parameters as new features or track components are encountered.

In one embodiment, tie condition (distress) is detected and categorized based on acquired 3D data. Condition analysis algorithms define the severity (based on depth, width and/or proximity to other features such as spikes or tie-ends for example) and extent (based on the area or the end to end length of the distress for example) of all surface distresses. These individual distresses are combined using developed client specific algorithms to rate the quality of each tie. Each distress feature is recorded and maintained in a fully referenced feature database that allows future comparisons at the individual distress level. The objective, accurate and repeatable measurements possible with the 3DTAS system allows the direct comparison of individual distresses and distress components on a tie-by-tie basis for subsequent surveys (temporal comparison), an important capability for the development of accurate deterioration models required for asset management system development.

A system for assessing a railway track bed is disclosed, the system comprising a power source; a light emitting apparatus powered by the power source for emitting light energy toward a railway track; a data storage apparatus in communication with at least one processor; at least one sensor for sensing reflected light that was emitted from the light emitting apparatus and acquiring three dimensional image data of the railway track to be stored in the data storage apparatus, wherein the plurality of sensors are in communication with the at least one processor; and the at least one processor wherein the at least one processor is configured to run an algorithm for processing three-dimensional elevation data gathered from the plurality of sensors and saved in the data storage apparatus, the algorithm comprising the steps of: (a) acquiring three dimensional data representative of a segment of railway track bed; (b) generating a track elevation map based on the acquired three dimensional data; (c) identifying a railway track bed feature from the track elevation map; and (d) storing information corresponding to the identified railway track bed feature in the data storage apparatus.

The algorithm step of identifying a railway track bed feature may further include the step of identifying a rail head edge by detecting significant vertical gradient edges over a two dimensional area wherein such vertical gradient edges are greater than a minimum rail height threshold.

The algorithm step of identifying a railway track bed feature may further include the step of identifying a rail base edge by detecting significant vertical gradient edges over a two dimensional area adjacent the detected rail head edge wherein such vertical gradient edges are greater than a minimum rail base height threshold.

The algorithm described above may further include the step of removing data corresponding to the rail head from the elevation map, thereby enhancing the detection of other smaller vertical components of the railway track bed.

The algorithm step of identifying a railway track bed feature may further include the step of detecting surfaces with surface normal values greater than a planar region surface normal value threshold and that are proximate to one another by less than a maximum proximity threshold. The algorithm step of identifying a railway track bed feature may further include the step of defining an approximate tie surface plane based on the detected surfaces with surface normal values greater than the planar region surface normal value threshold that are proximate to one another by less than the maximum proximity threshold.

The algorithm step of identifying a railway track bed feature may further include the step of assigning a tie bounding box around the perimeter of the tie surface plane based at least on one measured parameter of the tie surface plane. The algorithm step of identifying a railway track bed feature may further include the step of assigning an approximate tie length, an approximate tie width, and an approximate tie skew angle based on the bounding box assigned around the perimeter of the tie surface plane. The algorithm step of identifying a railway track bed feature may further include the step of identifying and measuring surface cracks that are deeper than a minimum crack depth threshold and that are longer than a minimum crack length threshold based on the track elevation map. The data corresponding to the measured surface cracks may be saved to the data storage apparatus on a per tie basis so that the same tie can be re-examined at a later date to determine whether the measured surface cracks have changed. The algorithm step of identifying a railway track bed feature may further include a step of assigning a severity value to each measured crack based on at least the measured length and measured width of the crack.

The algorithm step of identifying a railway track bed feature further comprises the step of identifying and measuring a surface feature that is higher than a minimum tie height threshold. The data corresponding to the measured surface feature may be saved to the data storage apparatus on a per tie basis so that the same tie can be re-examined at a later date to determine whether the measured surface feature has changed.

The algorithm step of identifying a railway track bed feature may further include the step of detecting a broken tie based on an abrupt elevation shift along the tie surface plane.

The algorithm step of identifying a railway track bed feature may further include the step of comparing at least a portion of the track elevation map to a plurality of three dimensional features saved in a feature library to determine a best fit between the at least a portion of the track elevation map and the plurality of three dimensional features to properly identify the railway track bed feature. The algorithm step of comparing may further include the step of applying a minimum correlation threshold so that a railway track bed feature will not be identified as a particular three dimensional feature from the feature library unless the minimum correlation threshold is met.

The algorithm step of identifying a railway track bed feature may further include the step of determining a shoulder ballast volume adjacent a tie based at least in part on the approximate tie surface plane defined for the tie.

The algorithm step of identifying a railway track bed feature may further include the step of defining a surface area region adjacent the tie bounding box, measuring the surface elevation of the surface area region, and determining the difference between the surface elevation of the surface area region and the surface elevation of the approximate tie surface plane to determine whether a positive volume or negative volume is present at the surface area region.

The algorithm step of identifying a railway track bed feature may further include the step of making a plurality of elevation measurements along and around an identified railway track bed feature and recording the measurements and the locations of the measurements in the data storage apparatus. The algorithm step of identifying a railway track bed feature may further include the step of assigning a condition to the identified railway track bed feature based on the plurality of elevation measurements.

The algorithm step of identifying a railway track bed feature may further include the step of measuring the length of a joint bar candidate, determining whether the length of the joint bar candidate falls between a minimum joint bar length threshold and a maximum joint bar length threshold, and identifying the joint bar candidate as a joint bar if the length measurement of the joint bar candidate falls between a minimum joint bar length threshold and a maximum joint bar length threshold.

A system for assessing a railway track bed is disclosed, the system comprising a power source; a light emitting apparatus powered by the power source for emitting light energy toward a railway track; a data storage apparatus in communication with at least one processor; at least one sensor for sensing reflected light that was emitted from the light emitting apparatus and acquiring three dimensional image data of the railway track to be stored in the data storage apparatus, wherein the plurality of sensors are in communication with the at least one processor; and the at least one processor wherein the at least one processor includes an algorithm for extracting railway track bed surface elevation data to define new railway track bed components for a three dimensional track feature library, the algorithm comprising the steps of: (a) acquiring three dimensional data representative of a segment of railway track bed; (b) generating a track elevation map based on the acquired three dimensional data; (c) identifying a railway track feature from the track elevation map that does not match any previously defined track features saved in a track feature library; (d) extracting three dimensional data from the track elevation map corresponding to the identified railway track feature; (e) assigning a feature name to the extracted three dimensional data; and (f) saving in the data storage apparatus the extracted three dimensional data associated with the feature name as a new track feature to be included in the track feature library.

A method of building a virtual three dimensional railway track bed component library is disclosed, the method comprising the steps of emitting a light along a track bed surface; sensing some of the emitted light after it has reflected off of the track bed surface; defining a three dimensional elevation map based on the sensed light reflected from the track bed surface; storing the elevation map in a data storage apparatus; identifying a railway track bed feature from the three dimensional elevation map that does not match any previously defined track bed features saved in a track component library; extracting three dimensional data from the track elevation map corresponding to the identified railway track bed feature; assigning a component name to the extracted three dimensional data; and saving the extracted three dimensional data associated with the component name in a data storage apparatus as a new track bed feature to be included in the track component library.

A method of assessing a railway track bed is disclosed, the method comprising the steps of defining a three dimensional elevation map based on data gathered by a sensor sensing reflected light from a track bed surface; storing the elevation map in a data storage apparatus; identifying a railway track bed feature from the elevation map; and storing information corresponding to the identified railway track bed feature in the data storage apparatus.

The step of identifying a railway track bed feature may further include the step of identifying a rail head edge by detecting significant vertical gradient edges over a two dimensional area wherein such vertical gradient edges are greater than a minimum rail height threshold.

The step of identifying a railway track bed feature may further include the step of identifying a rail base edge by detecting significant vertical gradient edges over a two dimensional area adjacent the detected rail head edge wherein such vertical gradient edges are greater than a minimum rail base height threshold.

The step of identifying a railway track bed feature may further include the step of comparing at least a portion of the track elevation map to a plurality of three dimensional features saved in feature library to determine a best fit to properly identify the railway track bed feature.

The step of comparing may further include the step of applying a minimum correlation threshold so that a railway track bed feature will not be identified as a particular three dimensional feature from the feature library unless the minimum correlation threshold is met.

The step of identifying a railway track bed feature may further include the step of measuring the length of a joint bar candidate, determining whether the length of the joint bar candidate falls between a minimum joint bar length threshold and a maximum joint bar length threshold, and identifying the joint bar candidate as a joint bar if the length measurement of the joint bar candidate falls between a minimum joint bar length threshold and a maximum joint bar length threshold.

The method of claim 26 further comprising the step of removing data corresponding to the rail head from the elevation map, thereby enhancing the detection of other smaller vertical components of the railway track bed.

The method described above may further include the step of detecting surfaces with surface normal values greater than a planar region surface normal value threshold and that are proximate to one another by less than a maximum proximity threshold. The method may further include the step of defining an approximate tie surface plane based on the detected surfaces with surface normal values greater than the planar region surface normal value threshold that are proximate to one another by less than the maximum proximity threshold. The method may further include the step of assigning a tie bounding box around the perimeter of the tie surface plane based at least on one measured parameter of the tie surface plane. The method may further include the step of assigning an approximate tie length, an approximate tie width, and an approximate tie skew angle based on the bounding box assigned around the perimeter of the tie surface plane.

The method described above may further include the step of identifying and measuring surface cracks that are deeper than a minimum crack depth threshold and that are longer than a minimum crack length threshold based on the track elevation map. The method may further include the step of saving data corresponding to the measured surface cracks to the data storage apparatus on a per tie basis so that the same tie can be re-examined at a later date to determine whether the measured surface cracks have changed. The method may further include a step of assigning a severity value to each measured crack based on at least the measured length and measured width of the crack.

The method described above may further include the step of identifying and measuring a surface feature that is higher than a minimum tie height threshold. The method may further include the step of saving data corresponding to the measured surface feature to the data storage apparatus on a per tie basis so that the same tie can be re-examined at a later date to determine whether the measured surface feature has changed.

The method described above may further include the step of detecting a broken tie based on an abrupt elevation shift along the tie surface plane.

The method described above may further include the step of determining a shoulder ballast volume adjacent a tie based at least in part on the approximate tie surface plane defined for the tie. The method may further include the step of defining a surface area region adjacent the tie bounding box, measuring the surface elevation of the surface area region, and determining the difference between the surface elevation of the surface area region and the surface elevation of the approximate tie surface plane to determine whether a positive volume or negative volume is present at the surface area region.

The method described above may further include the step of making a plurality of elevation measurements along and around an identified railway track bed feature and recording the measurements and the locations of the measurements in the data storage apparatus. The method may further include the step of assigning a condition to the identified railway track bed feature based on the plurality of elevation measurements.

The summary provided herein is intended to provide examples of particular disclosed embodiments and is not intended to limit the scope of the invention disclosure in any way.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

FIG. 27 shows 3D feature model library examples including a wooden tie spike and a tie plate hole;

FIG. 28 shows feature model library examples including a first rail anchor, a second rail anchor, and a third rail anchor;

FIG. 29 shows feature model library examples including a first PCC tie fastening clip, a second PCC tie fastening clip, and a third PCC tie fastening clip;

FIG. 30 shows an example of 3D model matching for a section of railway track bed;

The figures are provided to illustrate concepts of the invention disclosure and are not intended to limit the scope of the invention disclosure to the exact embodiments provided in the figures.

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

"Track", "Railway track", "track bed" or "railway track bed" is defined herein to mean a section of railway including the rails, ties, components holding the rails to the ties, components holding the rails together, and ballast material.

A "processor" is defined herein to include a processing unit including, for example, one or more microprocessors, an application-specific instruction-set processor, a network processor, a vector processor, a scalar processor, or any combination thereof, or any other control logic apparatus now known or later developed that is capable of performing the tasks described herein, or any combination thereof.

The phrase "in communication with" means that two or more devices are in communication with one another physically (e.g., by wire) or indirectly (e.g., by wireless communication).

Figure 1:
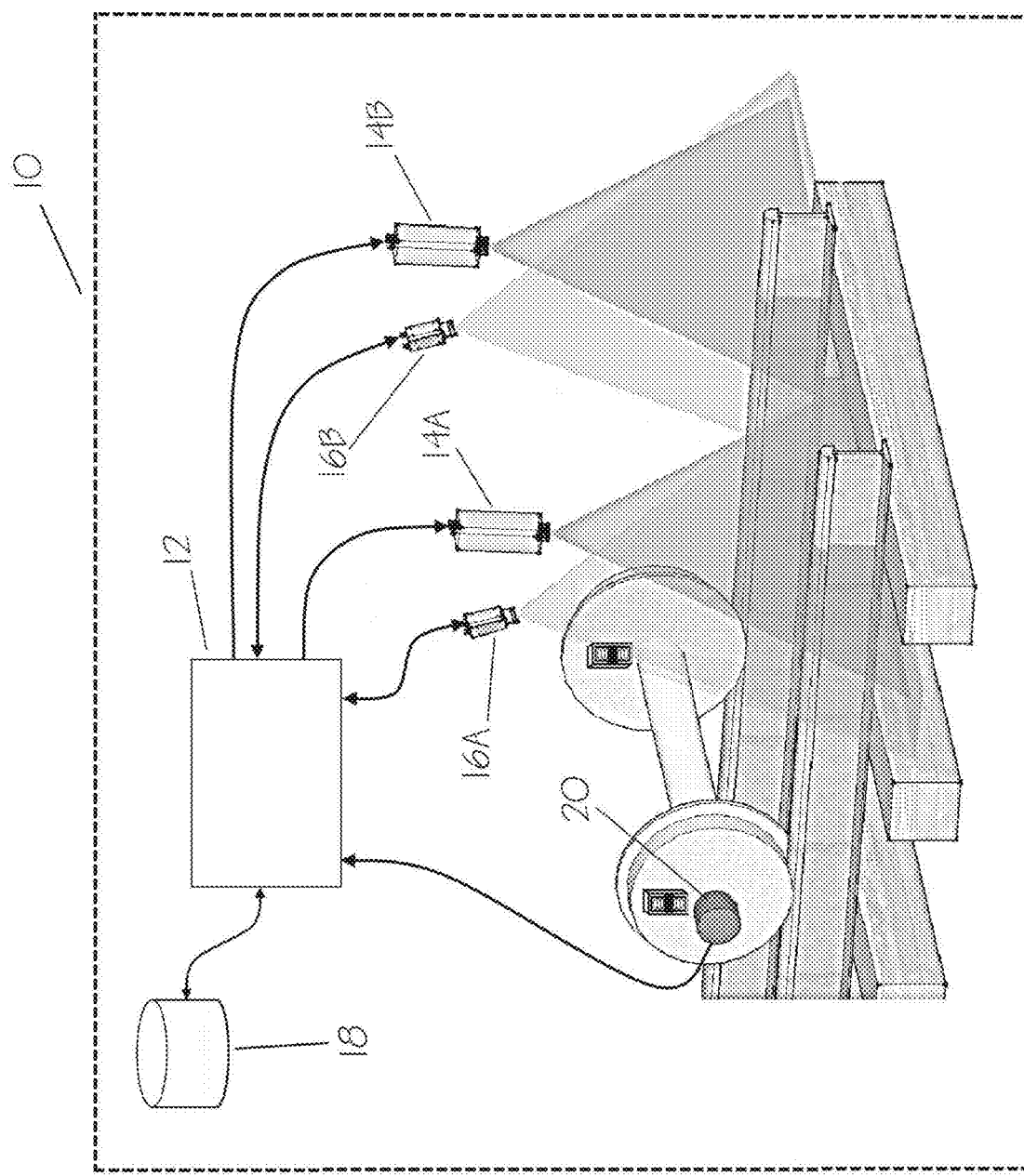
FIG. 1 shows a schematic view of a 3D track assessment system.

FIG. 1 shows a basic embodiment of a three-dimensional (3D) railway track assessment system ("3DTAS") 10 including a processor 12 in communication with a light line projector 14 (e.g., a laser) and one or more 3D sensors 16 for detecting light from the light line projector 14 that is reflected from a railway track bed. The sensors 16 detect elevation and intensity data and the data is stored in a data storage apparatus 18 in communication with the processor 12. The data storage apparatus may include volatile memory, non-volatile memory, or a combination thereof. 3D elevation and intensity data is preferably stored in the data storage apparatus 18 as a separate file for each sensor. Preferably, linear position references are logged for each recorded elevation profile using a high resolution distance measuring encoder 20 in communication with the processor 12. The encoder, shown schematically in FIG. 1, preferably operates at a rate of at least 12,500 pulses per wheel revolution with a longitudinal distance of approximately 0.25 mm per pulse.

Figure 2:
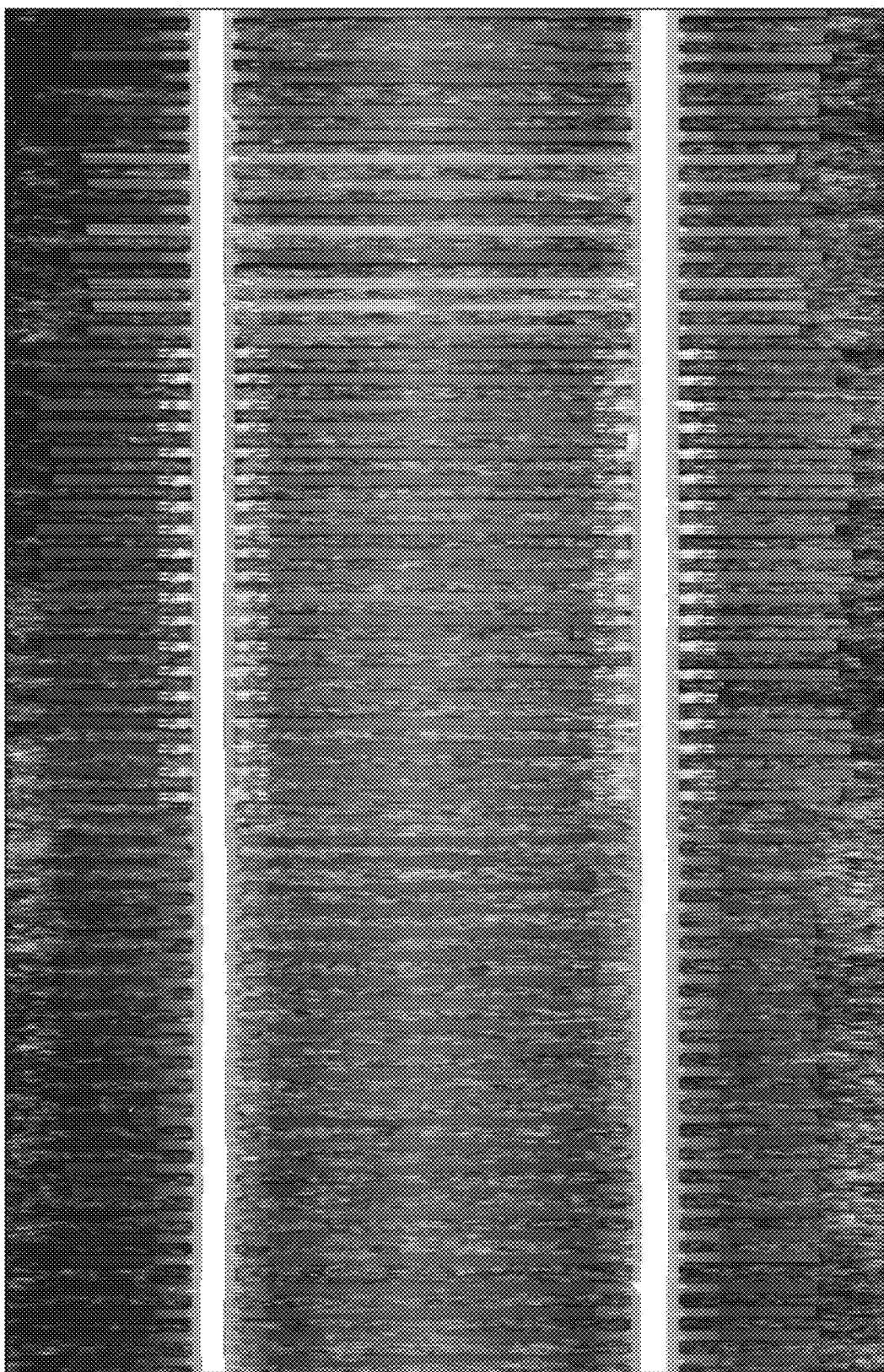
FIG. 2 shows an image of a full track width elevation and intensity profile.

Preferably, a first sensor 16A is used to detect reflected light along a first rail and a second sensor 16B is used to detect reflected light along a second rail. The data is then combined for both rails to provide a full elevation and intensity profile of the full width of a railway track bed as shown for example in FIG. 2. These full profiles are also referred to as 3D elevation maps.

Following generation of full width 3D elevation maps, analysis including automated processing is completed to extract objective, repeatable, and accurate measures for detected features of interest. This analysis can be performed by the processor 12 or a separate processor separate from the system 10 by taking the data gathered by the system 10 and analyzing it. The identification of features is based on the definition and identification of unique 3D feature attributes of a railway track bed as discussed in more detail below. Track beds can be simplified as being comprised of rails, crossties (ties), ballast, and other track materials (OTM) and crossings. The 3DTAS analysis approach is preferably hierarchical, starting with the identification of the rails, rail features, ties, tie features, ballast, ballast features, and finally OTM and crossings.

Figure 3:
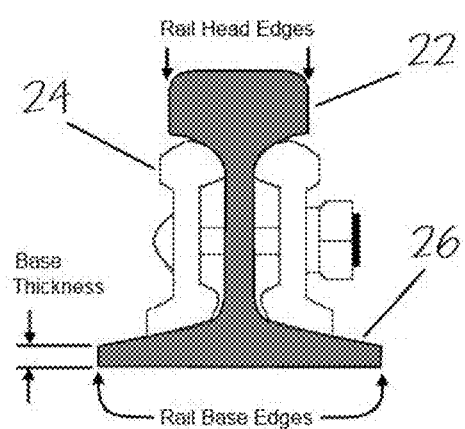
FIG. 3 shows a cross-sectional view of a rail and associated parts.

From a 3D perspective, rails include rail heads 22 (normally the highest elevation in the track bed structure), joint bars 24 (for jointed rail sections of track), and the rail base 26 as shown for example in FIG. 3. Once a rail head has been identified and located, the search regions for the other rail components and features can be efficiently minimized based on proximity to the rail head.

Figure 4:
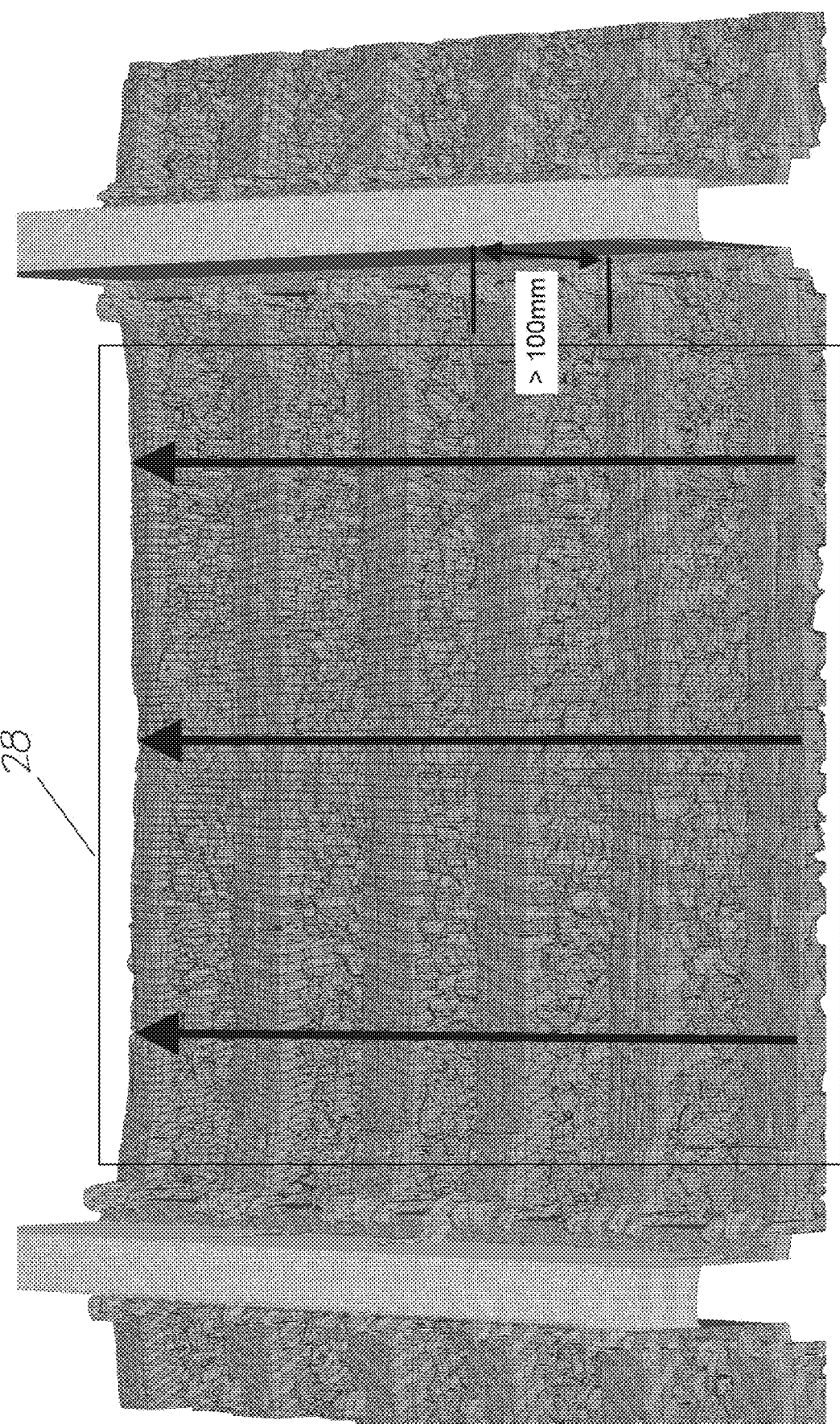
FIG. 4 shows an elevation and intensity profile including rails and an approximated tie surface plane.
Figure 5:
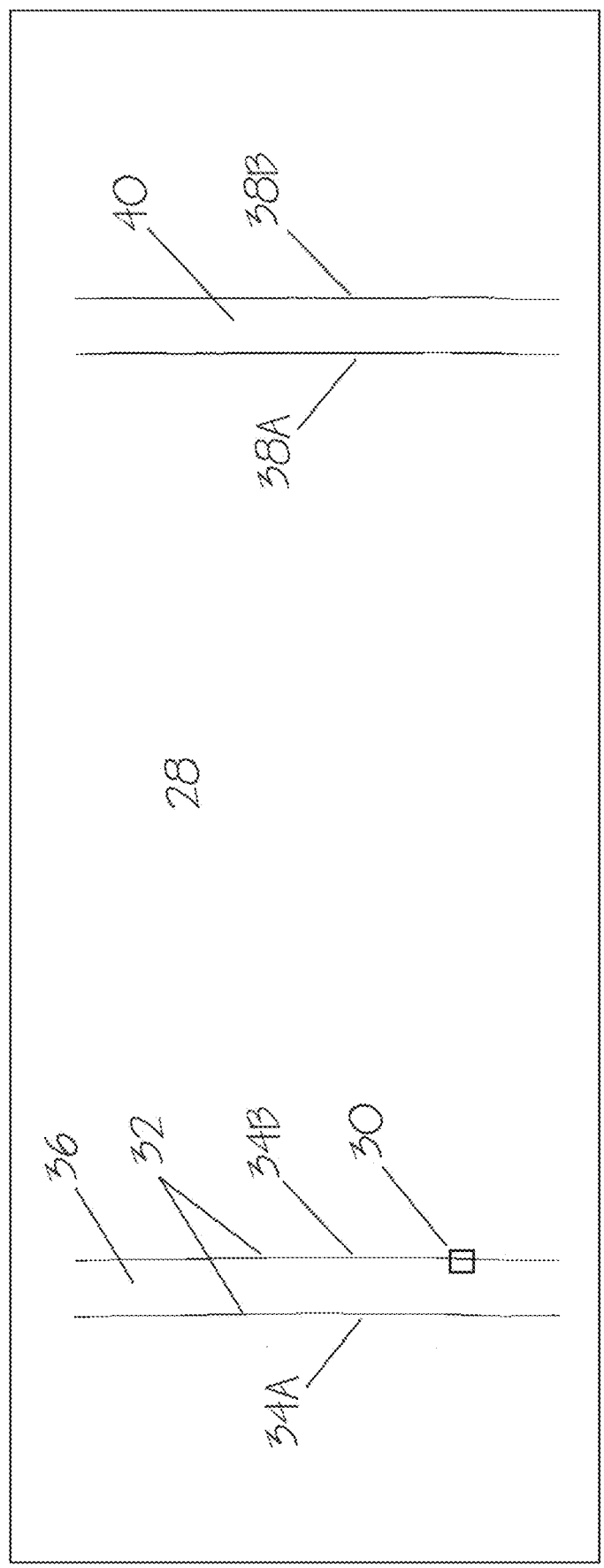
FIG. 5 shows an image including rails and ties and a sliding neighborhood used for track bed analysis.

The methodology for the identification of the rail head 22 is based on the detection of significant (large vertical component) longitudinal edges over a 2D area. In the case of the 3DTAS methodology, a detected 3D gradient magnitude for a given area must exceed a minimum rail height threshold (height of the detected edge above a calculated tie plane surface 28 as shown for example in FIG. 4). This edge analysis method calculates 3D gradient measures over zone of limited area referred to as a "neighborhood" that is applied in a sequential sliding and exhaustive fashion over the entire region to be processed. A suitable neighborhood 30 as shown in FIG. 5 is preferably a 10 mm×30 mm gradient area. Rail head edges 32 are identified as those features with significant vertical gradient edges (e.g., a gradient greater than about 80 mm), with an elevation greater than a minimum height (e.g., about 100 mm) above the estimated plane of the tie surface 28.

Calculation of the 3D gradient and thresholding allows the unambiguous identification of rail head edges as track features located above the calculated tie plane surface 28 having elevation gradients greater than a minimum height, preferably, 100 mm. Left and right edge targets are identified for both rails such that a first left rail edge 34A and a second left rail edge 34B is identified for a left rail 36 and a first right rail edge 38A and a second right rail edge 38B is identified for a right rail 40. This 3D gradient approach can be affected by atypical vertical component conditions such as foliage, track bed debris, and high ballast. The rail edge targets with suitable vertical gradients are preferably analyzed to identify outliers and eliminate those targets which are not located in valid rail edge lateral positions (based on defined rail head dimensions for example) and are not collinear with other edge targets. This method of robust rail head edge detection is able to correctly identify rail head edges regardless of lateral shifts in rail edge targets due to transverse test/survey vehicle movements during surveys (due to wide rail gauge or super elevated or curved sections of track for example). In cases in which a rail head edge is not detected, gaps in the detected rail head edges can be approximated using the valid edge measures before and after the missing segment and/or as a calculated offset from the edge on the opposite side of the rail head if the opposite edge has been detected.

Figure 6:
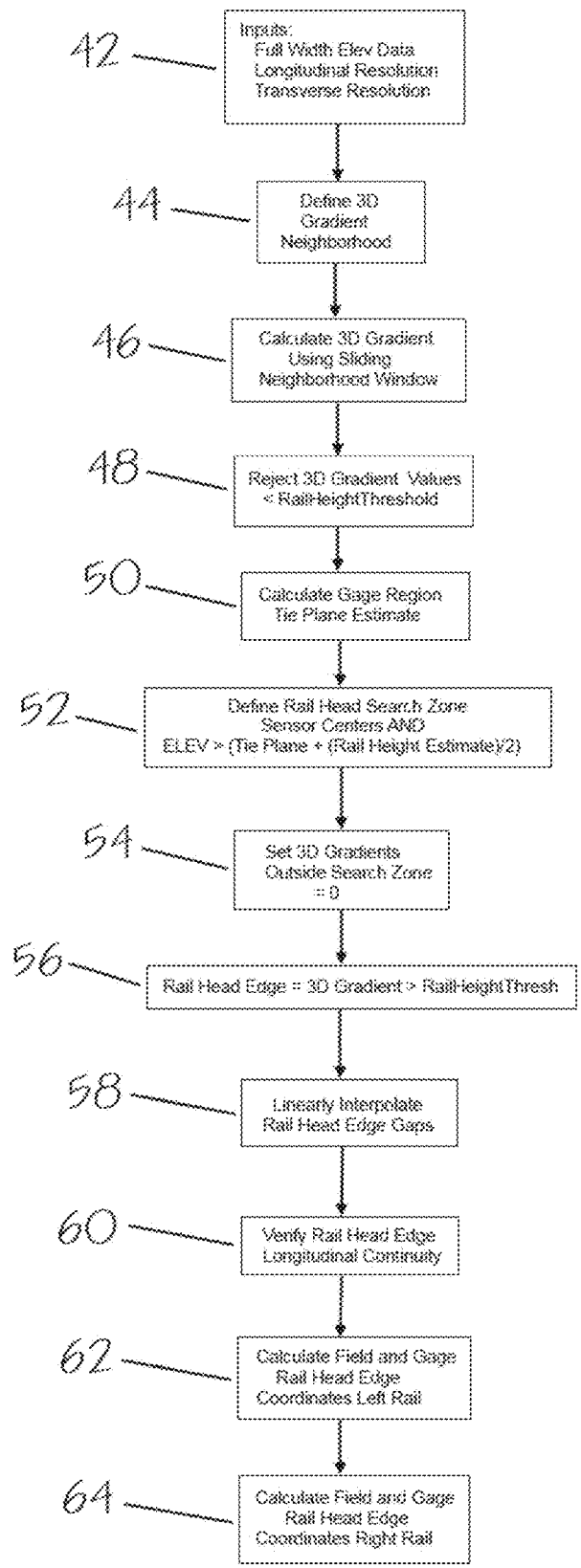
FIG. 6 shows a flowchart including a protocol used for rail head edge detection.

The processing steps for the 3DTAS rail head edge detection are provided in FIG. 6. The process steps are carried out by a program stored on a computer readable medium in communication with a processor. A first step (block 42) of the program includes inputting full width elevation data to a processor (e.g., the processor 12). An appropriate gradient neighborhood, is defined for vertical rail head edge features. This rail head edge neighborhood represents a small 2D track bed surface area over which differential vertical measurements are calculated (block 44), the example given herein is an area of 10 mm×30 mm. The gradient neighborhood is applied by the processor to the 3D elevation data and the area is moved like a window sequentially and completely for each position in the railway track bed elevation data (block 46). The resulting vertical gradient map represents the maximum 3D gradient at each elevation map measurement point. Vertical gradient values less than a predefined minimum rail height threshold are eliminated from the vertical gradient map, leaving only significant vertical gradient features (block 48). A estimate of the crosstie surface elevation between the rails is calculated (block 50) based on a simple statistical analysis of the track bed elevation (median or mean for example) and using typical rail dimensions to eliminate regions of the track bed surface which are outside expected tie surface elevations (too high or low). A rail head edge feature search zone is defined (block 52) based on the 3D measurement sensor 14 position and the presence of features with significant elevations above the estimated crosstie plane elevation (for example elevations greater than one half of typical rail heights above the estimated tie plane surface elevation). The rail head search zone is extended outward (made larger) to ensure no rail edge features are missed due to debris, vegetation or high ballast for example. Any calculated 3D vertical gradients outside of the defined rail head search zones are set to zero (eliminated) (block 54). Rail head edge targets are defined as locations where the magnitude of the 3D gradient values exceed a minimum Rail Head Height Threshold (block 56). Continuous rail edges are defined using standard interpolation methods to infill and remove outliers for each of the four linear (in the direction of travel) 3D gradient edge target datasets (based on lateral position of the targets relative to the 3D sensors 14A and 14C) representing the field and gage edges for the left and right rails (block 58). Following interpolation, the continuity of each rail head edge is verified (block 60) and the detailed linear and spatial referencing for the 3D elevation and corresponding calculated gradient data are used to determine coordinates from the rail head edges for both the left (block 62) and right (block 64) rails.

Figure 7:
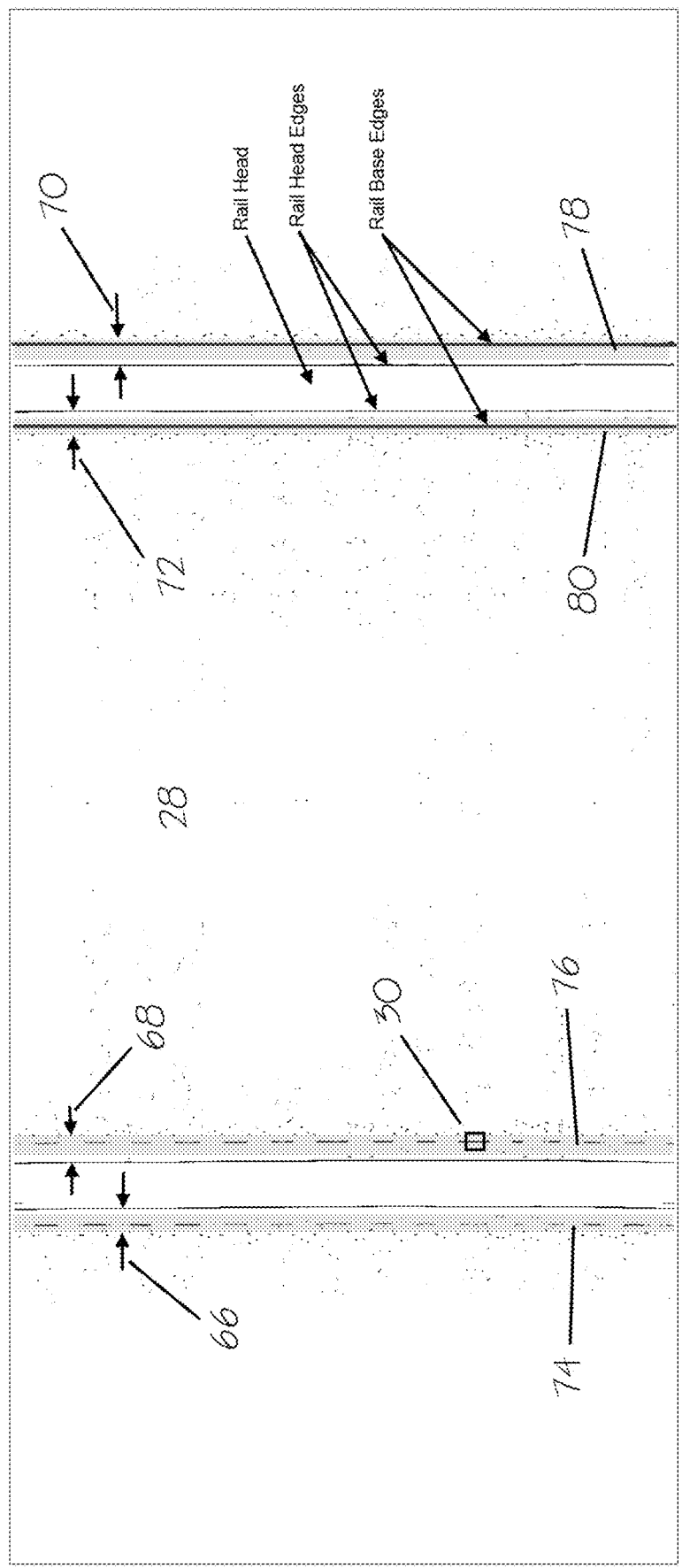
FIG. 7 shows an image of a track bed including a left rail field side base area, a left rail gage side base area, a right rail field side base area and a right rail gage side based area.

Once the rail head edges have been located, the 3D gradient is then examined separately for the field and gage side of each rail head. The valid field and gage rail base search areas are defined based on pre-defined distance offsets from the corresponding rail head edge locations. The search areas include a left rail field side base area 66, a left rail gage side base area 68, a right rail field side base area 70 and a right rail gage side based area 72 as shown in FIG. 7. Similar to the approach used to locate the rail head edges, the rail base detection uses 3D gradient detection and identifying vertical gradients greater than a specified height (about 25 mm for example) using a defined neighborhood 30 as a sliding window applied exhaustively across the rail base search area in the elevation data. Potential gradient targets are disregarded for features outside of the search area and for track components with elevations not within a specified elevation range (e.g., 80 mm) above the estimated tie plane surface elevation 28. Field and gauge (left and right) rail base edge targets are identified for both rails including a left rail field base edge region 74, a left rail gage base edge region 76, a right rail field base edge region 78, and a right rail gage base edge region 80.

This 3D gradient approach is affected by areas with insufficient gradients such as locations with ties beneath the rail base, and atypical conditions such as foliage, track bed debris, and high ballast. The rail base targets with suitable vertical gradients are preferably analyzed to identify outliers and eliminate those targets which are not located in valid rail base edge lateral positions (based on defined rail base dimensions for example) and are not collinear with other base edge targets. This method of robust rail base edge detection is able to correctly identify rail base edges regardless of lateral shifts in base edge targets due to transverse test/survey vehicle movements during surveys (due to wide rail gauge or super elevated or curved sections of track for example) or changes in rail type or dimensions. In cases in which a rail base edge is not detected, gaps in the detected base edges can be approximated using the valid edge measures before and after the missing segment and/or as a calculated offset from the edge on the opposite side of the rail base if the opposite edge has been detected.

Figure 8:
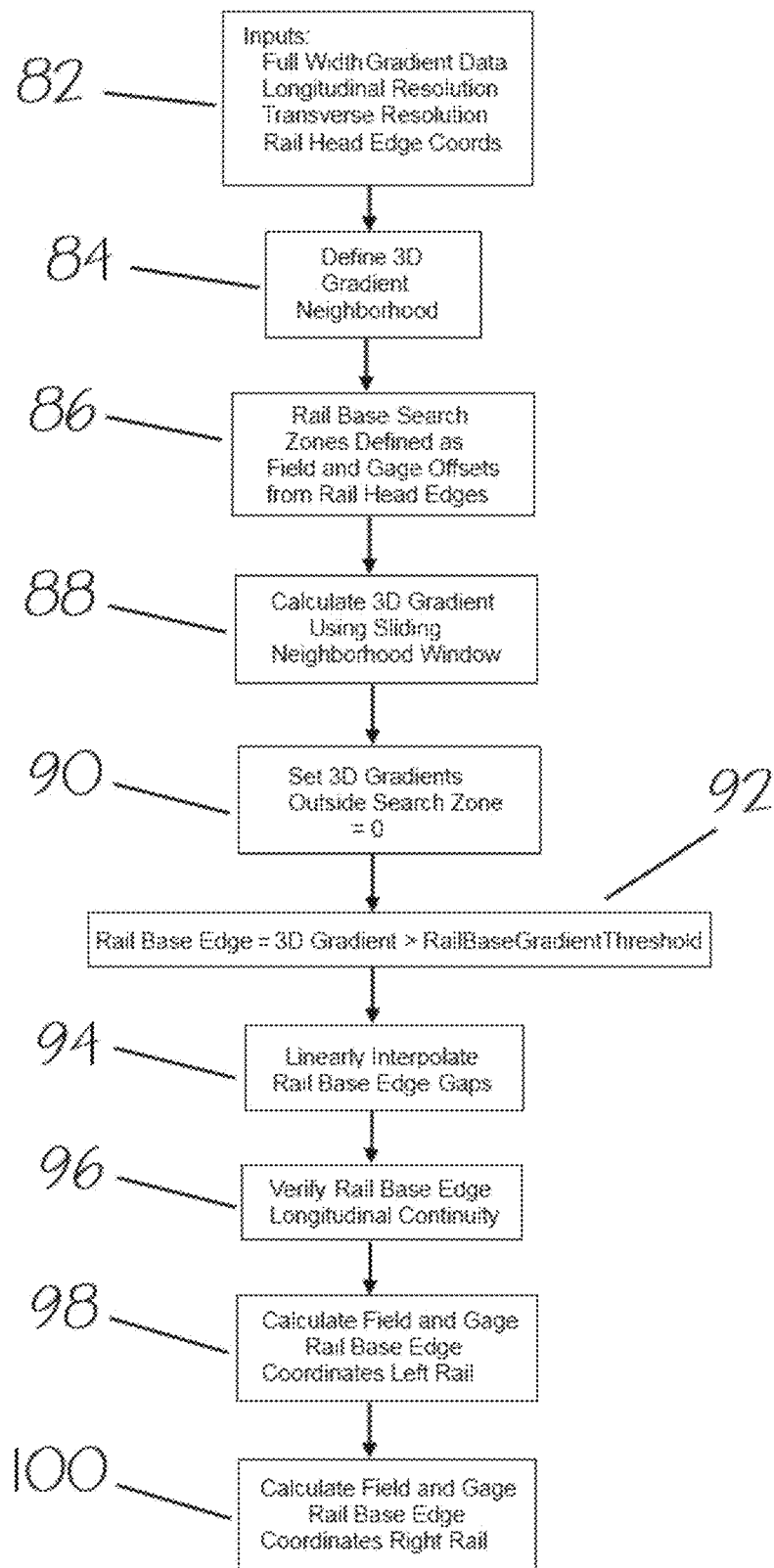
FIG. 8 shows a flowchart including a protocol used for rail base edge detection.

FIG. 8 shows a flowchart of processing steps for determining the location of rail base edges. The process steps are carried out by a program stored on a computer readable medium in communication with a processor. A first step (block 82) of the program includes inputting full width elevation data and previously determined rail head edge feature coordinates to a processor. An appropriate gradient neighborhood, is defined for vertical rail base edge features. This rail base edge neighborhood represents a small 2D track bed surface area over which differential vertical measurements are calculated (block 84), the example given herein is an area of 10 mm×30 mm. A rail base edge feature search zone is defined (block 86) based on the rail head edge coordinates and maximum rail base widths, resulting in field and gage maximum offset distances from the rail head. The gradient neighborhood is applied by the processor to the 3D elevation data and the area is moved like a window sequentially and completely for each position in the railway track bed elevation data (block 88). The resulting vertical gradient map represents the maximum 3D gradient at each elevation map measurement point. Any calculated 3D vertical gradients outside of the defined rail base search zones are set to zero (eliminated) (block 90). Small vertical gradient values within the search zone are eliminated, leaving only significant 3D gradient values which exceed a minimum Rail Base Gradient Threshold (block 92). Continuous rail base edges are defined using standard interpolation methods to infill and remove outliers for each of the four linear (in the direction of travel) rail base edge target datasets (based on lateral position of the targets relative to the identified rail head edges) representing the field and gage rail base edges for the left and right rails (block 94). Following interpolation, the continuity of each rail base edge is verified (block 96) and the detailed linear and spatial referencing from the 3D elevation and corresponding calculated gradient data are used to determine coordinates for the rail head edges for both the left (block 98) and right (block 100) rails.

In order for smaller features along a railway track bed to be more easily detected and categorized, it is preferable to remove rail head features from the 3D elevation maps. As such, using a processor such as, for example, the processor 12 of the system 10, the 3DTAS 3D analysis methodology preferably removes rail web and rail head elevation data to enhance 3D feature detection capabilities. By artificially (mathematically) eliminating the rail head component from the 3D track bed elevation maps, the 3D detection of the remaining smaller vertical components is enhanced. Large vertical dimension components tend to mask smaller features in close proximity. In the case of fastening systems, rail base welds, and anchors, elimination of the rail head is paramount for correct feature detection. This approach provides a significant performance improvement in the reliable detection of all other track bed 3D features of interest.

Figure 9:
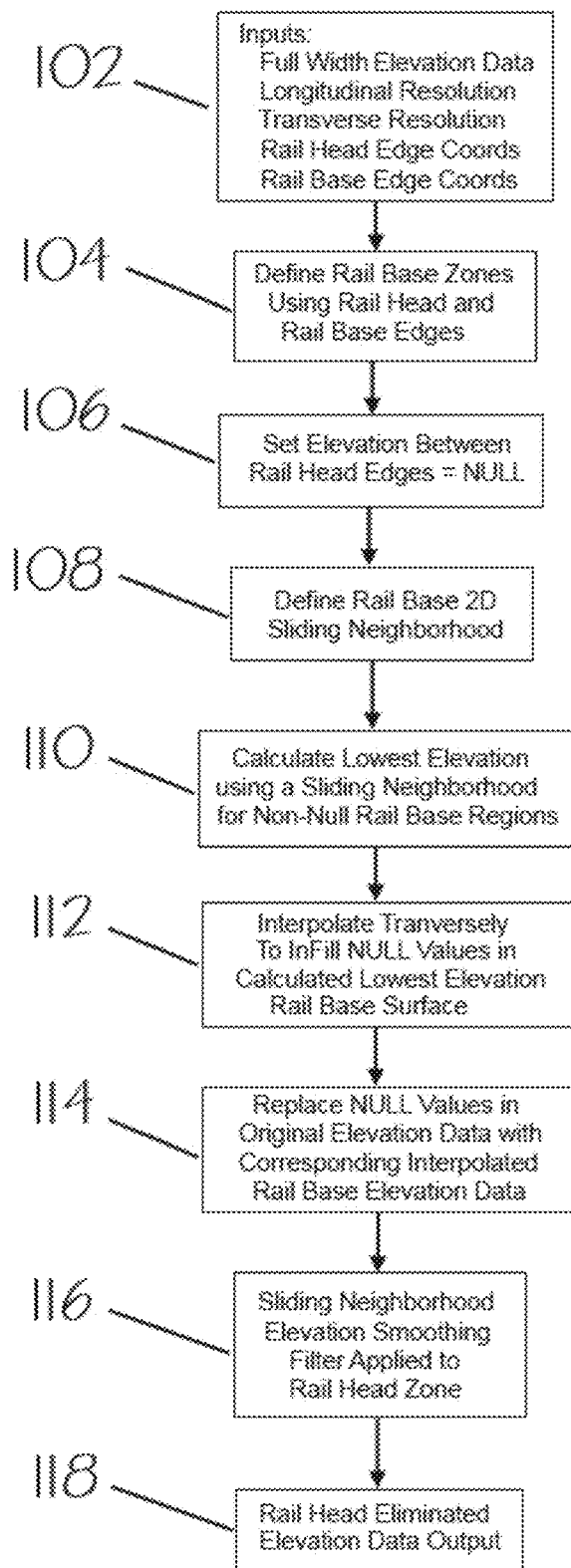
FIG. 9 shows a flowchart including a protocol for removing rail head features from a 3D elevation map.
Figure 10:
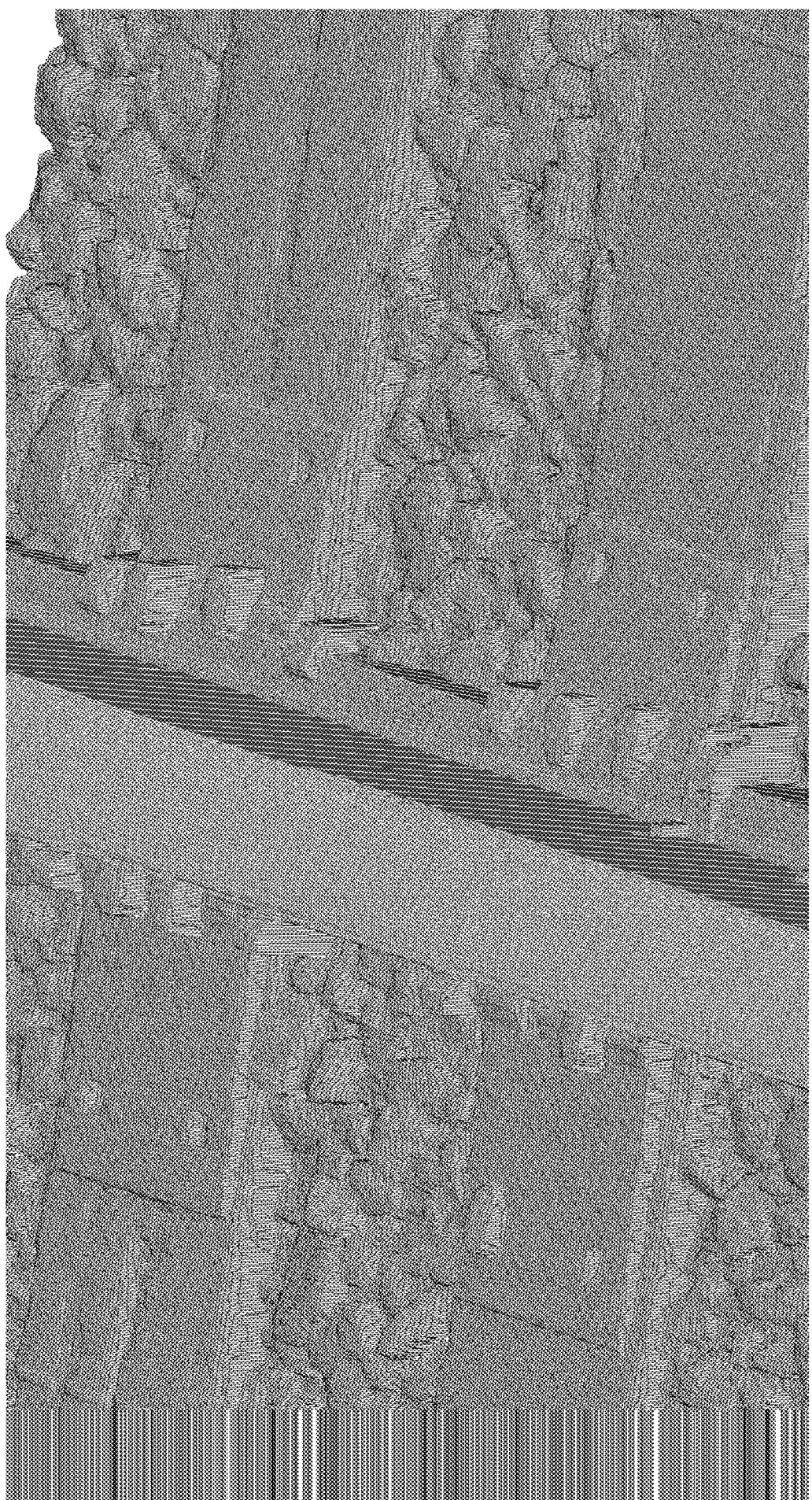
FIG. 10 shows an elevation map of a portion of a railway track bed before rail head data is removed.
Figure 11:
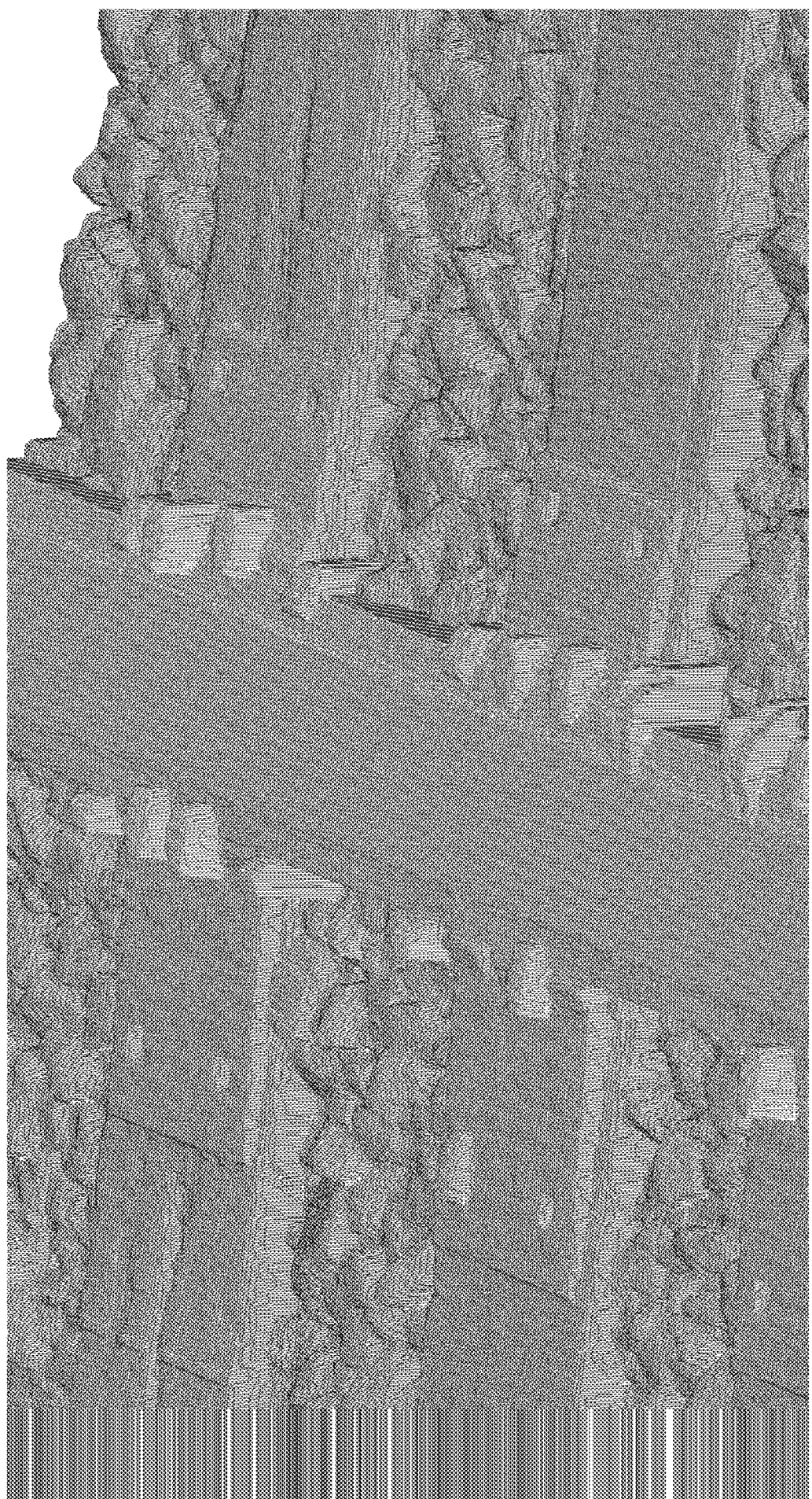
FIG. 11 shows an elevation map of a portion of a railway track bed after rail head data is removed.

The rail head elimination process is detailed in FIG. 9. The process steps are carried out by a program stored on a computer readable medium in communication with a processor. A first step (block 102) of the program includes inputting full width elevation data and previously determined rail head edge coordinates and rail base edge coordinates to a processor. Rail base surface zones are defined as the sections of the track bed elevation surface bounded by the rail head edges and rail base edges (block 104). The locations of the track bed elevation map corresponding to the rail head, the elevations in the region bounded by the left and right rail head edges for each rail, are set to NULL (block 106). An appropriate sliding neighborhood, is defined for the rail base zones. This rail base surface neighborhood represents a small 2D surface area over which statistical measurements are calculated (block 108), for example, an area of 10 mm×75 mm. The rail base surface neighborhood is applied by the processor to the 3D elevation data for each of the four rail base surface zones, one located on each side of both rails. The neighborhood area is moved sequentially and completely, like a window, for each position in the four rail base zones and the lowest elevation measure for each neighborhood is determined at each position (block 110). This process calculates the 2D neighborhood surface minimum for each rail base zone. Surface elevations are then calculated (block 112) between the rail base surface zones on either side of each rail by interpolating the minimum elevations calculated in block 110. The interpolated minimum elevations for each rail head zone (calculated in Block 112) are used to infill the rail head zone elevations previously assigned NULL values (block 114). A sliding neighborhood smoothing (averaging) filter is applied to the rail head zone for each rail (block 116). FIG. 10 shows an elevation map of a portion of a railway track bed before the rail head data is removed, and FIG. 11 shows the same section of track after the rail head elevation have been modified by interpolating the rail base surfaces on either side.

Figure 12:
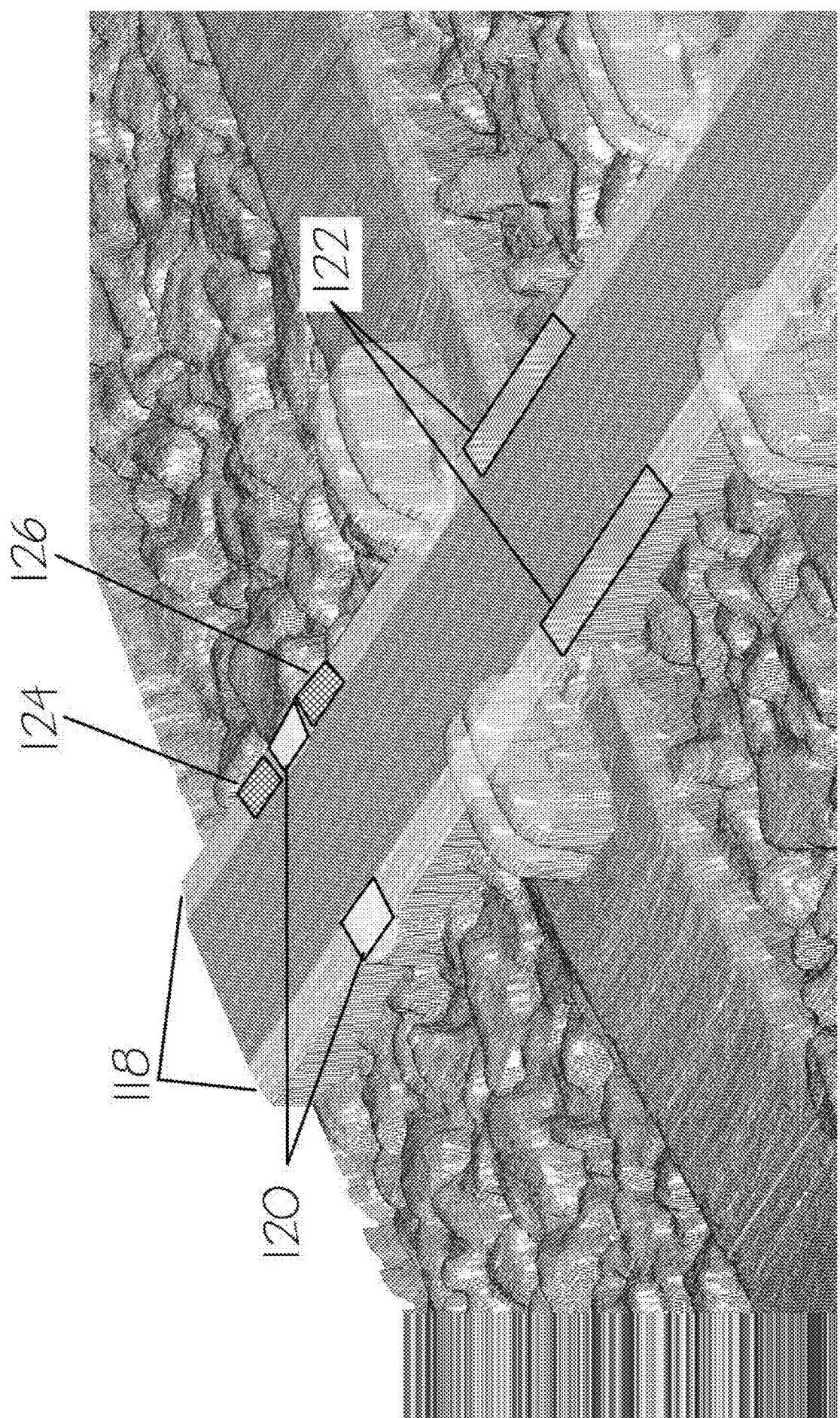
FIG. 12 shows a rail base zone highlighting a vertical surface feature.

A rail base zone 118 as highlighted, for example, in FIG. 12, can be defined as the region between the rail head and rail base edges. Once the rail head/base edge detection has been completed, the rail base regions can be defined. Any significant vertical surface features not attributable to a fastening system (for example not in the proximity of a supporting crosstie or in proximity of a crosstie and not matching any known fastener type) can be identified as potential weld artifact features 120 as shown, for example, in FIG. 12. Vertical surface features that deviate from a planar approximation of a typical rail base surface are defined as vertical deviations. A planar surface approximation is calculated as the surface generated from the collection of minimum elevation values for a sliding neighborhood 122 (shown in FIG. 12) moving along the rail base surface region with a length greater than the feature of interest (for example 75 mm representing a length 3 to 4 times longer than typical rail base weld features). Any features with a vertical deviation of greater than a system defined rail base deviation threshold (about 5 mm in this example) detected for the entire rail base surface region width and occurring on both sides of the rail are identified by the system 10 as a rail weld feature. The rail base vertical offset difference calculated from a first surface elevation 124 and a second surface elevation 126 on either side of the weld location are determined and retained for each weld location. This data is position referenced and is stored in a data storage apparatus. Any significant difference of rail base surface elevations indicates a vertical misalignment across the rail weld. Calculated and measured weld parameters include physical dimensions (height, width), rail base differential height across the weld, and distance from leading and trailing ties (shown in FIG. 12). These parameters are retained for both the left and right rail base surfaces and stored in a data storage apparatus.

Figure 13:
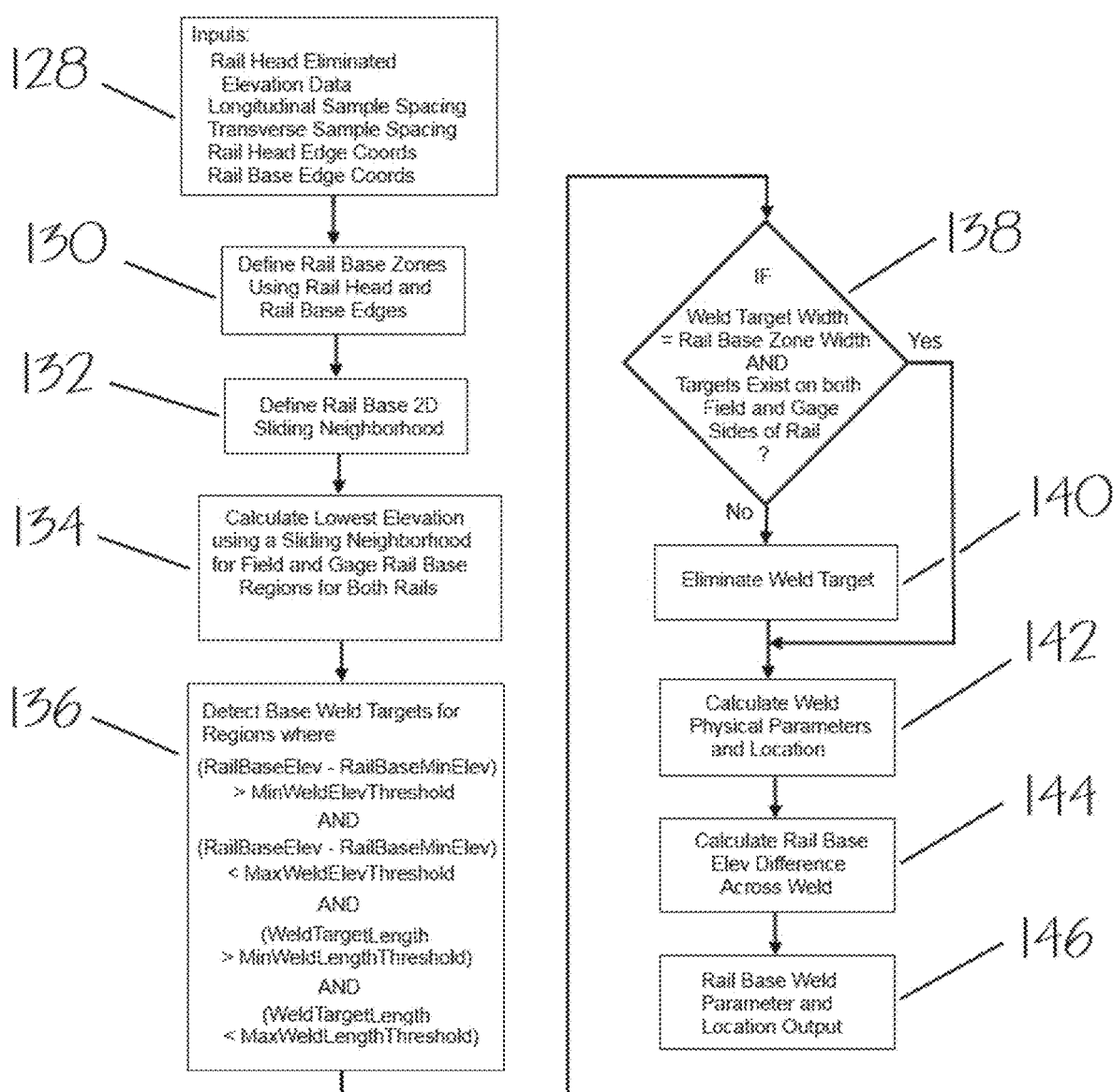
FIG. 13 shows a flowchart including a protocol for detecting rail base weld features.

FIG. 13 shows a flowchart detailing the process steps of the rail base weld features detection method described above. The process steps are carried out by a program stored on a computer readable medium in communication with a processor. A first step (block 128) includes inputting various data sets to a processor including elevation data wherein significant elevations due to the rail heads for each rail have been removed, rail head edge coordinates, and rail base edge coordinates. Rail base surface zones are defined as the sections of the track bed elevation surface bounded by the rail head edges and rail base edges (block 130). An appropriate sliding neighborhood, is defined for the rail base surface zones. This rail base surface analysis neighborhood represents a small 2D surface area over which elevation measurements suitable for weld detection are calculated (block 132), for example, an area of 10 mm×75 mm. The rail base surface neighborhood is applied by the processor to the 3D elevation data for each of the four rail base surface zones, one located on each side of both rails. The neighborhood area is moved sequentially and completely, like a window, for each position in the four rail base zones and the lowest elevation measure for each neighborhood is determined at each position. This process calculates the 2D neighborhood surface minimum for each rail base zone. Weld feature targets are defined as those localized regions with surface elevations which are within maximum and minimum thresholds with respect to the calculated minimum rail base surface elevations, and whose length is within the maximum and minimum length threshold for weld features (block 136). Following the identification of Weld Targets for each separate rail base surface zone, the presence of targets on both rail base surfaces on either side of each rail (block 138). Weld targets not occurring on both sides of either rail, are eliminated (block 140). Weld feature targets occurring on the rail base surfaces on both sides of a rail, are paired as a single weld feature and physical parameters (location, length, width, height, proximity to crossties for example) are determined and stored (block 142). The rail base surface elevations are analyzed on both sides of each weld feature and the elevation differential across the weld is calculated for both sides of each rail (block 144). This elevation differential data is stored with the other physical data for each weld feature.

Flat surface regions are a typical characteristic of constructed materials including many components of interest found in railway track beds. The ability to identify planar regions is required for manmade feature identification and classification. The 3DTAS post-processing system uses a sophisticated approach to the identification of planar surfaces including calculating the magnitude of a vertical surface normal component from a 3D surface gradient acquired from 3D elevation data. The 3D gradient quantifies the variations in the surface elevation within a sliding neighborhood for an entire surface elevation map. In the example analysis included here, the localized 2D neighborhood over which the gradient is calculated is 5 mm transverse×15 mm longitudinal. Localized deviations in surface elevations produce significant variations in localized gradient values, which produce low vertical surface normal values. Planar regions produce insignificant vertical gradient variations which results in significant or large vertical surface normal values.

Figure 14:
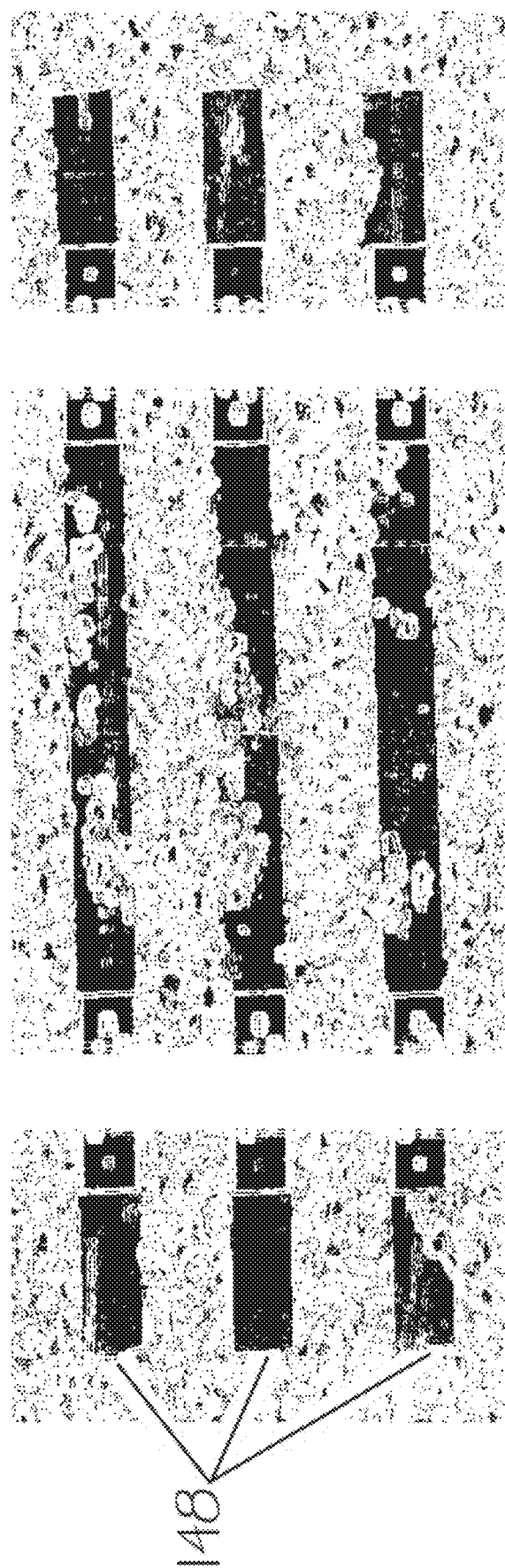
FIG. 14 shows an image or a track bed including areas with high surface normal values (flat planar regions) and light colored areas indicate low surface normal values (uneven or rough regions)

Calculating vertical surface normal values allows the efficient differentiation between manmade features and natural features of a track bed 3D surface elevation map. In particular this method effectively differentiates between the natural ballast stone and ties, plates and rails. FIG. 14 shows the results of 3DTAS planar region analysis using 3D surface elevation gradient and surface normal calculations. The section of track bed in this example includes three wooden ties 148, with the rails removed from the data (by eliminating the track bed elevation data for zones defined between the rail base edge definitions). In FIG. 14, dark regions indicate areas with high surface normal values (flat planar regions) and light colored areas indicate low surface normal values (uneven or rough regions).

Figure 15:
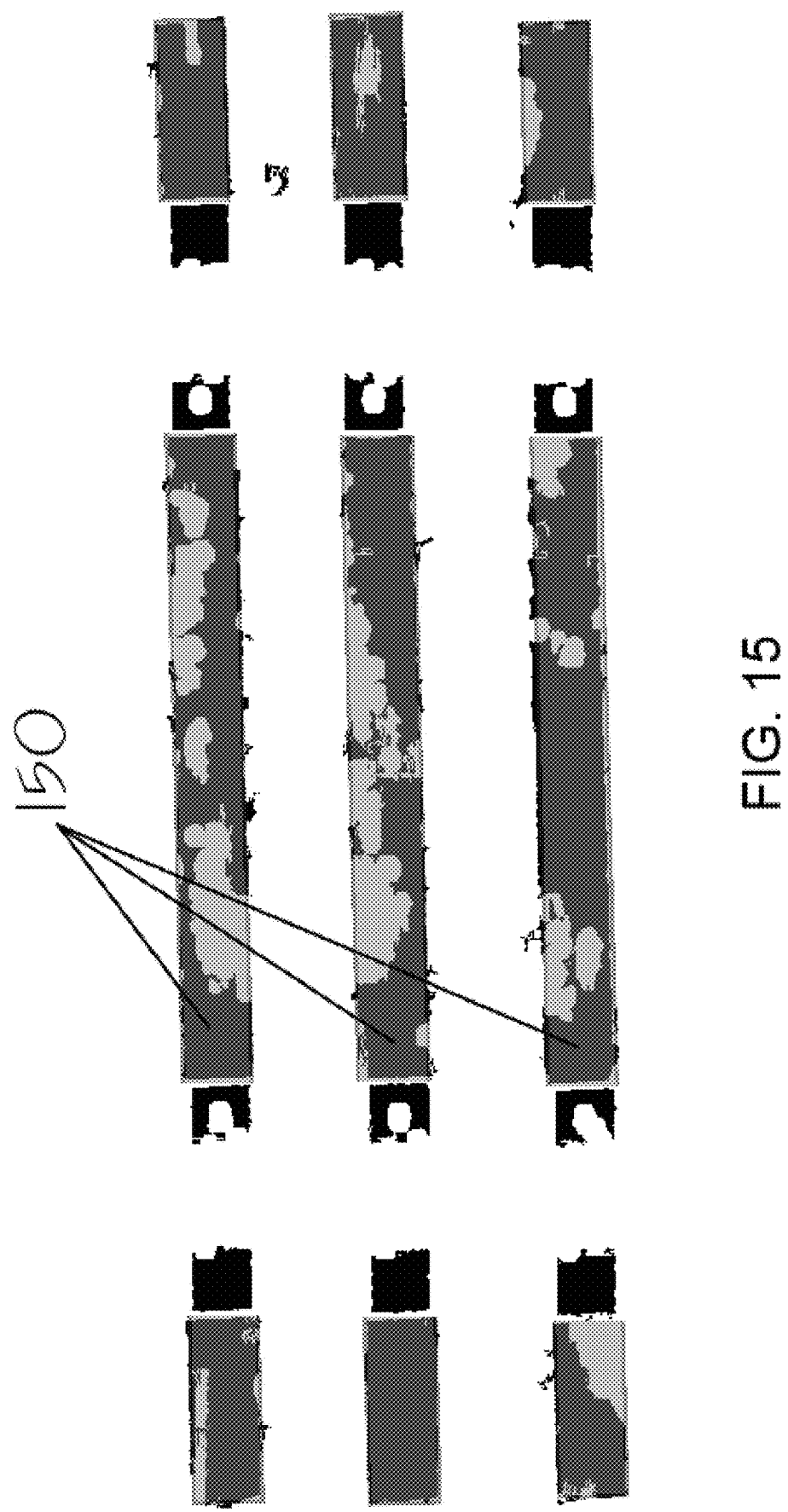
FIG. 15 shows an image of a track bed including large consolidated planar regions along the ties.
Figure 16:
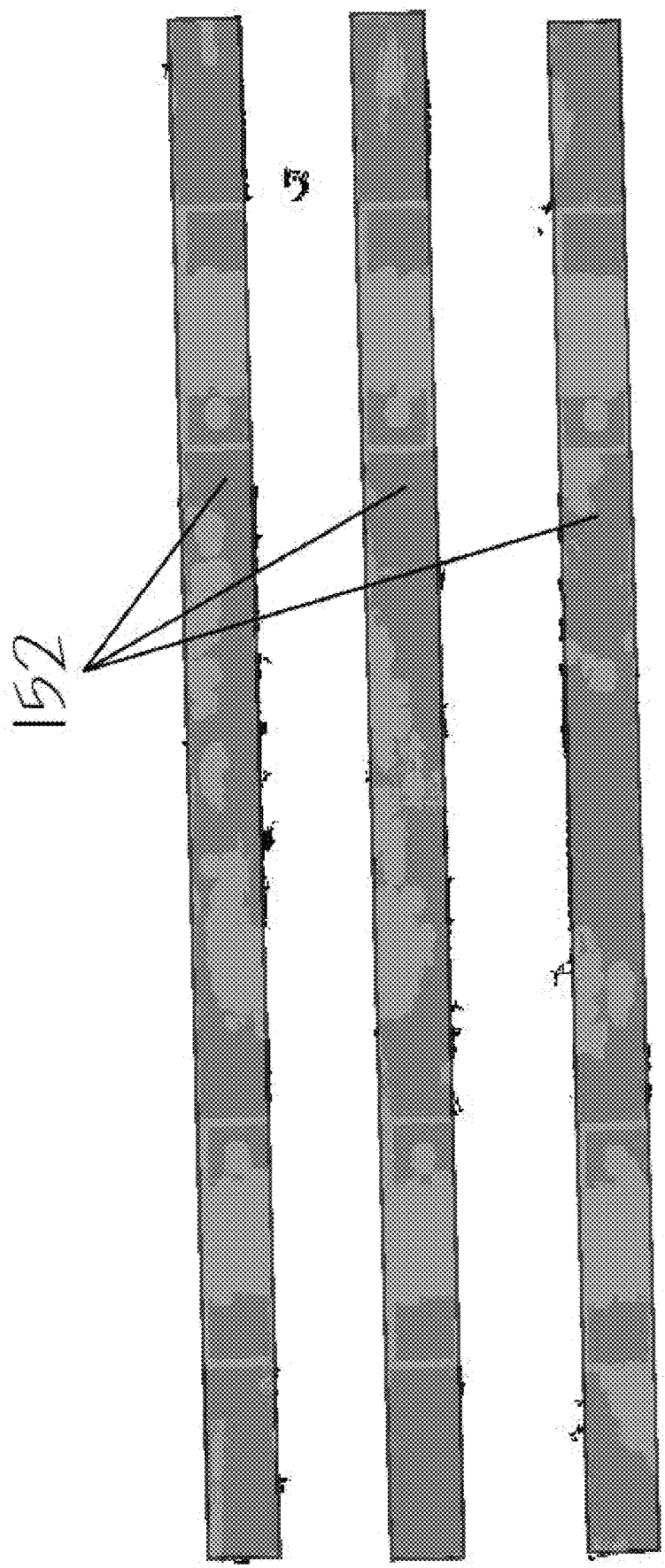
FIG. 16 shows an example of consolidated planar regions and a resulting approximated tie surface plane.

The planar region analysis described herein consolidates all significant regions (i.e., regions with greater than a minimum surface area threshold) with high surface normal values (i.e., surface normal values greater than a planar region surface normal threshold) that are in close proximity to one another (i.e., less than a maximum proximity threshold). Large consolidated planar regions 150 are shown, for example, in FIG. 15. Following the consolidation of the planar regions, the elevation values are used to generate an approximating surface plane. In the case of wood tie track bed sections, the tie plate regions around each rail are preferably excluded. One example of consolidated planar regions and the resulting approximated tie surface plane 152 is shown in FIG. 16.

Figure 17:
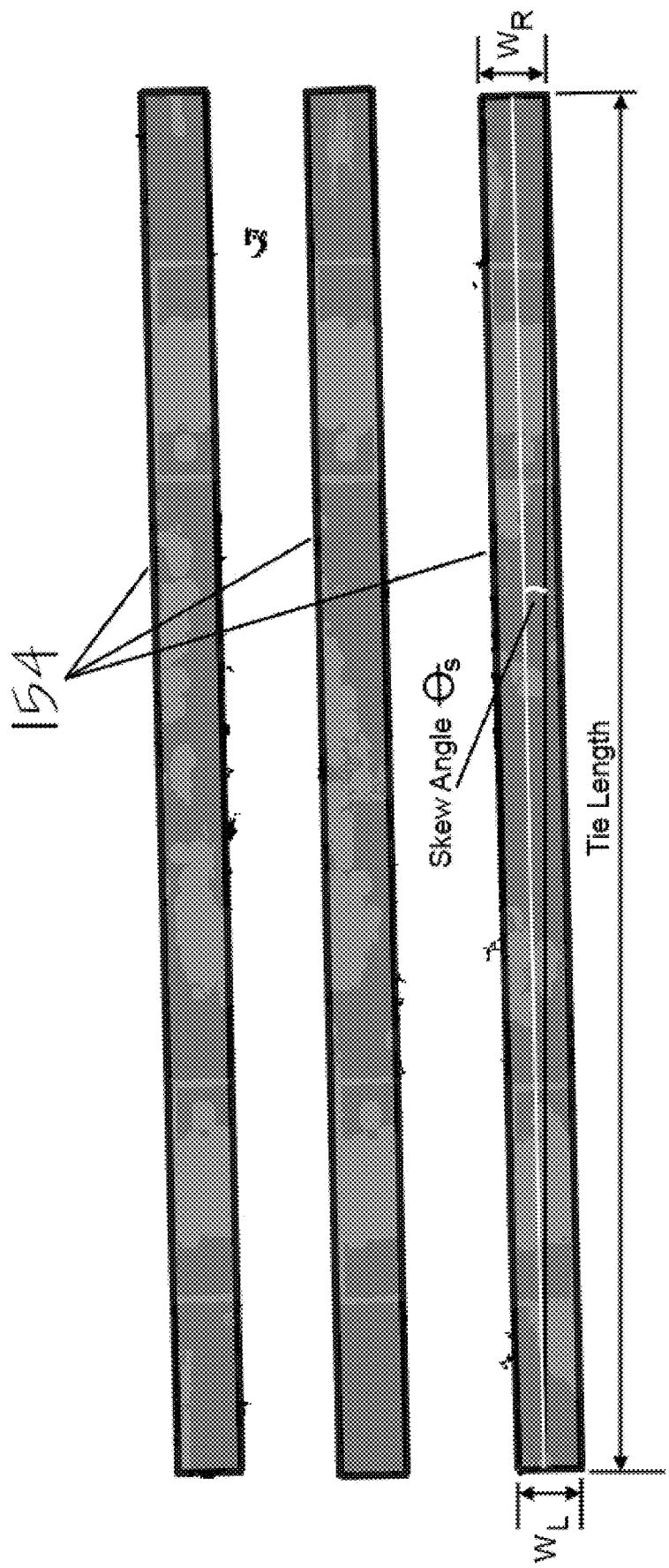
FIG. 17 shows physical edge boundaries of a plurality of detected ties.

The surface plane closely approximates a new tie surface and the planar approximation is used to identify other track features and calculate parameters of interest. These features include tie bounding box definitions (including tie physical dimensions such as length, width and skew angles), fastening systems, and tie condition. To acquire a tie bounding box definition the consolidated planar regions are preferably combined with the surface plane approximation shown in FIG. 16 and standard tie physical models (length and width parameters) to produce the physical edge boundaries of each detected tie (a tie bounding box 154) as shown in FIG. 17. The bounding box definition method includes edge quality measures (to determine how linear each planar surface based tie edge is) and industry standard tie models to assist in correctly defining and orienting the bounding box in cases where the tie is damaged or broken.

Figure 18:
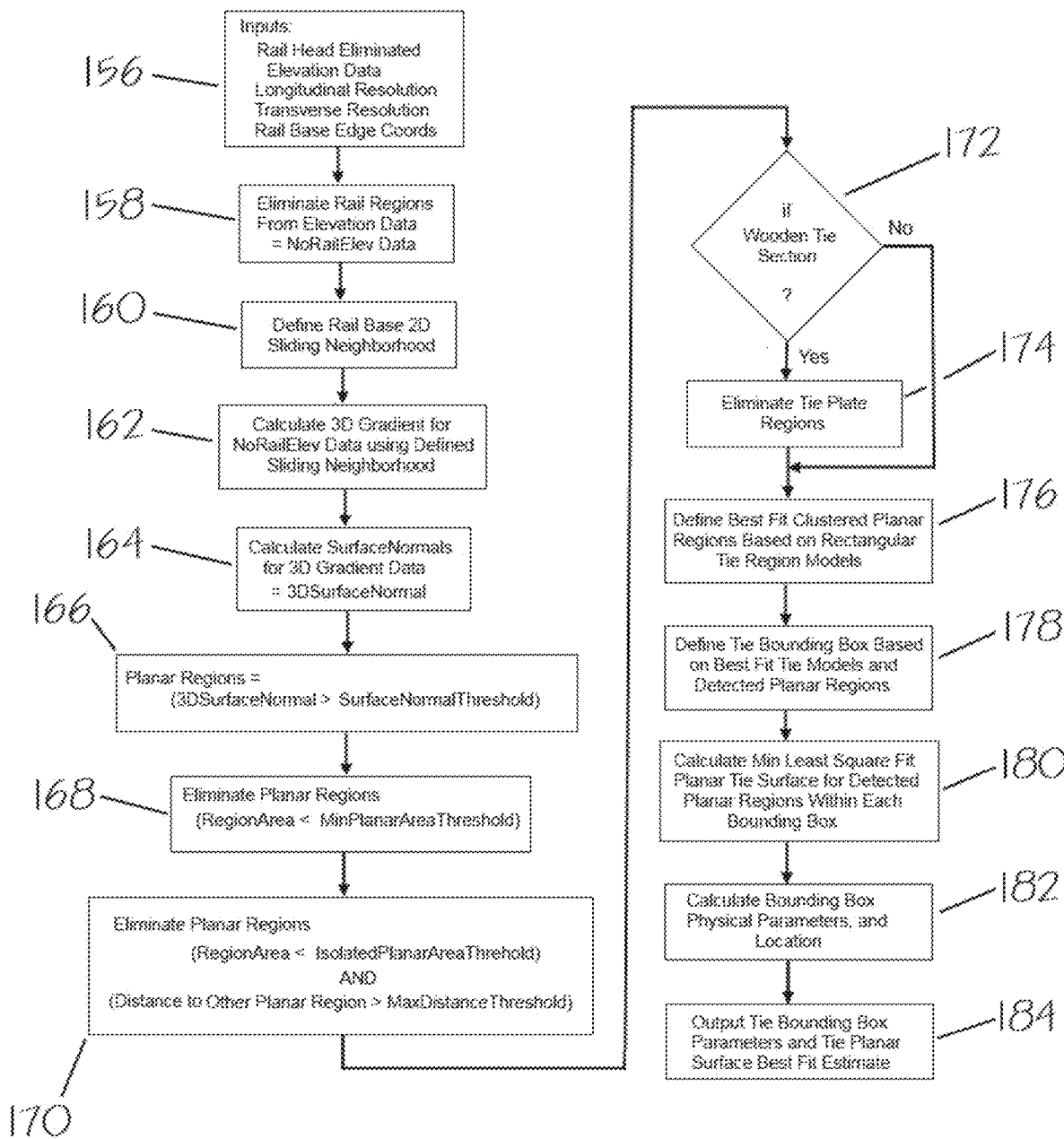
FIG. 18 shows a protocol for detecting and defining planar regions and for defining tie bounding boxes for detected ties.

FIG. 18 shows a flow chart including the method steps for detecting and defining planar regions and for defining tie bounding boxes. The process steps are carried out by a program stored on a computer readable medium in communication with a processor. The method includes a first step (block 156) of inputting various data sets to a processor including elevation data wherein the rail head data has been removed, rail head edge coordinates, and rail base edge coordinates. Using the rail base edge definitions for both rails, the elevation data for the region bounded by the rail base edges for both rails is set to NULL producing an elevation map (NoRailElev) that excludes the track bed rails from subsequent planar region processing (block 158). An appropriate sliding neighborhood, is defined for the smooth surface analysis. This rail smooth surface analysis neighborhood represents a small 2D surface area over which elevation measurements suitable for planar surface detection are calculated (block 160), for example, an area of 15 mm×15 mm. The smooth surface neighborhood is applied by the processor to the 3D elevation data with the rail region removed, to calculate the vertical deviation in each neighborhood. The neighborhood area is moved sequentially and completely, like a window, for each position and the elevation gradient for each neighborhood is determined at each position (block 162). Following the calculation of the track bed vertical gradient, a second sliding neighborhood based processing operation is performed to calculate the vertical surface normal vector for the elevation gradient map (block 164). Surface normal for elevation gradients produce larger vertical surface normals for flat surfaces and lower normals for rough or uneven surfaces. Planar track bed areas correspond to those areas which have a normalized surface normal value which exceeds a defined threshold (block 166), 0.75 for example. FIG. 14 shows an example of a segment of track bed containing three crossties which has been processed to highlight the plan areas. Small planar regions are subsequently discarded by eliminating those regions with a surface area less than a minimum area threshold (block 168). Further processing eliminates planar regions which are both isolated and have a surface area which is less than a minimum isolate region size threshold (block 170). An example of the results of this small region processing are shown in FIG. 15. If the track section includes wooden ties, estimated tie plate regions are defined and planar areas located in these plate regions are eliminated (block 172 and 174). Following consolidation or clustering of close proximity planar sections, Best Fit processing (block 176) of all available crosstie models are completed for each clustered planar region to define the best match tie model, as shown in FIG. 15. Following the selection of the best fit tie model for each set of clustered planar regions, the corresponding best fit bounding box (including position skew and lateral offset) is defined, as shown in FIG. 16. Once defined, the bounding box limits and planar region elevations are used to calculate the minimum least squared fit plane approximation of the collection of planar regions within the bounding box. This approximating planar surface represents an approximation for a like-new tie surface which is used to calculate tie physical parameters and to assess tie condition, as shown in FIG. 17.

Following planar region analysis, the calculation of a tie surface plane approximation and the definition of a tie bounding box, a detailed tie condition analysis is possible. The 3DTAS 3D tie condition assessment uses 3D deviations from an as-new tie condition estimate to objectively and accurately quantify and assess the current condition of a tie.

Figure 19:
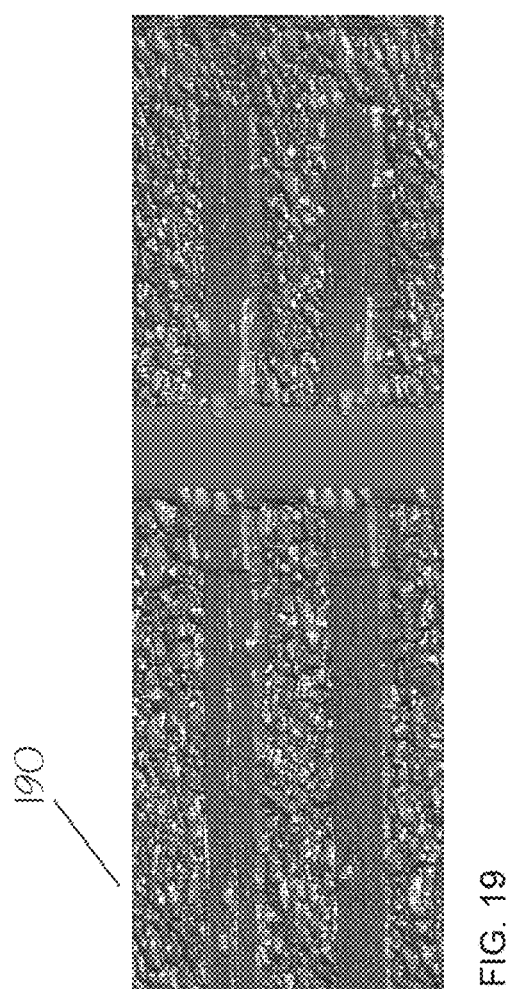
FIG. 19 shows a 3D elevation map for a section of track bed.
Figure 20:
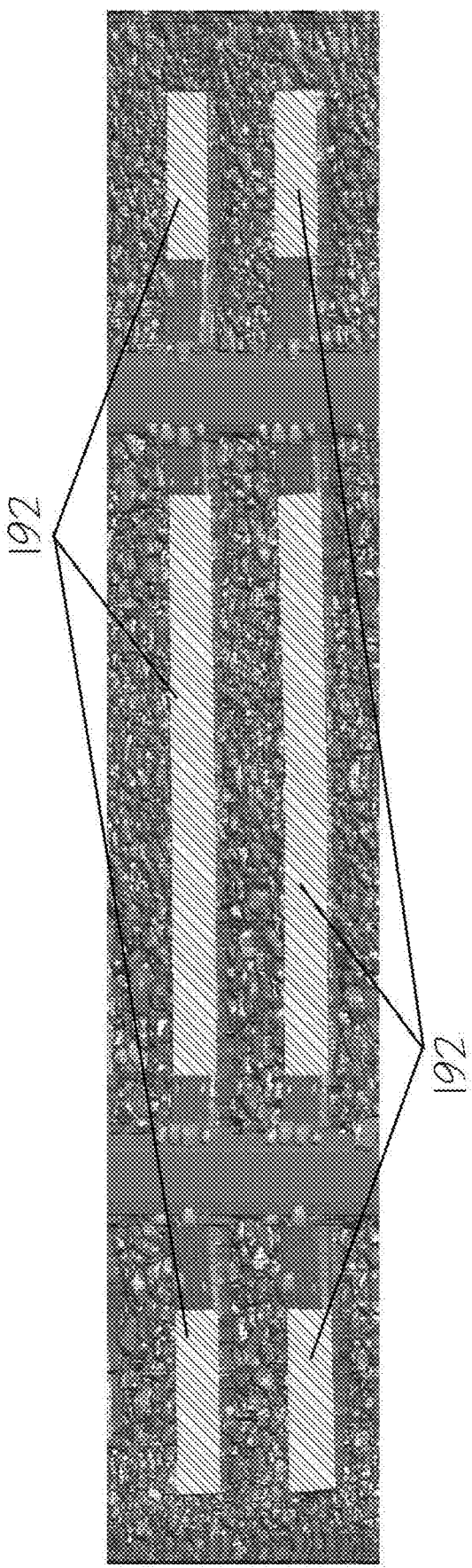
FIG. 20 shows an approximated tie surface plane (shaded area defined within the tie bounding box limits) overlaid on the surface of two wooden ties.
Figure 21:
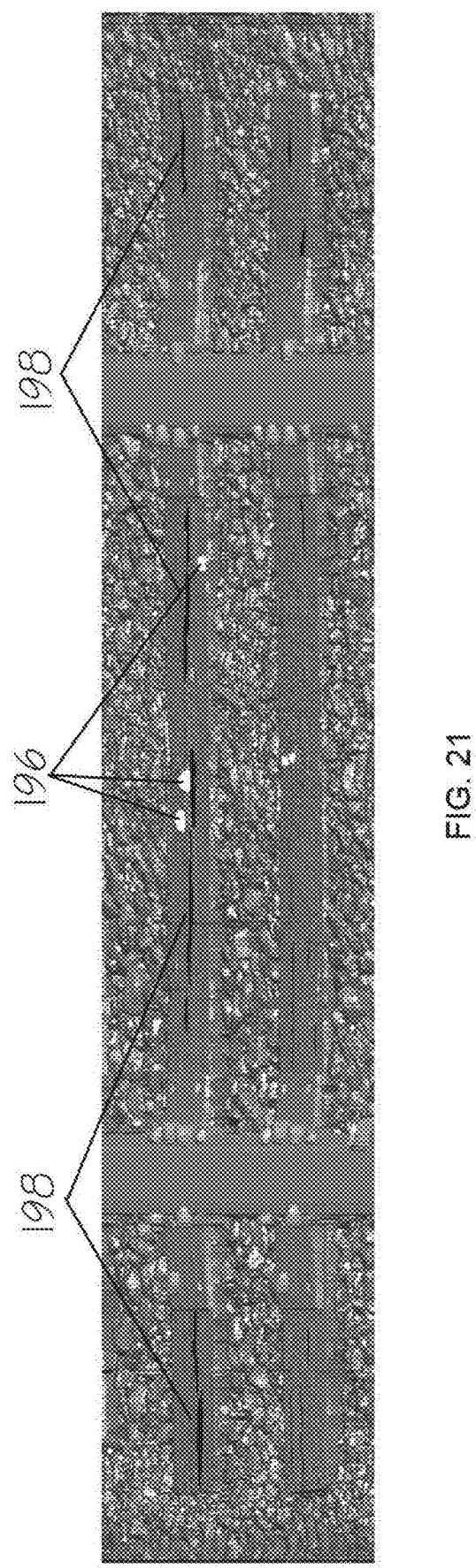
FIG. 21 shows a generated image including objects on a tie above the tie surface plane and tie surface cracks along the tie.

Given a 3D elevation map for a section of track bed 190 (as shown for example in FIG. 19), the planar analysis allows the calculation of an approximating tie surface plane and bounding box using the method described above. FIG. 20 shows an approximated tie surface plane 192 (shaded area defined within the tie bounding box limits) overlaid on the surface of two wooden ties 194. The tie surface plane 192 preferably excludes the rail and tie plate surfaces and includes the planar portions of the tie surface. Features which deviate vertically (by more than separate above surface and below surface vertical deviation thresholds) from this ideal surface can be identified and quantified. Objects on the tie above the tie surface plane 192 represent features on the surface of the tie such as ballast or debris 196 shown in FIG. 21. These features obscure the surface and the total hidden tie surface area represents an important parameter during tie condition assessment. Detected areas of the tie below the tie surface plane 192 (surface voids, or cracks) represent significant tie defects. The 3DTAS tie condition assessment method described herein identifies, locates and measures all surface cracks (voids) deeper than a minimum crack depth threshold and longer than a minimum crack length (extent) threshold. Examples of crack features 198 are shown in FIG. 21.

Each detected crack is analyzed for all 3D surface elevation points below the tie surface. Information recorded for each crack feature includes surface area (the area defined by the number of connected surface elevation measurement points forming the crack in its entirety), crack depth (min, max, mean and median deviation from the estimated tie surface plane to the depth at each crack measurement point), crack length (measured along the path of the crack), crack width (min, max, mean and median crack width for all points along the length of the crack), crack orientation (start point, end point, and the straight line approximation for the crack), and the crack location (defined by where on the crosstie the crack occurs; for example on either tie end, or the tie center between the rails). These parameters are used to establish an accurate and objective severity and extent distress measures for each crack. The severity determination includes additional rules for penalizing end break cracks, and orientations which pass through spike locations (and further penalizes if the affected spike height is above a nominal height threshold representing an unseated or elevated spike head). Crack severity is further increased if a crack extends from a tie end under the tie plate to the center section of the tie.

Figure 22:
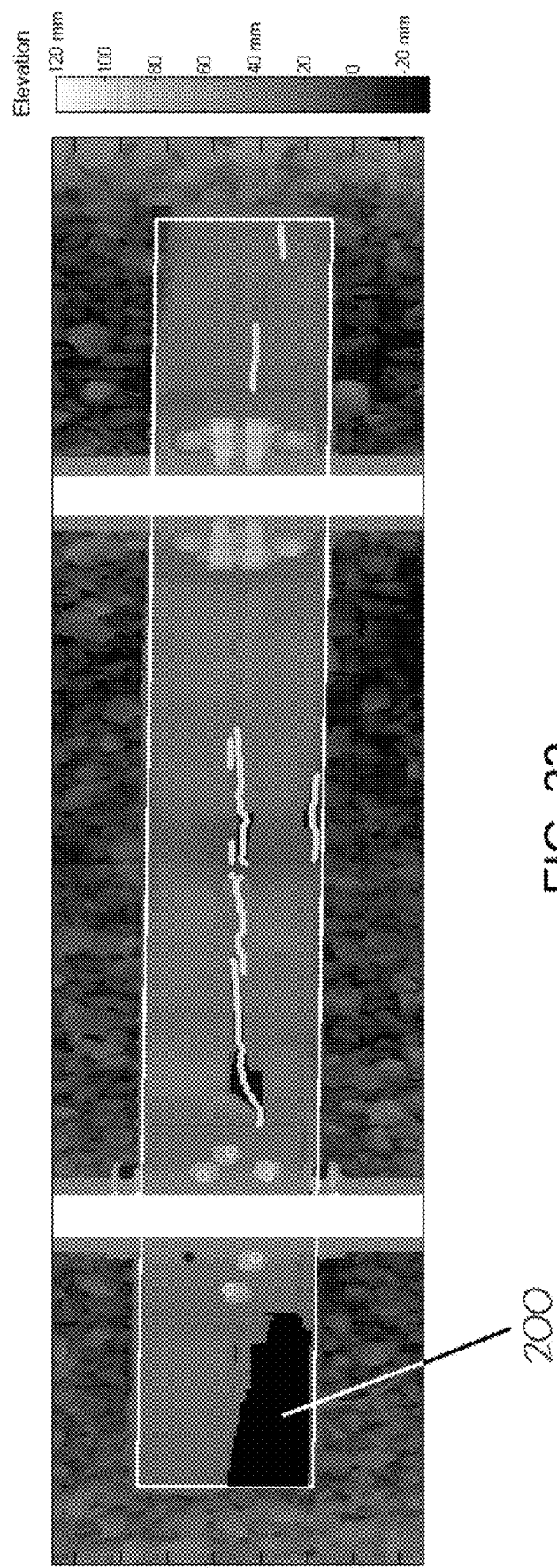
FIG. 22 shows a generated image of a tie surface plane being used to help identify an end break along a tie.
Figure 23:
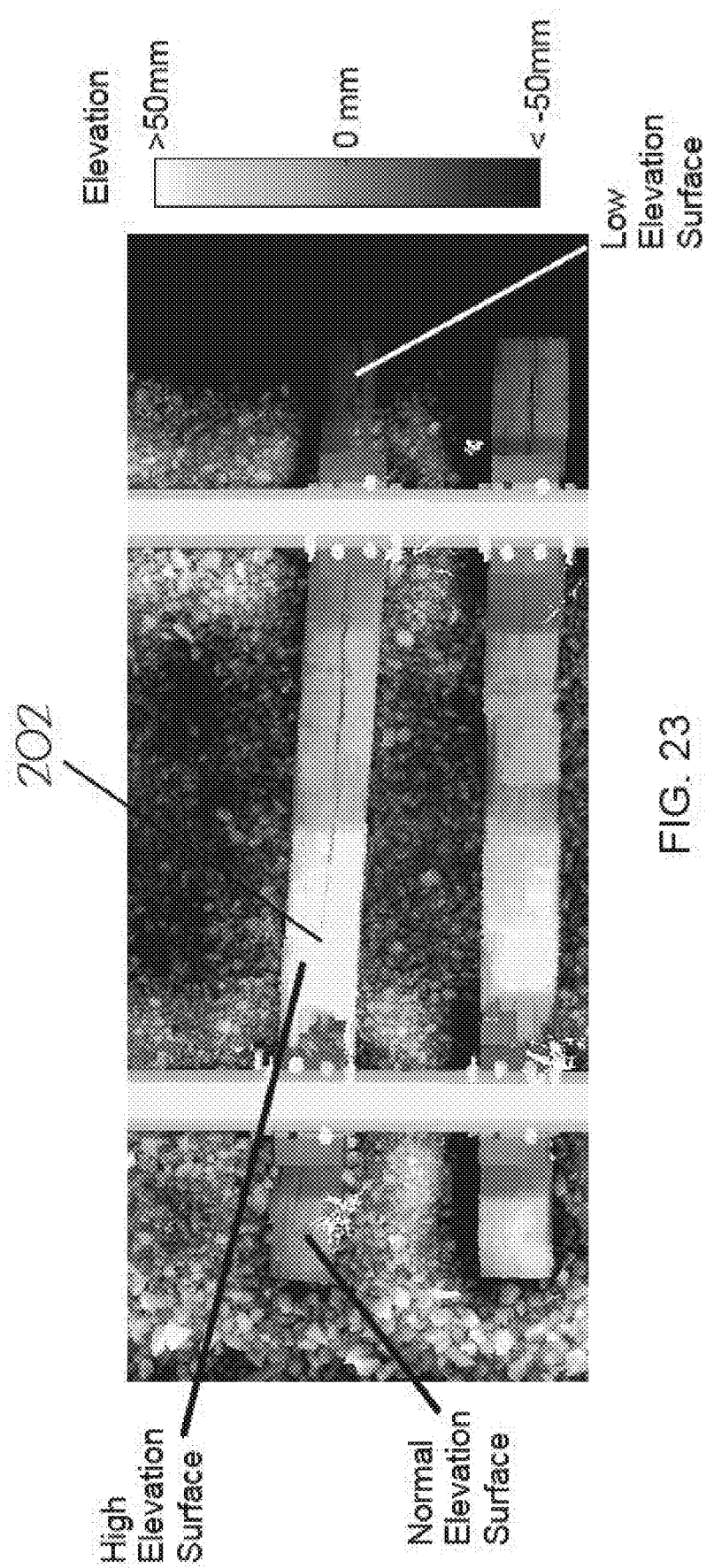
FIG. 23 shows a generated image of a tie including a high center section indicative of a broken tie.
Figure 24:
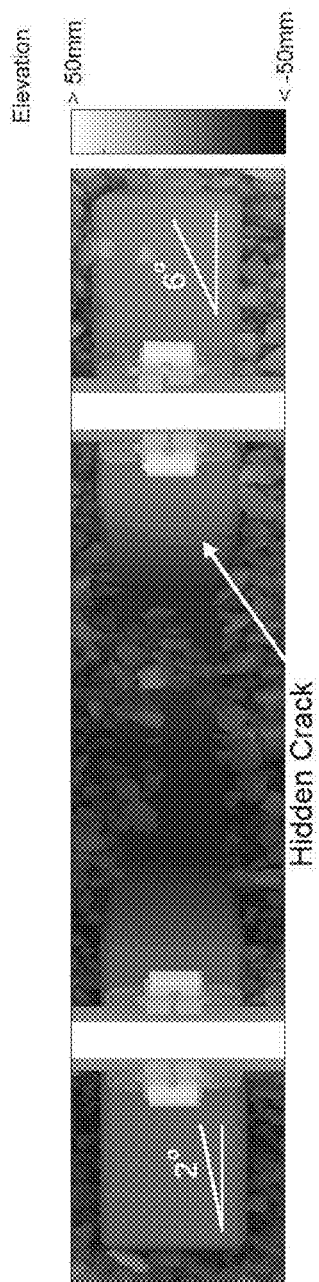
FIG. 24 shows a generated image of a cracked concrete tie.

The tie surface plane 192 is also employed to identify end breaks 200 (missing portions of tie ends as shown for example in FIG. 22), and broken ties 202 having high center sections or high ends as shown for example in FIG. 23. Broken ties are ties wherein the plane of the tie surface abruptly changes in a vertical sense a 3D elevation map, indicating the tie is broken. Similar surface plane analysis techniques are used to detect anomalies for concrete ties. At the time of manufacture, concrete ties have planar regions at many regions on the top surface including both ends of the crosstie with known as-designed orientations. Using surface normal calculated for the tie end surface planes to identify deviations from as-designed specifications help identify broken or cracked crossties as is shown, for example, with the broken tie in FIG. 24. A differential tie end surface normal analysis methodology is an effective and reliable method for identifying broken ties regardless of installed tie orientation.

Figure 25:
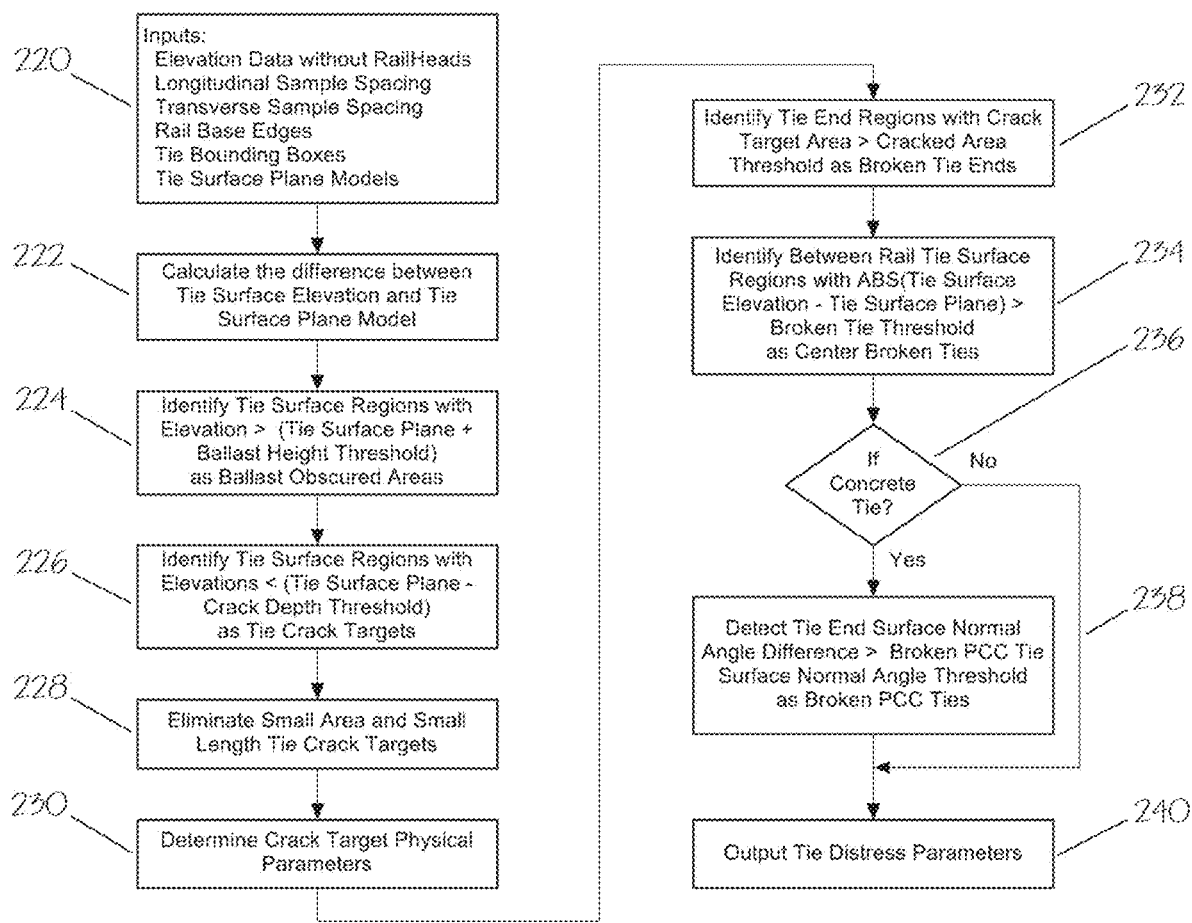
FIG. 25 shows a protocol for detecting tie distress.

A tie distress detection method flowchart is shown in FIG. 25. The process steps are carried out by a program stored on a computer readable medium in communication with a processor. A first step (block 220) of the program includes inputting data sets to a processor, such data sets including 3D elevation map data with the data associated with the rail heads removed, elevation map sample resolution (longitudinal and transverse), rail base edge coordinates, detected tie bounding box data, and approximate tie surface plane data. In order to objectively assess the condition of each crosstie, the current condition of the tie is compared to an as-new tie condition. This comparison is accomplished by calculating the difference between the high resolution 3D elevation map data for each crosstie and the new crosstie surface approximation provided by the Tie Surface Plane models calculated for each crosstie surface bounded by the corresponding tie bounding box (block 222). The resulting difference surface emphasizes non-planar features of interest. Features identified above the plane of the crosstie (producing a positive elevation difference) represent items or materials on the surface of the crosstie. Positive elevation difference regions with a magnitude greater than Ballast Height Threshold are identified as Ballast Obscured Areas (block 224) and represent areas where the crosstie surface condition cannot be assessed. Ballast Obscured Area details (location, extent, elevation for example) are retained and stored for each crosstie. Negative elevation difference regions, with a magnitude greater than Crack Depth Threshold, represent Crosstie Crack Targets (block 226). Crosstie Crack Targets are 3D features having length, width and depth. Crack Targets having a short length or small surface area are eliminated from further analysis (block 228). The remaining Crosstie Crack Targets are analyzed, producing comprehensive physical parameters (block 230). These crack parameters can include location, surface area, crack volume, length, width, zone (tie end, between rails), and fastener proximity for example. These attributes are used to define and/or modify crack severity and extent values assigned to each crack. All parameters are retained and stored for each tie. The area of all crosstie cracks present in each tie end zone is accumulated. If the accumulated crack area exceeds the end zone Cracked Area Threshold the corresponding Tie End Zone is designated a Broken Tie End (block 232). Broken Tie End status is retained and stored for each tie. The tie surface between the rails is analyzed to determine if the surface deviates either above or below a planar surface approximation. If the tie surface deviates from the Tie Plane Model by an amount greater than Broken Tie Threshold, the crosstie is designated as Center Broken (block 234), and this status is retained and stored for each crosstie. If the crosstie being analyzed is concrete (block 236) the orientation of each tie end zone surface is calculated (using the orientation of the surface normal for each end for example), and these orientations are compared to determine if the measured orientations deviate by more than Surface Normal Angle Threshold from the as-designed orientations. Any deviation of the tie end surface plane orientation from the as-designed orientation by more than this threshold signifies a broken tie, and this status is retained and stored for each crosstie. All accumulated Tie Distress Parameters are stored with the associate tie from which the parameters were derived.

Figure 26:
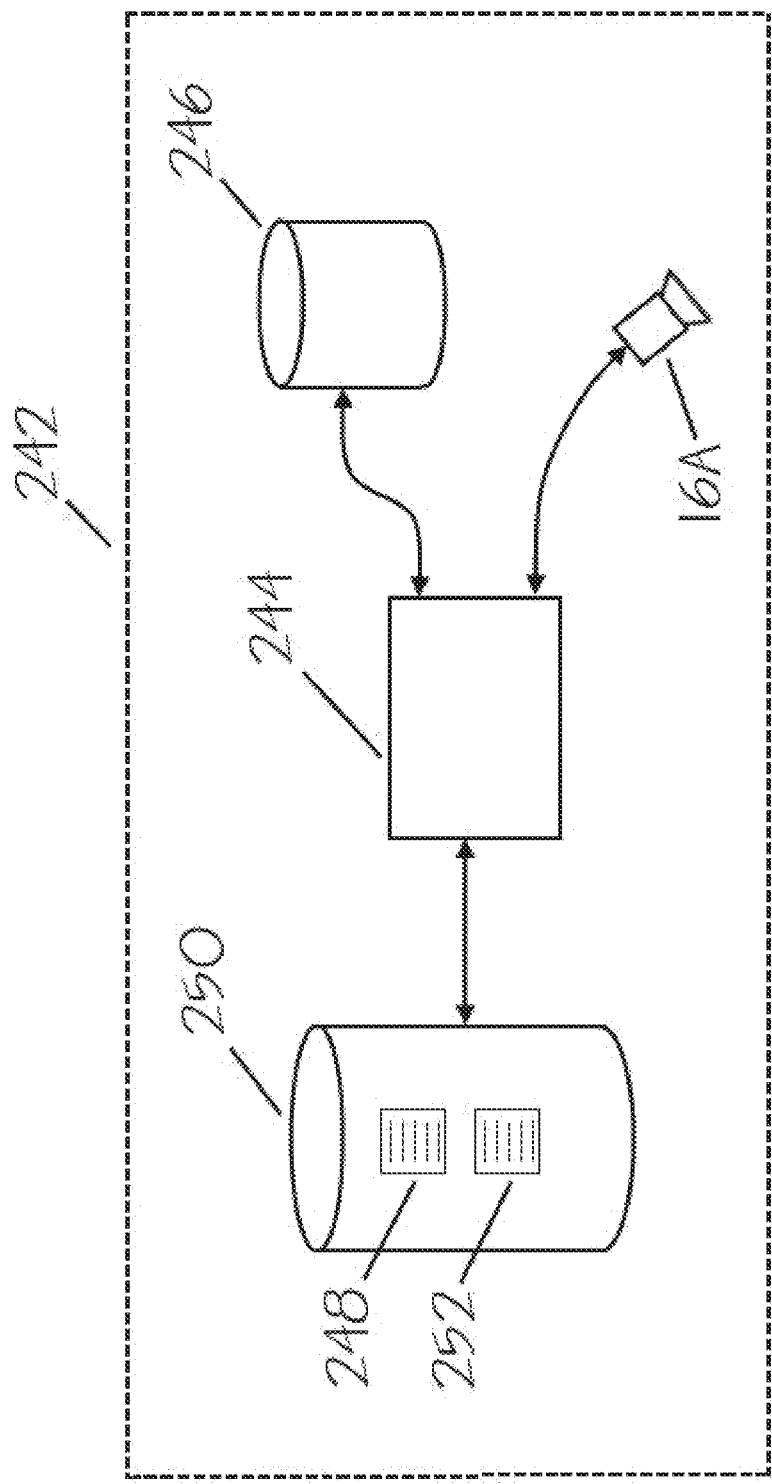
FIG. 26 shows 3D track assessment system configured to carry out a method for identifying and analyzing 3D features along a railway track bed.

In a preferred embodiment, a 3DTAS system 242 includes a processor 244, a data storage apparatus 246 in communication with the processor, one or more computer programs 248 stored on a computer-readable medium 250, and a 3D feature library 252 stored on the computer-readable medium 250 as shown schematically in FIG. 26. In some embodiments, the system 242 includes one or more 3D sensors, one or more light line generators and at least one encoder, all of which are in communication with the processor 244. In some embodiments, the computer-readable medium 250 and the data storage apparatus 246 are the same apparatus. The system is configured to carry out a method for identifying and analyzing 3D features along a railway track bed. The 3DTAS discrete 3D feature identification and analysis methodology is a surface elevation model (3D) block matching technique using normalized frequency domain cross-correlation (Fast Fourier Transform based). As new track components are identified, representative regions of the track surface elevation data containing the new feature are extracted to develop 3D feature models. These new 3D models are added to the system feature library 252. Track feature libraries have been developed for both wooden and PCC tie components.

FIG. 27 shows 3DTAS 3D feature model library examples including a wooden tie spike 254 and a tie plate hole 256. FIG. 28 shows feature model library examples including a first rail anchor 258, a second rail anchor 260, and a third rail anchor 262. FIG. 29 shows feature model library examples including a first PCC tie fastening clip 264, a second PCC tie fastening clip 266, and a third PCC tie fastening clip 268.

The 3DTAS 3D feature identification system described herein limits the primary feature search to target areas centered along each of the rails. These zones preferably represent rail fastener locations. Using the processor 244, each appropriate 3D feature from the 3DTAS feature library 252 is automatically template matched against an entire surface elevation map for the applicable region of the track bed. An objective cross-correlation coefficient is determined for the entire tested surface area. Each area is tested in turn, and the highest normalized cross-correlation value at each location on the track surface for each library feature determines the identity of the feature. There is a minimum correlation threshold which must be exceeded for any target to be identified and classified as a specific rail feature.

An example of the 3D model matching for a section of track is shown in FIG. 30. The left panel 270 shows the rail head removed elevation map for a segment of track bed containing a section of rail in the center and two concrete crossties and SafeLok fasteners. The middle panel 272 presents a graphical rendering of the results from 3D template matching a gage (left) side oriented 3D SafeLok model with the elevation map in the left panel 270. The dark areas identify the centroid locations of highly correlated 3D models, white areas indicate no model correlation with the elevation map and darker areas signify better model match quality at those points. The right panel 274 presents the graphical rendering of the 3D Template Matching results of the 3D SafeLok fastener model oriented in the field (right) side configuration with the elevation map in the left panel. These middle and right panels demonstrate the ability of the 3D Template Matching approach to differentiate different orientations of the same model. The location, 3D model correlation quality, and model type are recorded in the data storage apparatus 246 for all match targets.

Figure 31:
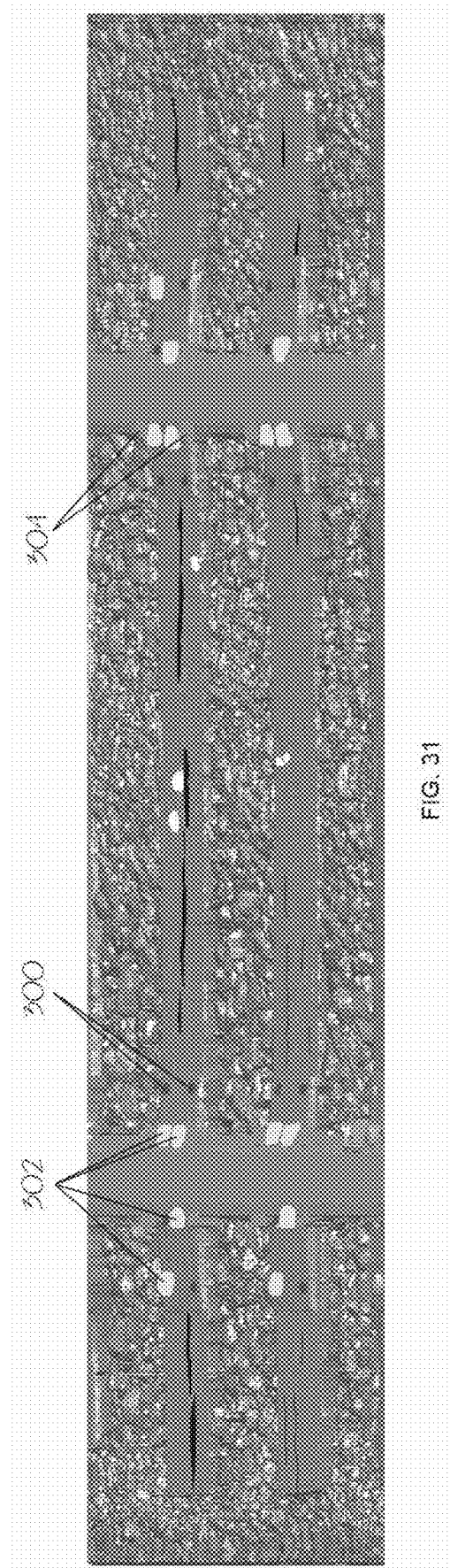
FIG. 31 shows a generated image of a railway track bed including identified features including plate holes, spikes, and anchors.
Figure 32:
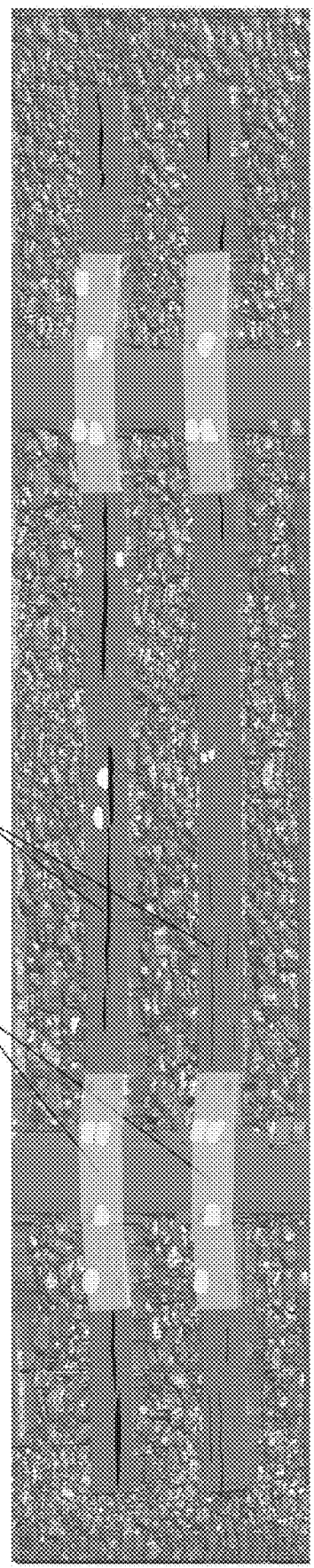
FIG. 32 shows a generated image of wooden ties with 3D track assessment system 3D plate model outlines based on spike and hole template matching results.

The 3DTAS feature identification system was applied to the track bed example shown in FIG. 21 for all track bed features stored in the feature library 252. The identified features are shown in FIG. 31 including plate holes 300, spikes 302, and anchors 304. Following identification of each feature type, physical parameters specific to that feature are determined. For example, for spikes, spike height, number of spikes, and plate location (e.g., field/gage, on/off rail base) are preferably determined. For anchors, the type and longitudinal offset from the nearest tie is determined. Additionally, the number and locations of spikes and holes are used to identify plate size and type. The 3DTAS 3D feature library includes models for many plate types. FIG. 32 shows wood ties 306 with 3DTAS 3D plate model outlines 308 based on spike and hole template matching results.

Figure 33:
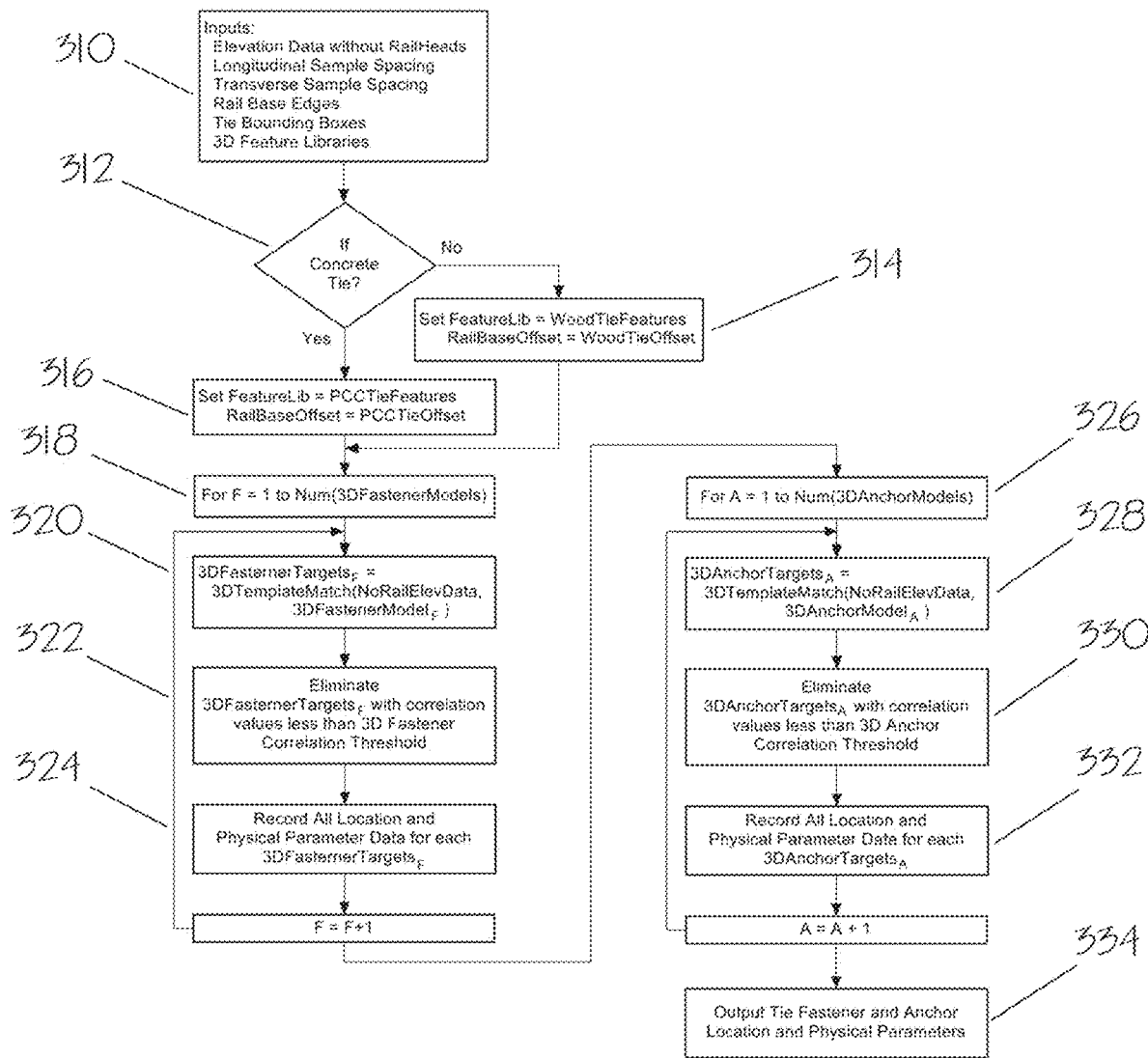
FIG. 33 shows a protocol for detecting tie fasteners and anchors.

A tie fastener and anchor detection method flow chart is shown in FIG. 33. The process steps are carried out by a program stored on a computer readable medium in communication with a processor. A first step (block 310) of the program includes inputting data sets to a processor, such data sets including 3D elevation map data with the data associated with the rail heads removed, elevation map sample resolution (longitudinal and transverse), rail base edge coordinates, detected tie bounding box data, and the 3D feature library 252. Comprehensive 3D Model Template Matching is used to identify the presence of 3D features contained in the 3DTAS library. In order to improve template matching efficiencies, the feature libraries are subdivided based on crosstie type. Current libraries include both generic and railroad specific fastening and anchor system components for wood and concrete ties. Prior to beginning the feature template matching analysis, the active Feature Library is assigned based on the type of crosstie being analyzed (block 312). For wooden ties the active Feature Library is set to the WoodTieFeature library of 3D track component models (block 314), and for concrete crossties, the Feature Library is set to the 3DTAS PCCTieFeature library (block 316). At the time the feature library is assigned, the fastener search offset is assigned to optimize the 3D template matching operation. This offset represents the lateral offset from the corresponding rail base edge that is included in the component match zone, WoodTieOffset (block 314) for wood ties, and PCCTieOffset (block 316) for concrete ties. Following feature library and search offset assignments, each of the corresponding fastener and anchor 3D model types are tested against the entire track bed 3D elevation map. Another approach uses two smaller sections of the entire track bed 3D elevation map for efficiency. These sections can be defined by the rail base edges and the TieOffset parameters, producing two subsections of the elevation map centered about each of the rails (a segment of one of these subsections is shown in FIG. 30). Each of the fastener features in the active Feature Library are tested against the track bed elevation map in sequence (block 320). The results of this 3D Model Template Matching process are analyzed, and fastener template matching scores which are less than the 3D Fastener Correlation Threshold are eliminated (block 322). Physical parameters including fastener type, location, 3D model match quality, associated tie bounding box, orientation, centroid based fastener neighborhood reference point elevations are calculated and stored for each fastener target (block 324). Each of the anchor features in the active Feature Library (block 326) are tested against the track bed elevation map in sequence (block 328). The results of this 3D Model Template Matching process are analyzed, and anchor template matching scores which are less than the 3D Anchor Correlation Threshold are eliminated (block 330). Physical parameters including anchor type, location, 3D model match quality, closest proximity tie bounding box, rail base edge proximity and orientation are calculated and stored for each anchor target (block 332). Any additional 3D features of interest would be 3D Template Matched, and the results analyzed and retained in a similar fashion. Tie fastener and anchor targets location and related physical parameters and reported and stored (block 334).

Figure 34:
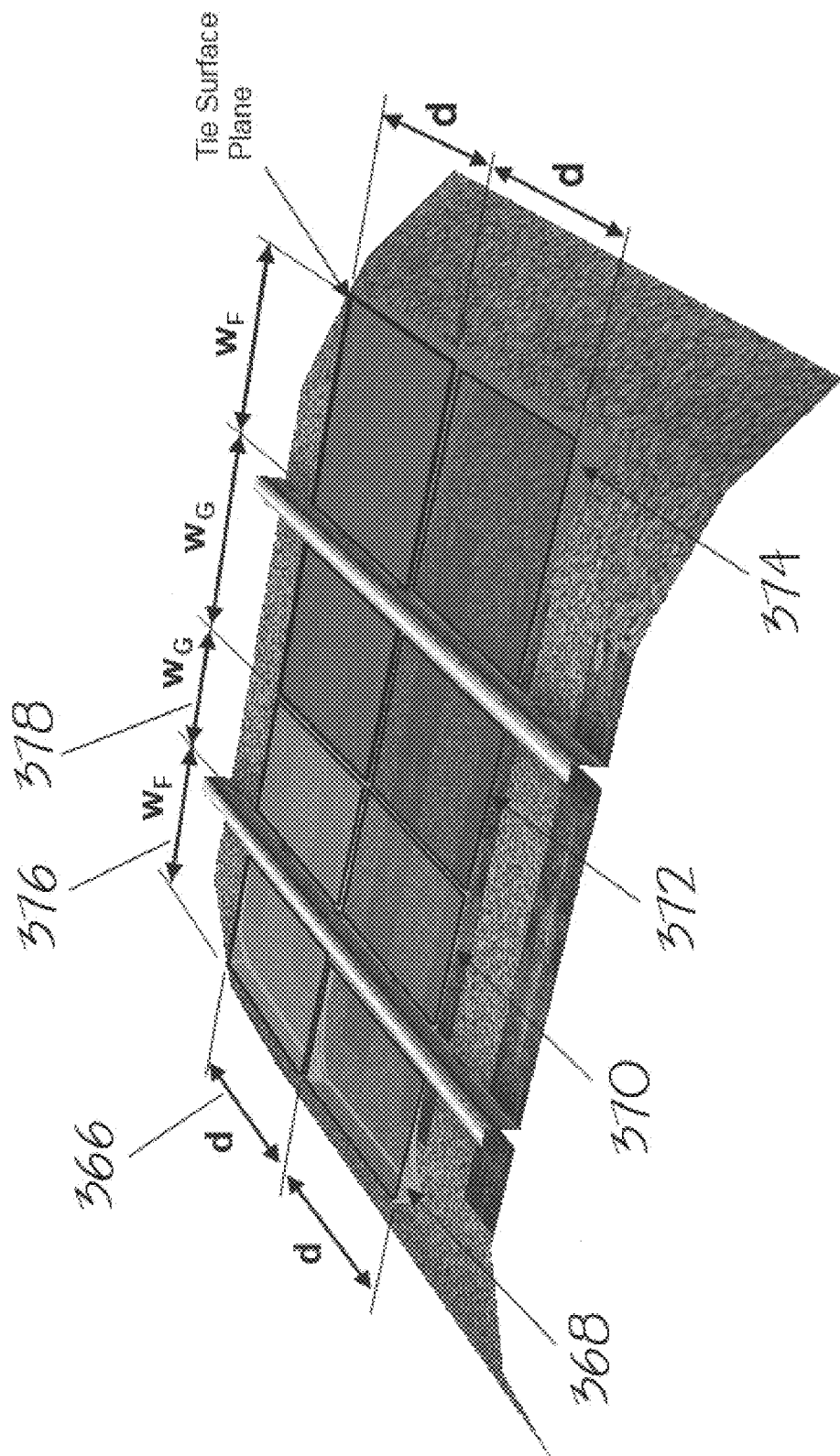
FIG. 34 shows an image schematically illustrating volume calculations made for a left shoulder volume, a left gage volume, a right gage volume and a right shoulder volume.

The 3D track surface elevation data is also used to define ballast profile measurements for both the shoulder and on the leading and following edges for each tie following the determination of individual tie bounding boxes. The 3DTAS is capable of calculating and reporting shoulder volumes at any client specified distance interval along a track bed (max, min, mean volumes per mile for example) as shown, for example, in FIG. 34 wherein the longitudinal distance is set, for example, at 1 meter. Calculations are preferably made for a left shoulder volume 368, a left gage volume 370, a right gage volume 372 and a right shoulder volume 374 based on any set longitudinal distance interval 366 and a set field width 376 and gage width 378.

Figure 35:
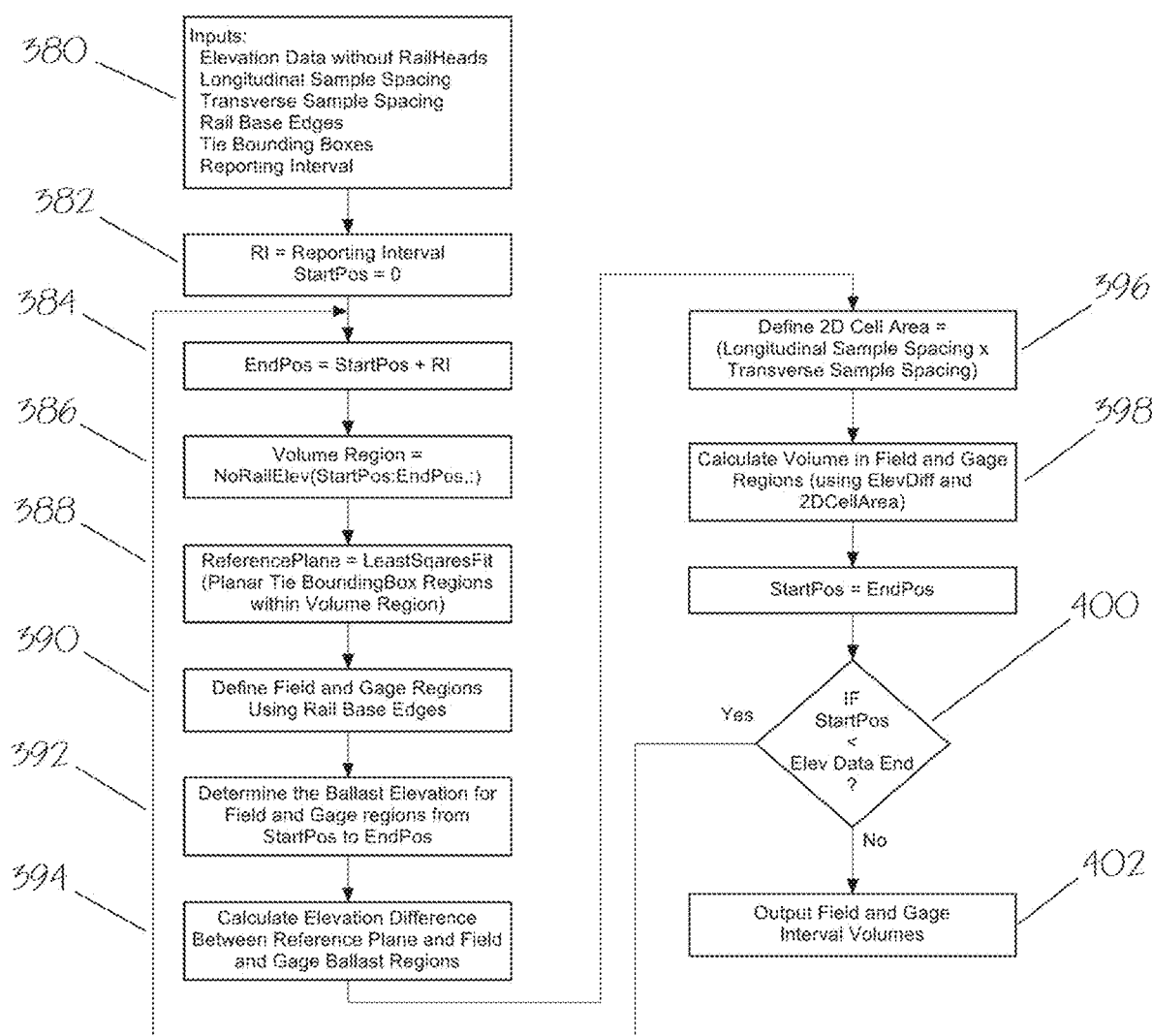
FIG. 35 shows a protocol for calculating shoulder volumes.

The detailed processing steps for the shoulder volume calculation methodology is provided in FIG. 35. The process steps are carried out by a program stored on a computer readable medium in communication with a processor. A first step (block 380) of the program includes inputting data sets to a processor, such data sets including 3D elevation map data with the data associated with the rail heads removed, elevation map sample resolution (longitudinal and transverse), rail base edge coordinates, detected tie bounding box data, and a distance reporting interval. Ballast volumes are referenced to an approximate track bed surface plane calculated from a least squares fit to all of the crosstie surfaces defined within the 3D elevation map region being analyzed. This ballast volume analysis is conducted sequentially, at any discrete longitudinal reporting interval, from the start to the end of the elevation map. Prior to processing, the ballast volume analysis establishes the start point (block 382) and endpoint based on the start point and the defined volume analysis reporting interval (block 384). The elevation map subsection defined from the StartPOS to the EndPOS and corresponding to the length of defined reporting interval is extracted and retained (block 386). Elevation measurements from this volume analysis subsection corresponding to locations within tie bounding boxes are least square fitted to a planar surface (block 388), representing a track bed reporting interval Reference Plane approximation. The outside rail (Field) and between rail (Gage) zones of the reporting interval are defined (block 390) using the rail base edges. The ballast elevation in each zone is calculated (block 392) and these elevations are subtracted from the previously calculated track bed Reference Plane (block 394). Elevation Differences which are positive represent ballast levels above the top of tie reference plane, and negative elevations represent ballast levels below the approximating tie surface. The elevation map 2D surface area cell size is defined as the rectangular area defined by the Longitudinal and Transverse Sample Spacing distances (block 396). The individual interval zone volumes are then determined by multiplying and accumulating the calculated elevation difference at each point within each zone by the 2D cell area. The volume for each of the shoulder (field) zones and for the zone between the rails (gage) are calculated and retained (block 398). The interval endpoints are shifted longitudinally and if the interval has not reached the end of the 3D elevation map the process is repeated for the next interval (block 400). All of the calculated ballast volumes, for each zone in each sequential reporting interval are reported and retained (block 402).

Figure 36:
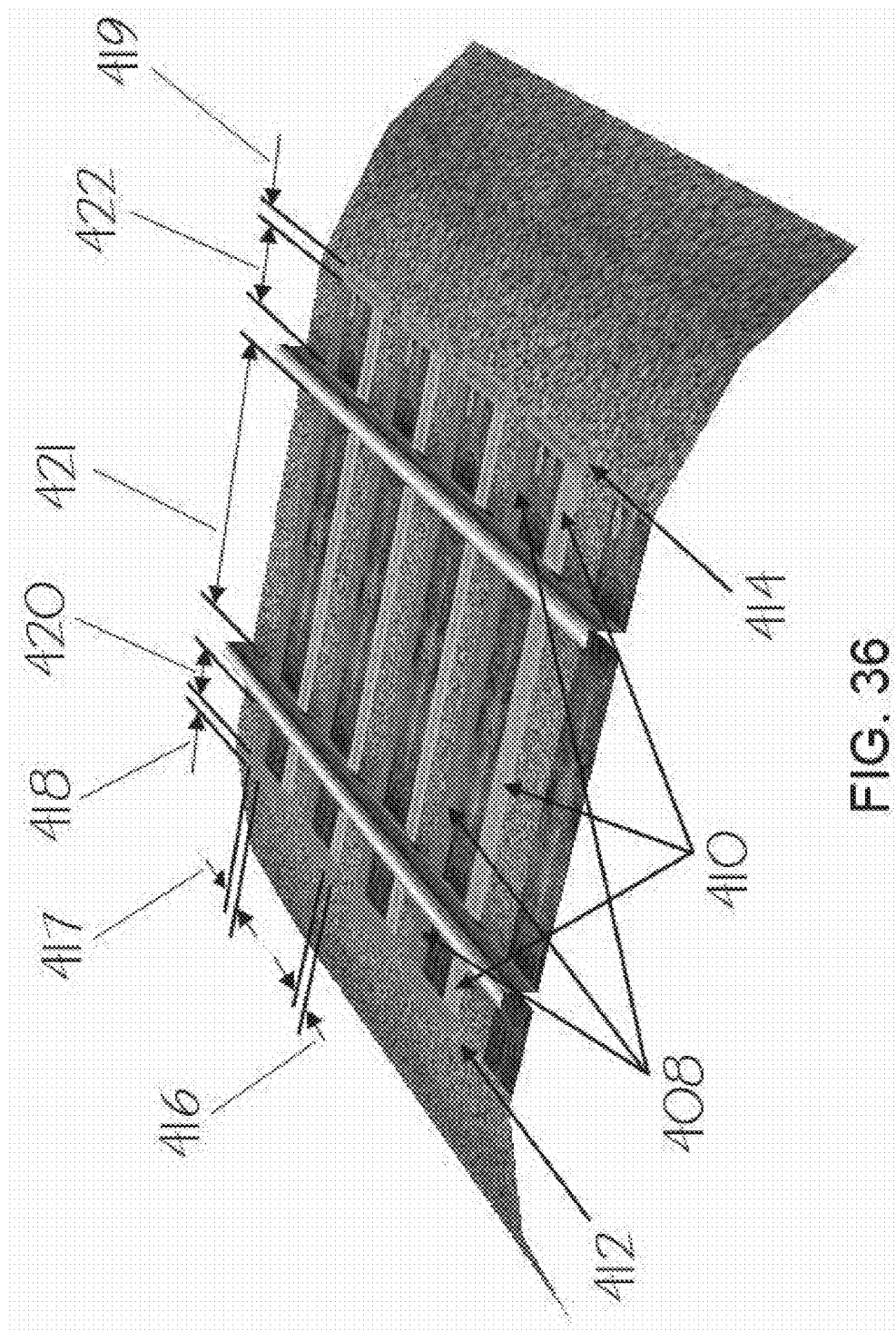
FIG. 36 shows an image schematically illustrating ballast volume calculations made along the perimeter of ties.

A similar approach is used to calculate the up chainage (leading)/down chainage (trailing) tie edge volumes, based on ballast regions offset from each tie bounding box. The 3DTAS defines surface area regions adjacent to each tie bounding box that are used to calculate ballast volumes. Such volumes include leading edge volume 408, trailing edge volume 410, left shoulder volume 412 and right shoulder volume 414. These volumes are defined in part by a set tie trailing edge width 416, a tie leading edge width 417, a tie left shoulder width 418 and a tie right shoulder width 419. These volumes are also defined in part by a left tie field length 420, a tie center length 421, and a tie right field length 422. These volumes are calculated as the difference between the measured surface elevation for each of the defined ballast volume regions and the surface plane calculated from the surface of each tie (shown in FIG. 36). Differential ballast levels (volumes) around the perimeter of each tie are of interest to rail infrastructure owners. In particular, situations where a tie is anchored to a rail and is being dragged (being plowed) by stresses occurring in the rail which cause positive ballast volumes in the direction the tie is being dragged and negative volumes on the other side of the tie. A positive volume indicates that ballast levels are above the tie plane surface (berms), and negative volumes for areas with the ballast levels below the tie surface (voids). Ballast volume surface area zone definition parameters are configurable within the 3DTAS environment (typical zone widths are preferably about 100 mm, and zone lengths are preferably defined by the applicable tie length). All volumes are preferably recorded on a tie-by-tie basis, and the aggregate (max, min, mean, and median) volumes can be accumulated and reported for any longitudinal interval of track (e.g., based on distance or number of ties).

Figure 37:
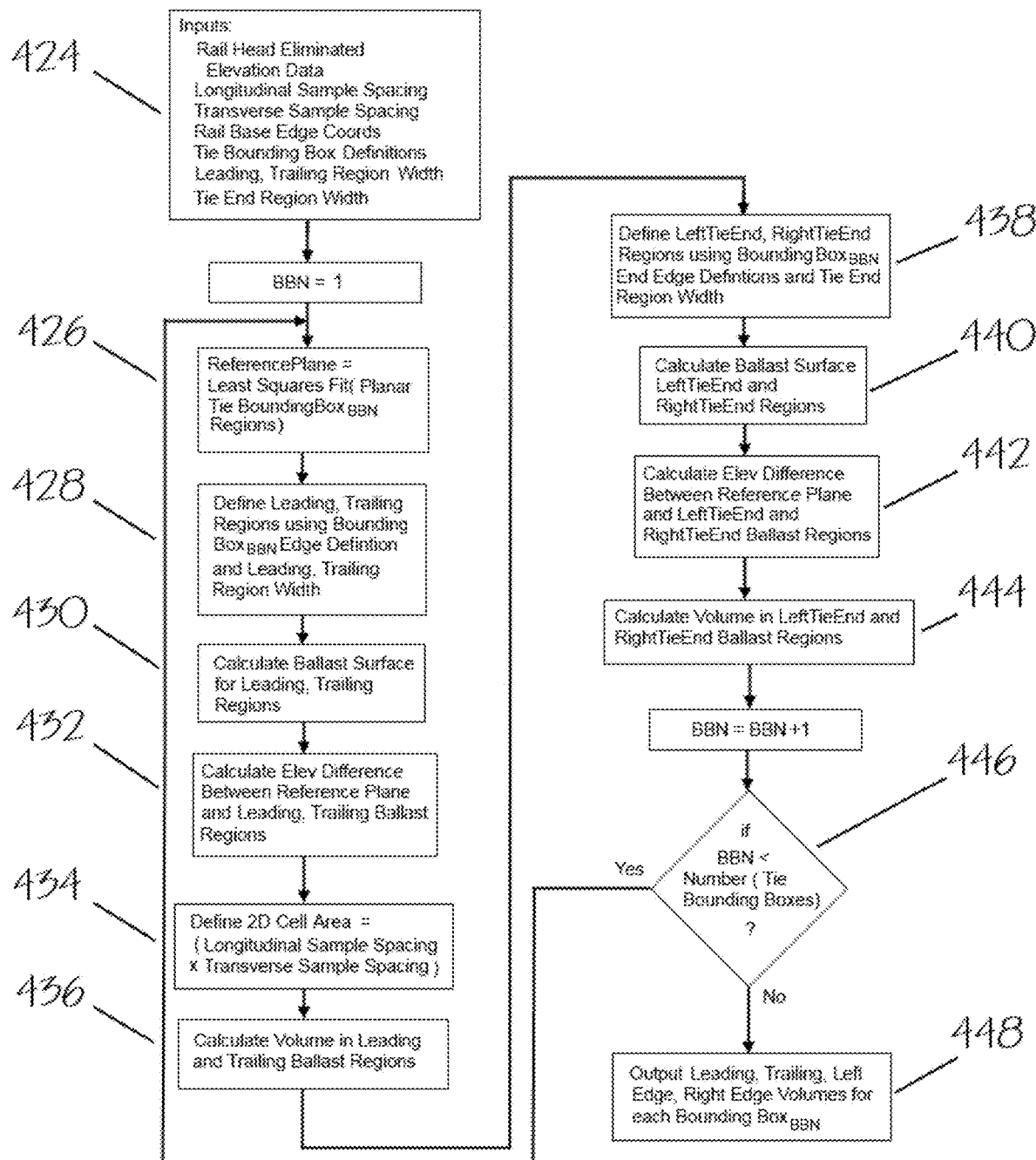
FIG. 37 a protocol for calculating the volumes of tie perimeter regions.

FIG. 37 includes a flow chart detailing process steps for a tie perimeter regions volume calculation method. The process steps are carried out by a program stored on a computer readable medium in communication with a processor. A first step (block 424) of the program includes inputting data sets to a processor, such data sets including 3D elevation map data with the data associated with the rail heads removed, elevation map sample resolution (longitudinal and transverse), rail base edge coordinates, detected tie bounding box data, and leading region width, trailing width, and tie end region width. Crosstie perimeter ballast volumes are referenced to a surface plane approximation calculated from a least squares fit of each crosstie surface. The crosstie perimeter ballast volume analysis is conducted sequentially, for each crosstie bounding box defined within the elevation map. Processing begins with the first crosstie bounding box defined within the elevation map. The elevation map measurements corresponding to locations within tie bounding box are least square fitted to a planar surface (block 426), representing a crosstie surface Reference Plane approximation. The leading edge (forward direction), trailing edge (reverse direction) region widths are used to define zones along the leading and trailing edges of the tie bounding box (block 428). The ballast elevation in the leading and trailing edge zones are calculated (block 430) and these elevations are subtracted from the previously calculated crosstie surface Reference Plane (block 432). Elevation Differences which are positive represent ballast levels above the top of tie reference plane, and negative elevations represent ballast levels below the approximating tie surface. The elevation map 2D surface area cell size is defined as the rectangular area defined by the Longitudinal and Transverse Sample Spacing distances (block 434). The individual leading and trailing zone volumes are then determined by multiplying and accumulating the calculated elevation differences at each point within each zone by the 2D cell area. The ballast volume for the leading and trailing edge zones are calculated and retained (block 436). The tie end edge region widths are used to define zones along the left (survey direction) and right tie end edges of the tie bounding box (block 438). The ballast elevation in the left and right tie end edge zones are calculated (block 440) and these elevations are subtracted from the previously calculated crosstie surface Reference Plane (block 442). The individual left and right tie end edge zone volumes are then determined by multiplying and accumulating the calculated elevation differences at each point within each zone by the 2D cell area. The ballast volume for the left end and right end edge zones are calculated and retained (block 444). The crosstie bounding box index is incremented and if the bounding box index does not exceed the number of bounding boxes, the process is repeated (block 446). All of the calculated leading, trailing, left edge and right edge ballast volumes, are associated and retained with each corresponding crosstie bounding box (block 448).

Another feature critical to the stability of railway track beds is the integrity of the crosstie to ballast interface. High quality ballast, adequately tamped (compacted) and placed at the correct levels, effectively transfers both vertical and lateral loads to the track bed sub-structure. Areas with insufficient ballast in the crib and shoulder areas represent areas with the potential for diminished track stability and are of interest to railway owners and operators.

Figure 38:
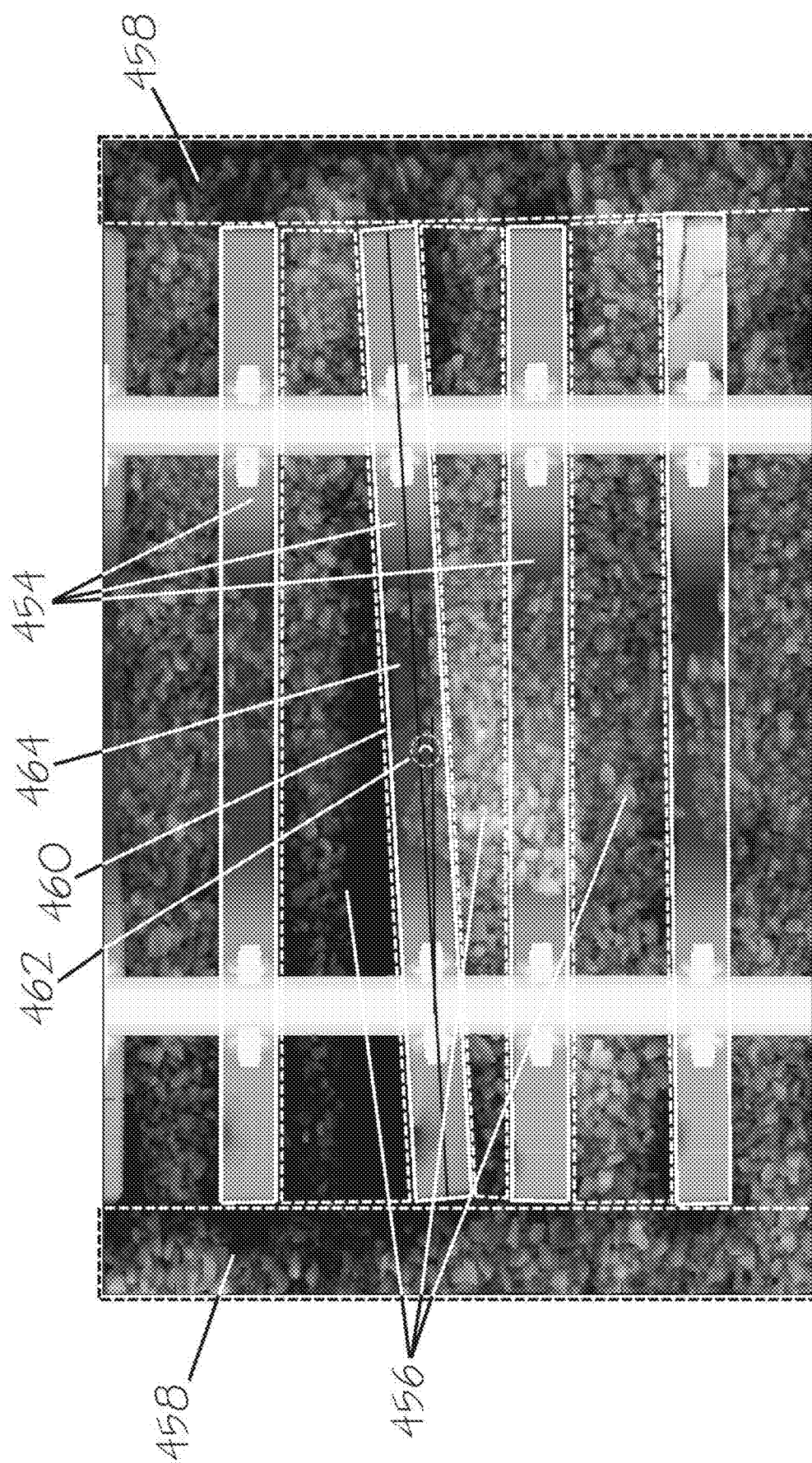
FIG. 38 shows a generated image of a crosstie bounding box defining tie separation and skew angle parameters for individual crossties.

Following the identification of tie planar surface regions, and the corresponding definition of individual crosstie bounding boxes, the track bed surface can be segmented into crosstie region 454, crib ballast region 456 and shoulder ballast region 458 as shown in FIG. 38. The calculation of all crosstie bounding boxes allows the definition of tie separation and skew angle parameters for individual crossties such as, for example, the tie bounding box 460 and skew angle 462 for the tie 464 shown in FIG. 38. These physical parameters are preferably combined with tie size (length and width) and location (linear and spatial referenced) for each crosstie. The crib area (inter-tie) and the shoulder area ballast levels can then be calculated continuously along the track.

Figure 39:
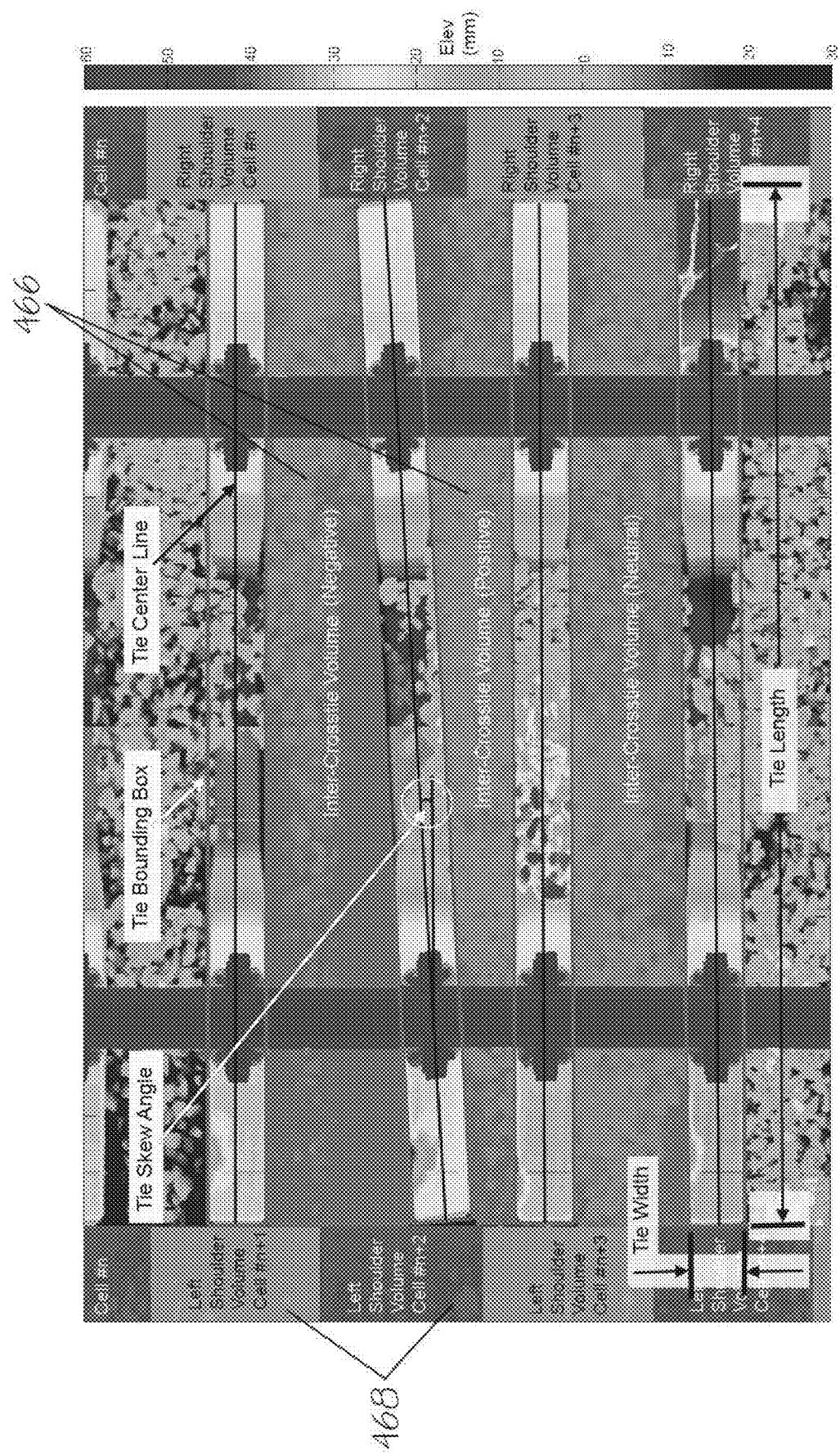
FIG. 39 shows a somewhat schematic view of a defined inter-crosstie volume between ties.

The inter-crosstie volume is defined as the difference between a plane calculated from the leading and trailing crosstie surfaces (shaded surface 466 in FIG. 39), and the ballast surface in the same inter-crosstie region. Negative volumes represent regions with ballast surface elevations which are below the plane of the tie surfaces, and positive volumes indicate regions with ballast surface elevations above the tie surface plane. A neutral volume region represents an area where the ballast surface is within a neutral ballast volume threshold (small nominal positive/negative volume) of the crosstie surface plane level.

The left and right shoulder volumes are calculated as individual cells 468 for the field region of the track bed beyond the ends of the crossties, with any specified fixed longitudinal calculation and reporting distance defined by the 3DTAS shoulder ballast volume distance parameter (0.6 meter for example). The shoulder volume surface area cell size is defined by the maximum track bed profile measurement width and the crosstie length (defining the cell width). The shoulder volumes are calculated as the difference between the tie surface planes with the tie bounding boxes extended to the end of the field side scan regions and the surface elevation of the shoulder ballast in each shoulder cell (shown as the alternating shaded regions in FIG. 39).

The calculated ballast volume parameters for each shoulder cell 468 and inter-crosstie (crib) region 456 are reported based on track position and corresponding nearest proximity tie. Crib volumes, leading and trailing edge volumes and tie skew angles are analyzed and exceptions are reported. Exceptions include significant volume differences between leading and trailing volumes and high skew angles. The exceptional volume differences are defined by exceeding a 3DTAS volume difference threshold.

Figure 40:
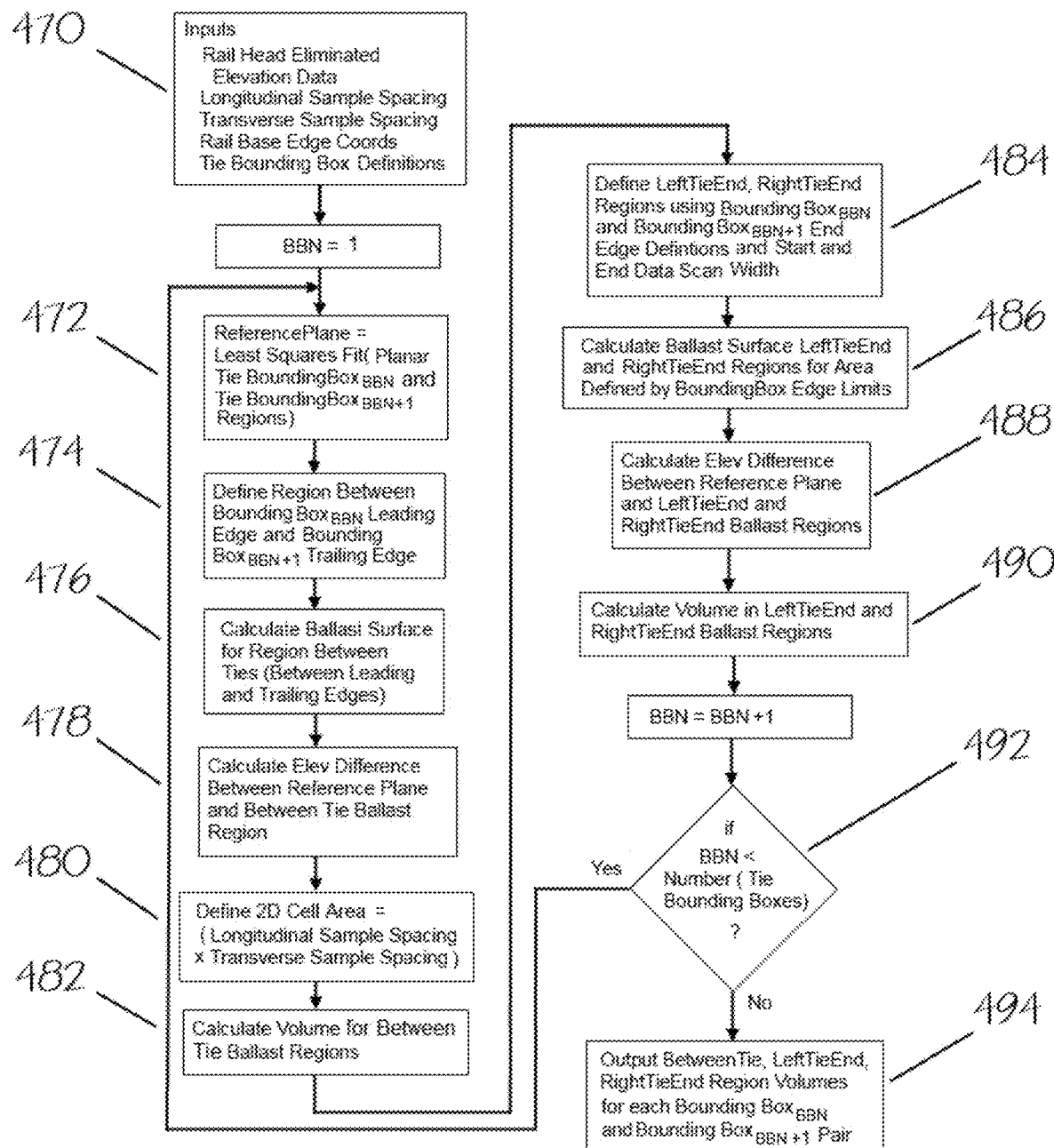
FIG. 40 shows a protocol for calculating ballast volume for the region between and at the ends of ties.

The detailed processing steps for ballast volume calculations for the region between and at the ends of each tie are detailed in the flowchart shown in FIG. 40. The process steps are carried out by a program stored on a computer readable medium in communication with a processor. A first step (block 470) of the program includes inputting data sets to a processor, such data sets including 3D elevation map data with the data associated with the rail heads removed, elevation map sample resolution (longitudinal and transverse), rail base edge coordinates, and detected tie bounding box data. Inter-crosstie (crib) and end region ballast volumes are referenced to a surface plane approximation calculated from a least squares fit for two adjacent crosstie surfaces. The crosstie crib and end region ballast volume analysis is conducted sequentially, for each pair of consecutive crosstie bounding boxes defined within the elevation map. Processing begins with the first pair of crosstie bounding boxes defined within the elevation map. The elevation map measurements corresponding to locations within the two tie bounding box are least square fitted to a planar surface (block 472), producing a crosstie surface Reference Plane approximation. The crib region is defined as the ballast zone delineated by bounding box (BNN) leading edge and bounding box (BNN+1) trailing edge and the minimum bounding boxes (BNN and BNN+1) left and right end edges (block 474). The ballast elevation in the inter-crosstie crib zone are calculated (block 476) and these elevations are subtracted from the previously calculated crosstie surface Reference Plane (block 478). Elevation Differences which are positive represent ballast levels above the top of tie reference plane, and negative elevations represent ballast levels below the approximating tie surface. The elevation map 2D surface area cell size is defined as the rectangular area defined by the Longitudinal and Transverse Sample Spacing distances (block 480). The inter-crosstie crib zone volume is then determined by multiplying and accumulating the calculated elevation differences at each point within the crib zone by the 2D cell area. The ballast volume for the inter-crosstie zone is calculated and retained (block 482). The left shoulder zone for bounding box (BNN) is defined as the region from the left edge of the 3D elevation map to average of bounding boxes (BNN and BNN+1) left edges horizontally, and from the midpoint between the leading edge of bounding box (BNN−1) and the trailing edge of bounding box (BNN) to the midpoint between the leading edge of bounding box (BNN) and the trailing edge of bounding box (BNN+1) longitudinally. The right shoulder zone for bounding box (BNN) is defined as the region from the average of bounding boxes (BNN and BNN+1) right edges to right edge of the 3D elevation map horizontally, and from the midpoint between the leading edge of bounding box (BNN−1) and the trailing edge of bounding box (BNN) to the midpoint between the leading edge of bounding box (BNN) and the trailing edge of bounding box (BNN+1) longitudinally (block 484). The ballast elevation in the left and right shoulder zones are calculated (block 486) and these elevations are subtracted from the previously calculated crosstie surface Reference Plane (block 488). The individual left and right shoulder zone volumes are then determined by multiplying and accumulating the calculated elevation differences at each point within each zone by the 2D cell area. The ballast volume for the left end and right shoulder zones are calculated and retained (block 490). The crosstie bounding box index is incremented and if the bounding box index does not exceed the number of bounding boxes, the process is repeated (block 492). All of the calculated inter-crosstie, left and right shoulder ballast volumes, are associated and retained with each corresponding crosstie bounding box (block 494).

Figure 41:
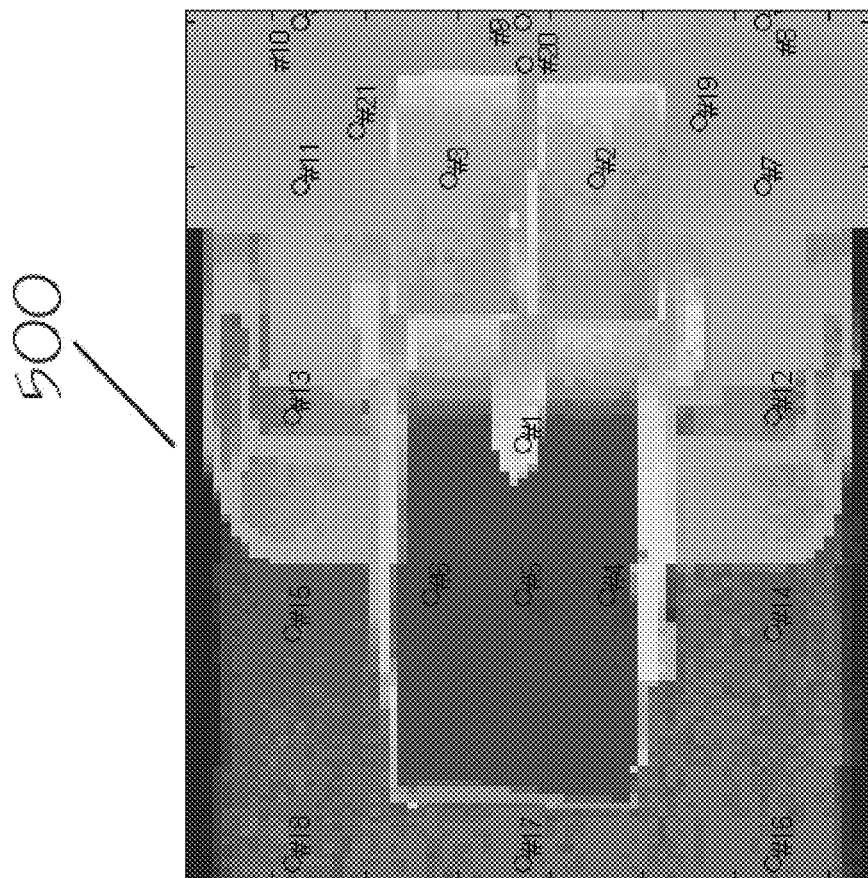
FIG. 41 shows a generated image of a fastener and a number of relative offset measurement regions.

Following the 3D analysis and identification of all rail fastening systems for a given section of railway track bed, the results of the identification process provide the accurate position of every track fastening component. Once a fastener location is known, the 3DTAS is able to extract elevation measurements in small regions relative to the geometric center of each fastener. An example of a number of relative offset measurement regions (21 measurement regions identified by # and a numeral) for a Safelok III fastener 500 is shown in FIG. 41. For each of these measurement regions, a number of surface elevation measures are calculated (min, max mean, and median values) and recorded. Any number of operations are possible based on these measures, providing the ability to monitor and report the in-situ performance of the entire fastener system and the fastener/crosstie interface.

Figure 42:
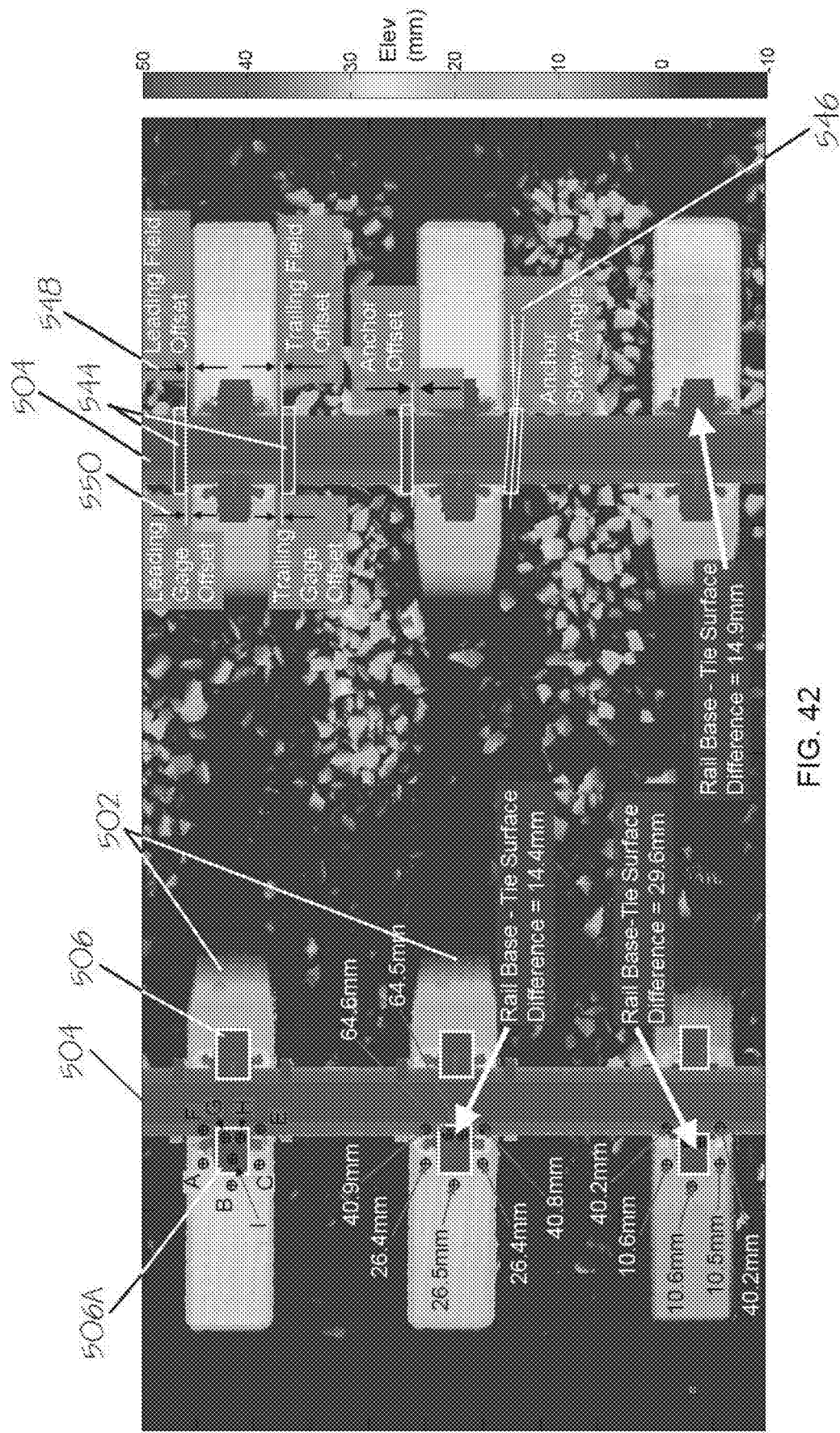
FIG. 42 shows a generated image including 3D elevation data for three concrete cross ties attached to rails.

Critical measures for the safe operation of a concrete crosstie based track system include broken or missing fasteners, fastener insulator wear, pad wear and rail seat abrasion. With the ability for accurate and repeatable elevation measures at any arbitrary location referenced to a fastener, all of these critical measures are possible. FIG. 42 shows 3D elevation data for three concrete cross ties 502 attached to rails 504. The rails 504 are attached to the cross ties 502 by fasteners 506. Following the identification of each fastener (using the 3DTAS 3D feature identification methodology described above), any number of elevation measures can be determined. A plurality of elevation measurements are taken along a first fastener 506A, such measurements designated by letters A-H. The minimum, maximum, mean and median elevation measures are calculated for a localized neighborhood centered about each measurement point, determined relative to the center of the fastener 506A location, the measurement origin. For example, in FIG. 42, the elevation measures at locations A, B, and C represent the left field top of crosstie elevation, locations E and F represent the field rail base elevation and G and H represent the top of fastener 506A insulator elevations. These measures, combined with knowledge of the installed rail type (including as designed rail base thickness) and clip design parameters (clip toe insulator thickness), allow accurate in-situ pad and insulator wear measurements.

Using the plurality of neighborhood based elevation measures in close proximity to each detected fastener allows the calculation of a variety of track infrastructure measures critical for effective and safe operation of the railway. Although the actual measurement points (relative to the center of each fastener) will vary for different fastener types, the elevation parameters measured remain the same. For example, for concrete ties these elevation parameters include; Top of Tie Elevation (FIG. 42 reference points A, B and C on fastener 506A), Top of Rail Base Elevation (FIG. 42 reference points E and F on fastener 506A), and Top of Fastener Elevation (FIG. 42 reference points G, H and I on fastener 506A). Using these elevation measures, knowledge of the design rail base thickness (as shown in FIG. 3) and knowledge of fastener dimensions, then Rail Pad Thickness, Rail Base to Top of Tie Clearance (Rail Seat Abrasion measures), and Fastener Top of Toe to Top of Rail Clearance (Insulator Wear measures) can be determined, for example, using the following calculations:

$$\text{Rail Pad Thickness} = \text{mean}(\text{Elev}_E, \text{Elev}_F) - \text{mean}(\text{Elev}_A, \text{Elev}_B, \text{Elev}_C) - \text{Rail Base Thickness}$$

When the Rail Pad Thickness measure diminishes to 0, the bottom of the rail base is in direct contact with the Top of Tie, allowing Rail Seat Abrasion to occur. Therefore, Rail Seat Abrasion is reported when Rail Pad Thickness is equal to or less than zero using the following calculation;

$$\text{Rail Seat Abrasion} = \text{ABS}(\text{mean}(\text{Elev}_E, \text{Elev}_F) - \text{mean}(\text{Elev}_A, \text{Elev}_B, \text{Elev}_C) - \text{Rail Base Thickness})$$

Insulator wear, occurring as the insulator pad installed under the toe of the concrete tie fastener clips wears due to traffic loading and longitudinal rail movements, can be monitored through the measurement of the elevation difference between the Top of the Fastener and the Top of the Rail Base. The Insulator Thickness can be determined, for example, by using the following calculation;

$$\text{Insulator Thickness} = \text{mean}(\text{Elev}_G, \text{Elev}_H) - \text{mean}(\text{Elev}_E, \text{Elev}_F) - \text{Fastener Toe Thickness}$$

Figure 43:
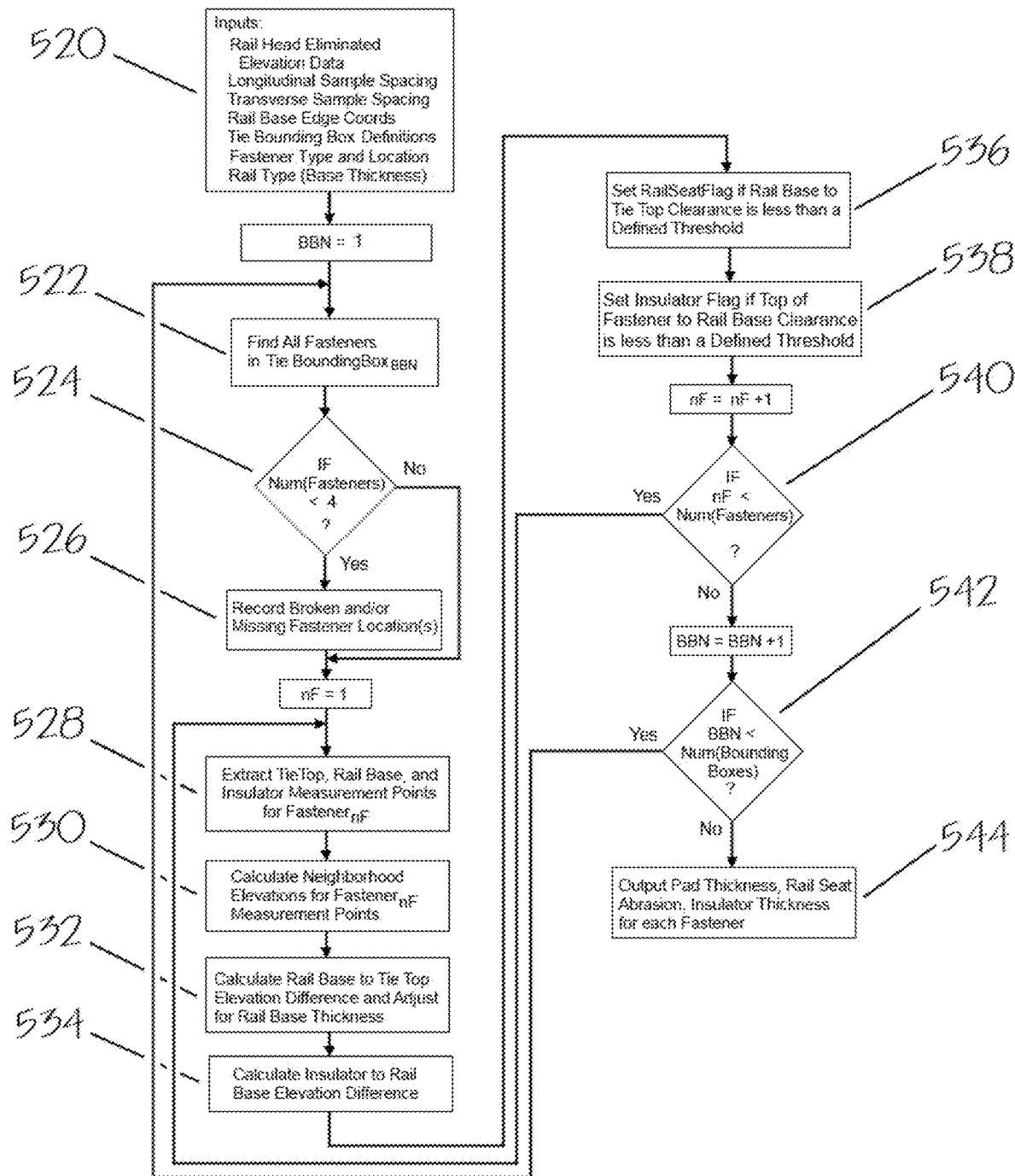
FIG. 43 shows a protocol for determining pad thickness, rail seat abrasion, and insulator thickness.

The detailed processing steps for determining pad thickness, rail seat abrasion, and insulator thickness are detailed in the flowchart shown in FIG. 43. The process steps are carried out by a program stored on a computer readable medium in communication with a processor. A first step (block 520) of the program includes inputting data sets to a processor, such data sets including 3D elevation map data with the data associated with the rail heads mathematically removed, rail base edge coordinates, detected tie bounding box data, fastener type and location data, and rail type data. Following 3D Template Matching of all crosstie type specific 3D models contained in the 3DTAS Feature Library, the best match fastener and anchor features are associated with each crosstie bounding box defined for a given 3D elevation map. Additional information such as location, template match quality, and other physical parameters are also stored for each feature related to a bounding box. In the case of fastener features, specific measurement points for each fastener type used for post-processing and analysis are also stored. These measurement points are referenced to the centroid of the specific 3D model and are used to determine numerous critical elevations in close proximity to the fastener which are critical for rail seat abrasion, and insulator wear calculations. The rail seat abrasion, pad thickness and insulator thickness measures are determined sequentially, starting with the first crosstie bounding box to the last tie bounding box contained in the 3D elevation map. The first processing step sets the bounding box index to 1 (BBN=1), and identifies all of the fasteners bounded within the current crosstie bounding box (BNN) (block 522). Typical crosstie fastening systems have fasteners on the field and gage sides of both rails, requiring 4 fasteners per crosstie. If the number of fasteners is less than 4 (block 524), the location of missing fastener(s) are recorded (block 526) and processing continues on the remaining fastener locations. For each of the fasteners associated with the crosstie bounding box, the fastener specific reference elevation measurements points (such as top of tie, top of rail base, top of fastener, top of insulator for example) are extracted (block 528) and a variety of statistical elevation measures (mean, median, min, max for example) on a predefined neighborhood centered about each of the elevation reference points is calculated (block 530). One Rail Seat Abrasion measure is calculated using the difference in elevation between the top of rail base and the top of tie minus the Rail Base Thickness parameter (block 532). The Insulator Thickness measure is calculated as the difference in elevation between the top of insulator and the top of tie (block 534). These difference measures are calculated for each of the fasteners found within the boundary of the current crosstie bounding box using any of the neighborhood based elevation statistics. If the Rail Seat Abrasion measure is less than a defined (Rail Seat Abrasion) threshold the Rail Seat Flag is set for the appropriate rail within the current bounding box (block 536). If the Insulator Thickness measure is less than a defined (Insulator Thickness) threshold the Insulator Flag is set for the appropriate rail within the current bounding box. The process is repeated for all fasteners associated with each bounding box (block 540). Each bounding box is processed sequentially (block 542) until all bounding boxes contained in the 3D elevation map have been analyzed. When all bounding boxes have been analyzed, the Rail Seat Abrasion, Pad Thickness and Insulator Thickness are associated and stored with the corresponding bounding box.

Rail anchors 544 are an integral part of crosstie fastening systems as shown in FIG. 42. Installed on the gage side of the base of the rail tight to the edge of a crosstie, anchors provide a large bearing surface against the side of a crosstie to prevent rail creep. The number of anchors and their position with respect to the track crossties is crucial for the safe operation of a railway. As part of the 3D analysis and identification of fastening system components, anchors in the 3DTAS Library are detected and locations reported. Anchors are associated with the closest proximity crosstie and the anchor type (determined during 3D model matching), location and orientation (skew angle) 546 and crosstie edge offset parameters are calculated (based on accurate longitudinal positions for the anchor edge and tie bounding box definition) and retained. Anchor and crosstie edge offsets are calculated for both the field and gage sections of the anchor as shown for example with anchor field offset 548 and anchor gage offset 550 shown in FIG. 42. Anchor information (the presence or absence) is associated and recorded for each tie. The flow chart for the anchor processing methods is presented in the 3D Fastener Feature Detection/Parameter Extraction (FIG. 33).

A joint bar is a metal bar that is bolted to the ends of two rails to join them together in a track. In continuously welded rail (CWR) joints and therefore joint bars, can represent repaired locations of interest to rail operators and owners. The 3DTAS exploits the physical topographical characteristics of joint bars and their placement to identify these 3D features. The 3DTAS method for identifying joint bars detects features in close proximity to the rail head edges which appear at an elevation between the rail base and the top of railhead. The method further requires that the joint bars have a longitudinal length greater than a minimum joint bar length threshold and less than a maximum joint bar length threshold. Once detected, the joint bar analysis method verifies the presence of joint bar components on both the field and gage sides of the rail, identifies any detectable bolt/nut features (e.g., to develop bolt counts or account for missing bolts).

Figure 44:
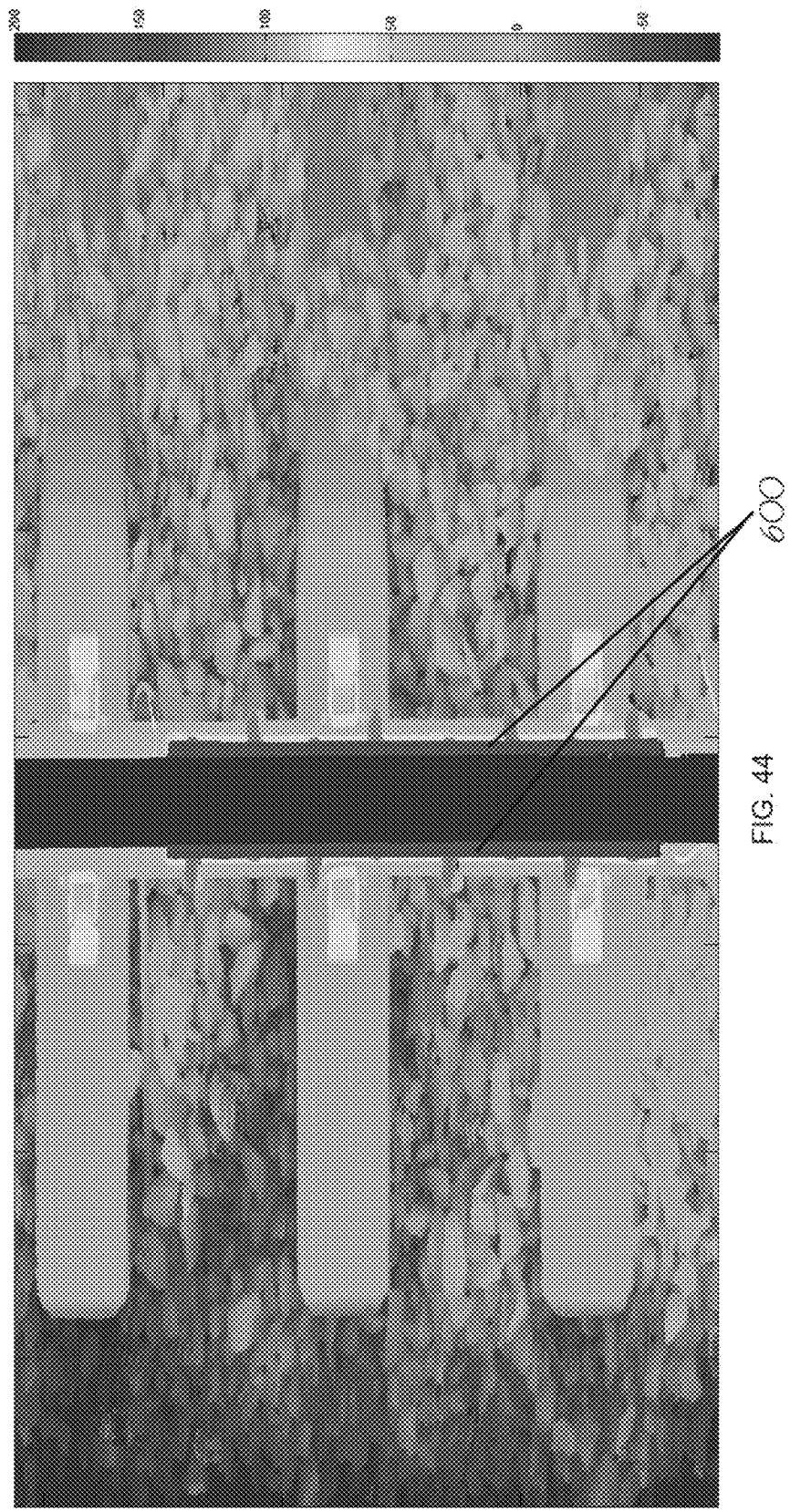
FIG. 44 shows surface elevation data for a typical joint bar.
Figure 45:
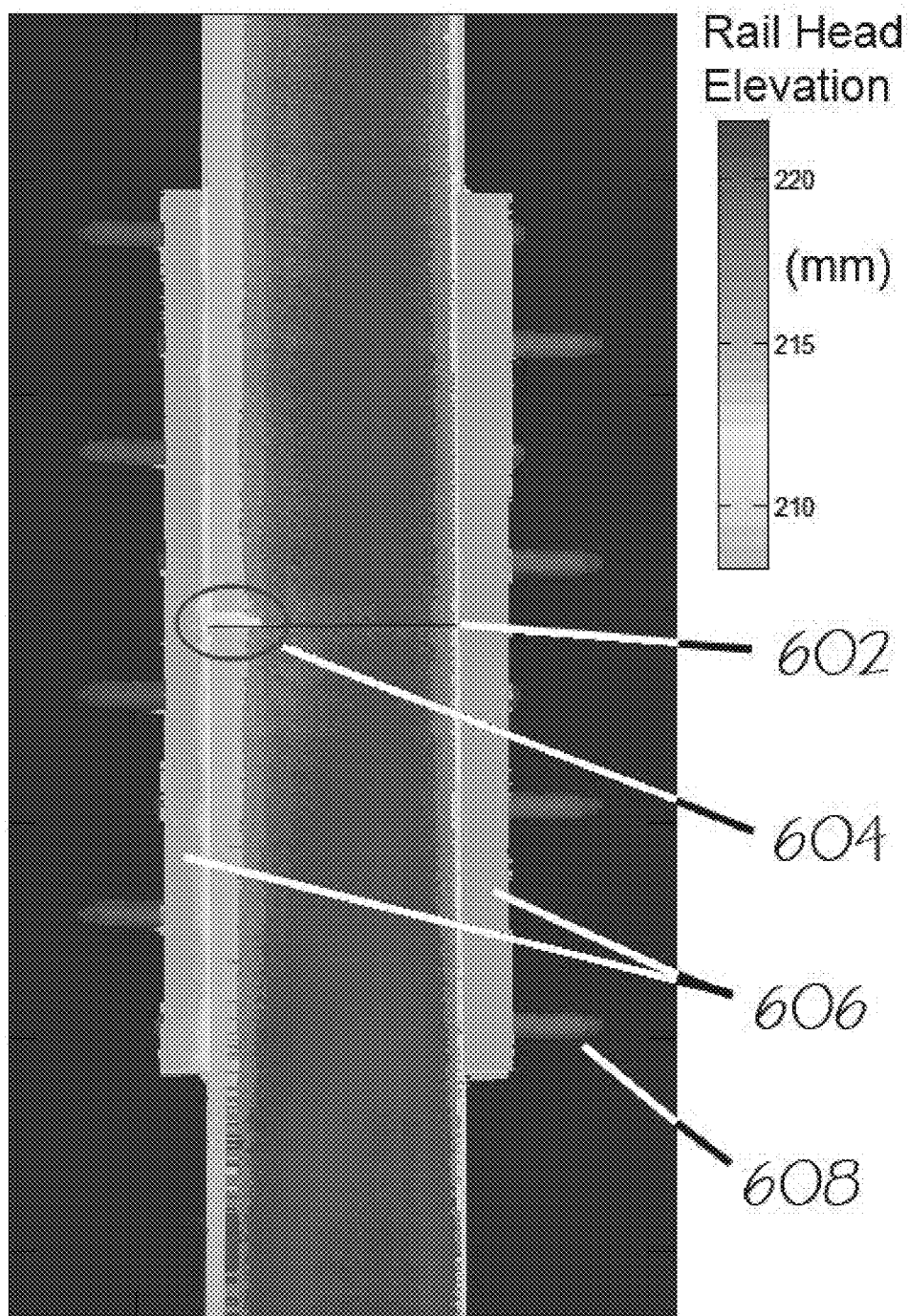
FIG. 45 shows elevation data including multiple identified features including a rail joint, a broken rail head, joint bars, and joint bar bolts.

3DTAS surface elevation data for a typical joint bar 600 is shown in FIG. 44. The joint bar processing method also uses the surface elevations between the rail head edges to develop a longitudinally filtered (smoothed) surface to highlight surface imperfections (rail head corrugation and battered joints). The filtered rail head surface is subtracted from the actual rail head surface elevations to uncover surface imperfections including open, battered or otherwise damaged joints as shown in FIG. 45. FIG. 45 shows various features including a rail joint 602, a broken rail head 604, joint bars 606, and joint bolts 608.

Figure 46:
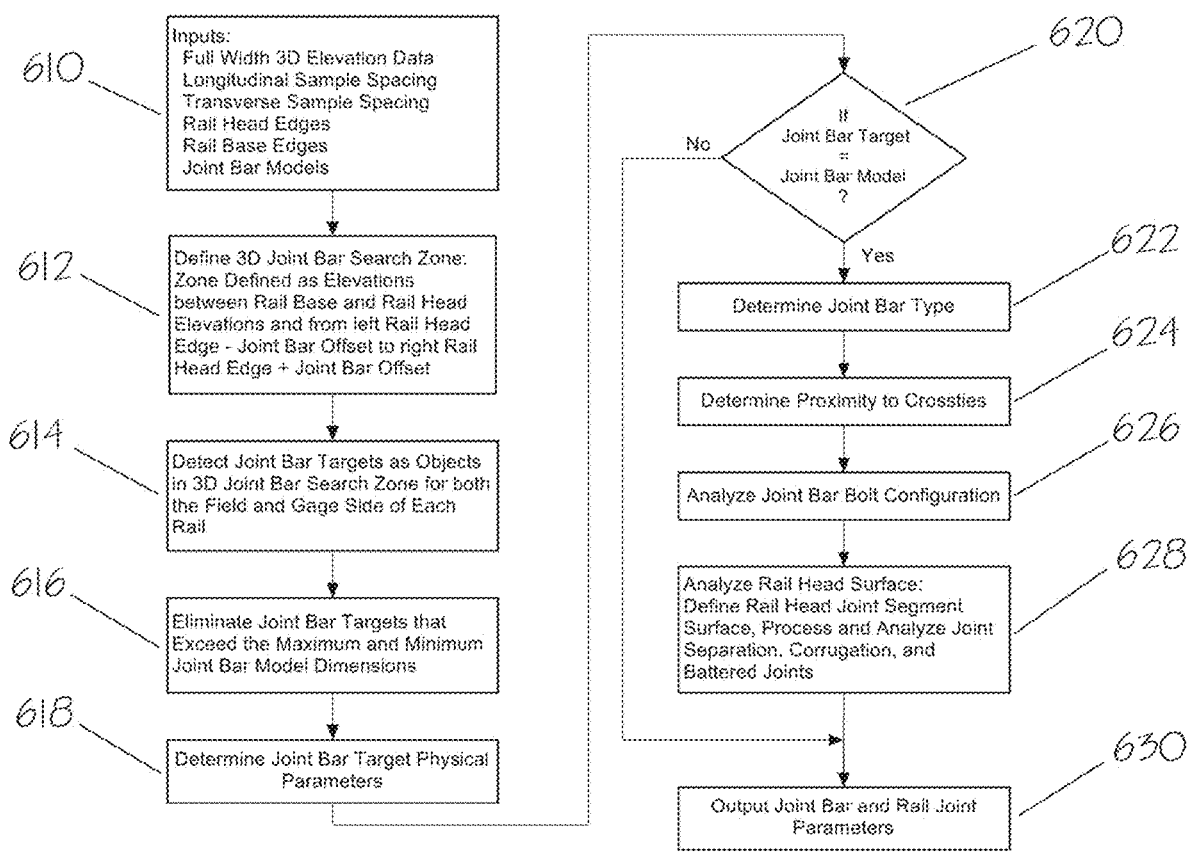
FIG. 46 shows a protocol for detecting joint bars and rail joints and processing associated data.

The detailed joint bar and rail joint detection and processing steps are detailed in FIG. 46. The process steps are carried out by a program stored on a computer readable medium in communication with a processor. A first step (block 610) of the program includes inputting data sets to a processor, such data sets including full 3D elevation map data, elevation map sample resolution (longitudinal and transverse), rail head edge coordinates, rail base edge coordinates, and joint bar models. The detection of joint bars in the 3DTAS system is based on the detection of features of the correct horizontal size and positioned within an acceptable vertical elevation range. The processing steps required to locate and identify joint bars begins with the definition of 3D joint bar search zones. The 3D joint bar search zone width extends from both the rail head edge field and gage sides by the Joint Bar Offset amount, and from with a vertical range of above the rail base elevation to below the rail head height (block 612). These 3D joint bar search zones are established for both rails. Any features with a vertical deviation of greater than a defined vertical joint bar deviation threshold occurring at the same longitudinal point in both the field and gage 3D search zones for either rail are identified as a joint bar targets (block 614). Joint bar targets with dimensions not within the maximum or minimum Joint Bar Model size limits are eliminated as Joint Bar targets (block 616). Identified joint bar targets parameters are determined including physical dimensions (length, width, and height for example) (block 618). Each of the joint bar targets is analyzed to determine if the physical 3D dimension parameters match any of the known Joint Bar Model types (block 620). If the dimensions match a known Joint Bar Model, the type is determined (block 622), and the proximity to the nearest crosstie(s) (block 624). Following the identification of the Joint Bar type, the joint bar model includes the bolt pattern definition for both the left and right rail configurations which includes bolt placement, bolt size, and bolt elevation. The detected joint bar targets are analyzed to determine the number, orientation and location of bolts using 3D template matching of threaded bolts, bolt heads, and nut models (block 626). Following the identification of joint bars, rail joint analysis of the surface of the rail head is completed over the segment of rail corresponding to the limits of each joint bar. The analysis includes the creation of the rail head surface segment defined by the rail head edges and the limits of each joint bar. This segment is 2D low pass filtered (with a high pass cutoff of 0.2 m for example) to create the rail head background surface. This background is subtracted from the rail head surface segment to produce the short wavelength anomalies including corrugation, separated and battered joints. These parameters are retained for both the left and right rail base surfaces and stored in a data storage apparatus.

Figure 47:
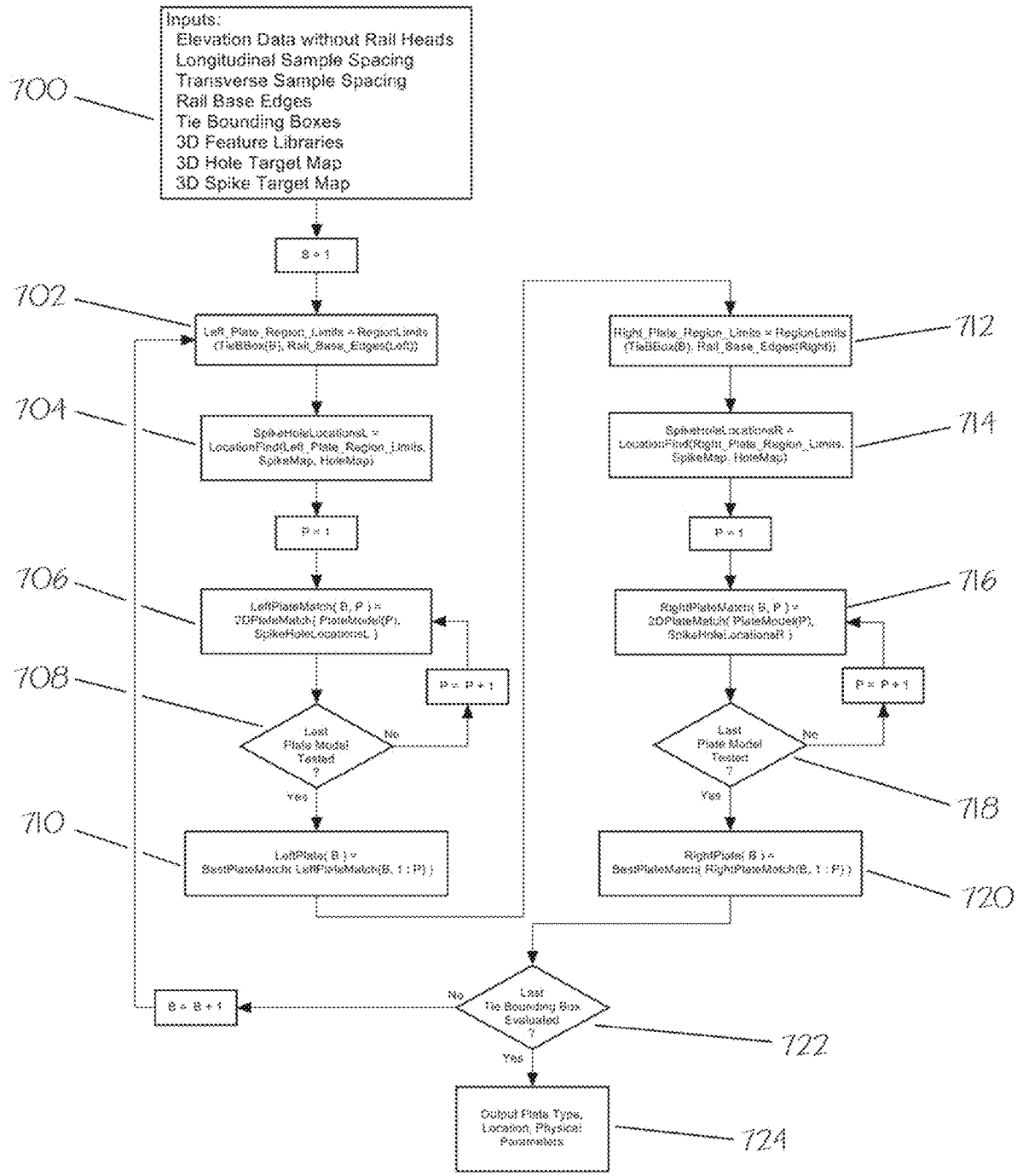
FIG. 47 shows a protocol for detecting cross tie plates.
Figure 48:
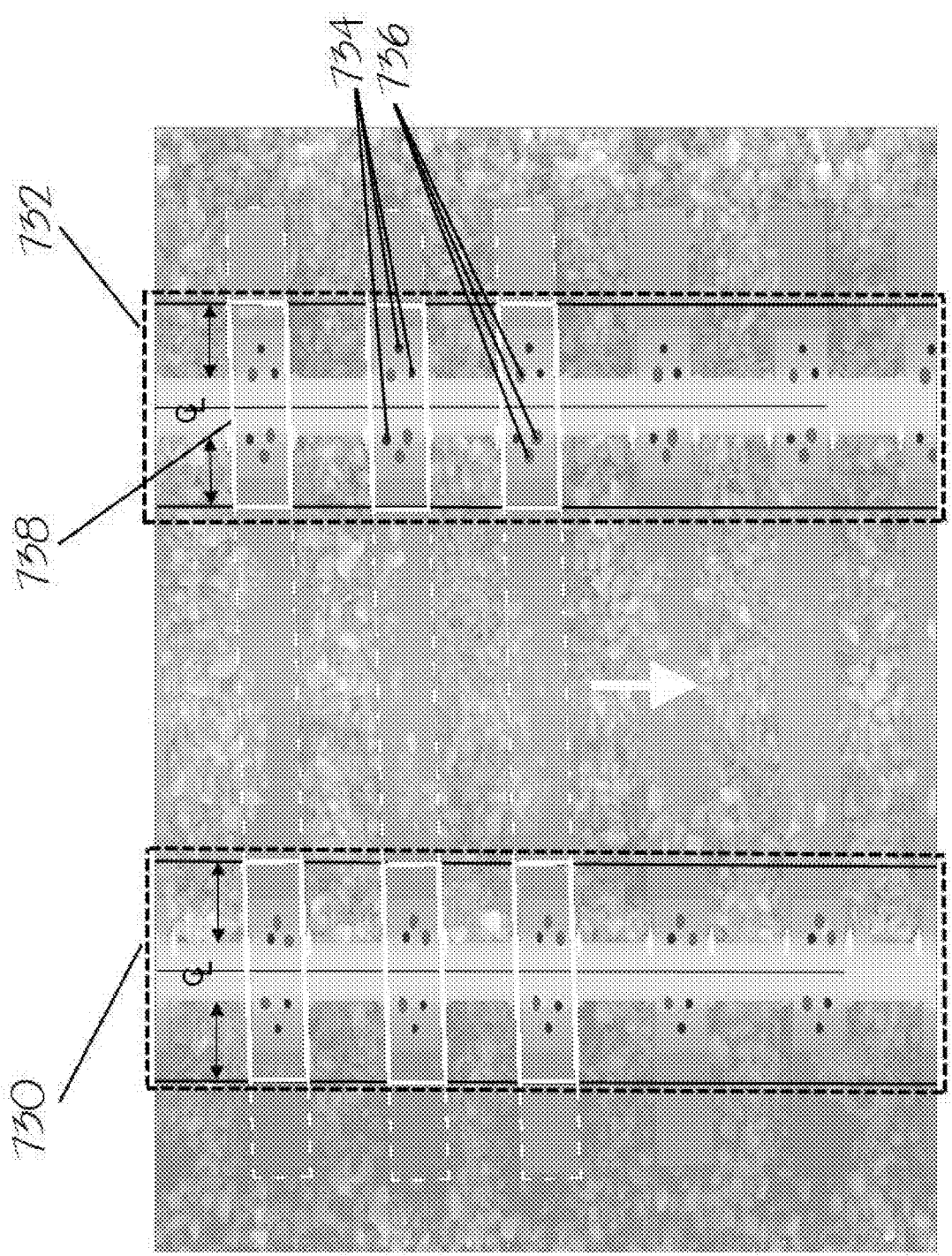
FIG. 48 shows elevation data including a detected tie plates.

Like Rail Seat Abrasion for concrete ties, rail plate damage to wooden crossties through crosstie surface abrasion due to applied loads is a significant form of distress negatively impacting rail fastener holding capabilities and therefore tie condition. Following the identification of wooden tie fastening components (Spikes and Plate Holes) using 3D Template Matching methods, the 3DTAS uses the template correlation maps for Spike and Hole targets locations to match the fasteners with the correct crosstie Plate model in the 3D Feature Libraries. The detailed wooden crosstie plate detection and processing steps are detailed in FIG. 47. The process steps are carried out by a program stored on a computer readable medium in communication with a processor. A first step (block 700) of the program includes inputting data sets to a processor, such data sets including 3D elevation map data with the rail head elevation data mathematically removed, elevation map sample resolution (longitudinal and transverse), rail base edge coordinates, tie bounding box definitions, 3D feature libraries containing the plate models, 3D hole target maps (showing holes 734 in FIG. 48), and the 3D spike target maps (showing spikes 736 in FIG. 48). The detection of wooden crosstie plates in the 3DTAS system is based on the best correlation of the crosstie plate models in the 3D feature library to the detected spike and hole patterns. This method reliably detects plates that are partially cut into the top of the crosstie and no longer have detectable edges around the perimeter of the plate. The first step identifies the left rail fastener search zone based on limits defined by a lateral offset (defined by the largest possible plate size) from the rail base edges (left rail fastener search zone 730 for the left rail and right rail fastener search zone 732 for the right rail in FIG. 48), and longitudinal limits defined by the current tie bounding box being analyzed (step 702). Once the search limit for the left rail has been defined, the fastener (Spikes and Hole) target locations within the search zone are extracted from the Spike and Hole target maps (step 704). Using the fastener location pattern for the search zone defined in step 704, each of the plate models in the 3D feature library are matched against the fastener configuration (step 706) and the correlation strength of the match is calculated and retained for the best plate rotation and offset configuration. After all of the plate models have been tested (step 708), the plate model with the highest correlation is retained as the correct left rail plate model (step 710). The process is repeated for the right rail. The right rail search zone is defined on maximum plate model lateral offset and current bounding box limits (step 712). The right rail fastener target locations are determined (step 714) from the Spike and Hole target maps previously calculated. Once the fastener targets are defined for the search area, each plate model fastener location is tested for the target locations and the maximum correlation is determined, for the optimum rotation and offset configuration (step 716). After all of the plate models are tested for the right rail fastener targets (step 718), the plate model with the maximum target fastener location correlation (step 720) is retained (plate model 738 in FIG. 48). This process is repeated for all bounding boxes (step 722) and when complete, all of the selected tie plate types, and physical parameters for both rails are associated with the corresponding tie bounding box and are reported (step 724).

Figure 49:
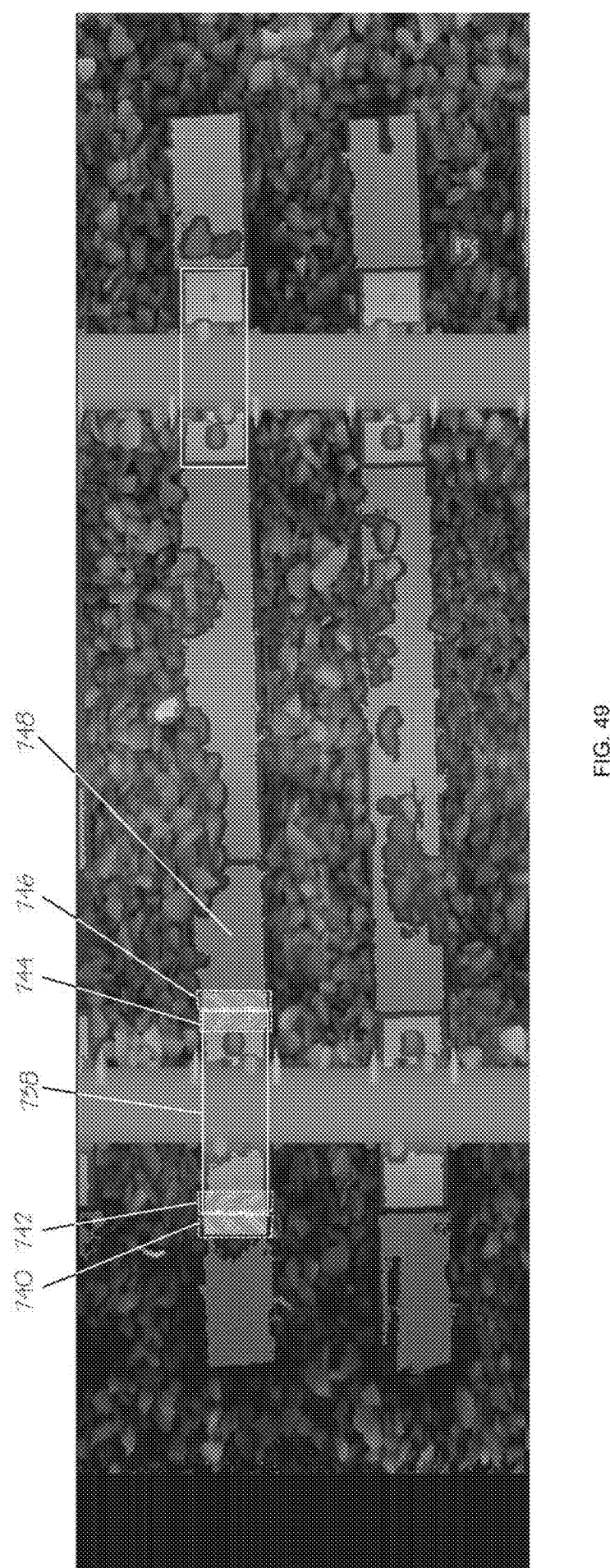
FIG. 49 shows elevation data including a tie plate and specific zones for measuring vertical plate wear.

As shown in FIG. 49, following the identification of wooden crosstie rail plates, the vertical plate wear (the Plate Cut measure) can be calculated and reported. Following the detection of the correct plate type and orientation, field and gage zones both on the ends of the tie plate (plate field zone 742 for field top of plate, and plate gage zone 744 for gage top of plate) and on the surface of the crosstie (surface field zone 740 for field top of tie, and surface gage zone 746 for gage top of tie). The dimensions for the elevation zones are defined by the plate type. The plate cut method also uses the smooth surface mask for each crosstie region bounded by the tie bounding box to eliminate those areas not representative of accurate elevation measures for either the rail plate or crosstie surface. Statistical measures for each zone are calculated (mean, median, max, and min, etc.), and the difference between the top of plate and top of tie minus the rail plate thickness (the Plate Cut measure) are recorded for both the field and gage ends of each rail plate associated every tie bounding box.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A method of determining pad thickness, rail seat abrasion, and insulator thickness along a railway track bed using a system for assessing a railway track bed, the method comprising the steps of:
   a. inputting elevation data, rail base edge feature coordinates, detected tie bounding box data, fastener type and location data, and rail type data to a processor wherein significant elevations due to the rail heads for each rail have been removed from the elevation data;
   b. identifying all fasteners in a tie bounding box using the processor;
   c. extracting tie top, rail base, and insulator measurement points for each fastener in the tie bounding box using the processor;
   d. calculating the difference between a rail base elevation and a tie top elevation and adjusting for a rail base thickness to provide a rail seat abrasion measurement using the processor;
   e. calculating the difference in elevation between the top of an insulator and the top of the tie to provide an insulator thickness measurement using the processor;
   f. flagging the appropriate rail within the tie bounding box if a rail seat abrasion measurement is less than a defined threshold using the processor; and
   g. flagging the appropriate rail within the tie bounding box if an insulator thickness measurement is less than a defined threshold using the processor.

2. The method of claim 1 further comprising the steps of determining whether the number of fasteners in the tie bounding box is less than four and, if the number is less than four, recording a broken or missing fastener for that tie bounding box using the processor.

3. The method of claim 1 further comprising the step of calculating neighborhood elevations for fastener measurement points using the processor.

4. A method of detecting joint bars and rail joints along a railway track bed using a system for assessing a railway track bed, the method comprising the steps of:
   a. inputting elevation data, longitudinal and transverse elevation map sample resolution data, rail head edge coordinates, rail base edge coordinates, and joint bar models to a processor;
   b. defining a 3D joint bar search zone;
   c. detecting joint bar targets as objects in the defined 3D joint bar search zone for the field and gage sides of each rail using the processor;
   d. determining physical parameters for joint bar targets using the processor;
   e. analyzing each joint bar target to determine whether it matches any known joint bar models using the processor; and
   f. determining the type of joint bar if a joint bar target matches a known joint bar model using the processor.

5. The method of claim 4 further comprising the step of eliminating joint bar targets that are not within the maximum and minimum joint bar model dimensions using the processor.

6. The method of claim 4 further comprising the step of determining the proximity of each joint bar to ties in the elevation data using the processor.

7. The method of claim 4 further comprising the step of analyzing detected joint bar targets to determine the joint bar bolt configuration using the processor.

8. The method of claim 4 further comprising the step of analyzing rail head surfaces over a defined rail head joint segment surface using the processor.

9. The method of claim 8 further comprising the step of identifying joint separation, corrugation, and battered joints using the processor.

10. A method of detecting wooden crosstie plates along a railway track bed using a system for assessing a railway track bed, the method comprising the steps of:
    a. inputting elevation data, longitudinal and transverse elevation map sample resolution data, rail base edge feature coordinates, detected tie bounding box data, a 3D feature library containing plate models, 3D hole target maps, and 3D spike target maps to a processor wherein significant elevations due to the rail heads for each rail have been removed from the elevation data;
    b. identifying a rail fastener search zone using the processor;
    c. extracting fastener target locations from spike and hole target maps using the processor;
    d. matching plate models from the 3D feature library containing plate models against the extracted fastener target locations using the processor;
    e. calculating correlation strengths for matches resulting from the matching step d using the processor; and
    f. retaining the plate model with the highest calculated correlation strength using the processor.

* * * * *